United States Patent [19]
Rao et al.

[11] Patent Number: 6,031,927
[45] Date of Patent: Feb. 29, 2000

[54] ANALYZER AND METHODS FOR DETECTING AND PROCESSING VIDEO DATA TYPES IN A VIDEO DATA STREAM

[75] Inventors: R. Padmanabha Rao, Sunnyvale; Amanda L. Chin, Fremont, both of Calif.

[73] Assignee: General Instrument Corporation, Horsham, Pa.

[21] Appl. No.: 08/629,304

[22] Filed: Apr. 8, 1996

Related U.S. Application Data

[62] Division of application No. 08/162,511, Dec. 2, 1993, Pat. No. 5,828,786.

[51] Int. Cl.[7] .................................................. G06T 7/00
[52] U.S. Cl. ........................ 382/100; 382/236; 382/239; 382/415; 382/439
[58] Field of Search ................................. 382/232, 100, 382/181, 190, 236, 239; 348/415, 439, 401, 423, 97, 441, 443, 700

[56] References Cited

U.S. PATENT DOCUMENTS

| | | | |
|---|---|---|---|
| 3,716,670 | 2/1973 | Lowry | 386/114 |
| 4,280,133 | 7/1981 | Kato | 348/662 |
| 4,689,673 | 8/1987 | Ohki et al. | 348/416 |
| 4,716,460 | 12/1987 | Benson et al. | 348/458 |
| 4,882,629 | 11/1989 | Faulkerson et al. | 358/464 |
| 4,893,198 | 1/1990 | Little | 386/52 |
| 4,914,694 | 4/1990 | Leonard et al. | 380/5 |
| 4,974,096 | 11/1990 | Wash | 358/302 |
| 4,998,287 | 3/1991 | Katznelson et al. | 382/107 |
| 5,019,899 | 5/1991 | Boles et al. | 348/1 |
| 5,091,782 | 2/1992 | Krause et al. | 348/400 |
| 5,099,322 | 3/1992 | Gove | 348/700 |
| 5,191,418 | 3/1993 | Tran | 348/474 |
| 5,227,878 | 7/1993 | Puri et al. | 348/416 |
| 5,255,091 | 10/1993 | Lyon et al. | 348/443 |
| 5,260,787 | 11/1993 | Capitant et al. | 348/459 |
| 5,307,163 | 4/1994 | Hatano et al. | 348/415 |
| 5,317,398 | 5/1994 | Casavant et al. | 348/570 |
| 5,355,229 | 10/1994 | Arano et al. | 386/104 |
| 5,365,280 | 11/1994 | De Haan et al. | 348/699 |
| 5,396,567 | 3/1995 | Jass | 382/251 |
| 5,412,435 | 5/1995 | Nakajima | 348/699 |
| 5,430,490 | 7/1995 | Rim | 348/452 |
| 5,446,560 | 8/1995 | Schwartz | 358/445 |
| 5,459,618 | 10/1995 | Kozono et al. | 360/31 |
| 5,461,420 | 10/1995 | Yonemitsu et al. | 348/401 |
| 5,491,516 | 2/1996 | Casavant et al. | 348/415 |
| 5,499,106 | 3/1996 | Arano et al. | 386/104 |
| 5,602,684 | 2/1997 | Corbitt et al. | 386/52 |

*Primary Examiner*—Jon Chang
*Attorney, Agent, or Firm*—Skjerven, Morrill, MacPherson, Franklin & Friel LLP; Edward C. Kwok

[57] ABSTRACT

A video data stream analyzer modifies an input digital video signal so that the resulting output digital signal can be optimally compressed by a digital video encoder. The video data stream analyzer eliminates redundancy in the input video signal, and reorganizes the input video signal so that the spatial and temporal redundancy is increased. In addition, the video data stream analyzer generates side channel information that is supplied to the video encoder. The side channel information tells the video encoder whether vertical frame-based filtering or vertical field-based filtering is preferable. Additional side channel information specifies the order and duration of the display of the fields after decoding and this information preferably is encoded with the video signal. The video data stream analyzer provides scan detection of the incoming video digital data, and automatically and reliably detects scene cuts, repeated fields, and mixed-field frames in the incoming digital video data in real time independent of the video source. The video data stream analyzer modifies the input video data stream by dropping repeated fields and replacing a frame with a scene cut with a frame having identical fields for video, cartoon, telecine video sources as well as arbitrary combinations of these video sources.

53 Claims, 35 Drawing Sheets

Microfiche Appendix Included
(1 Microfiche, 45 Pages)

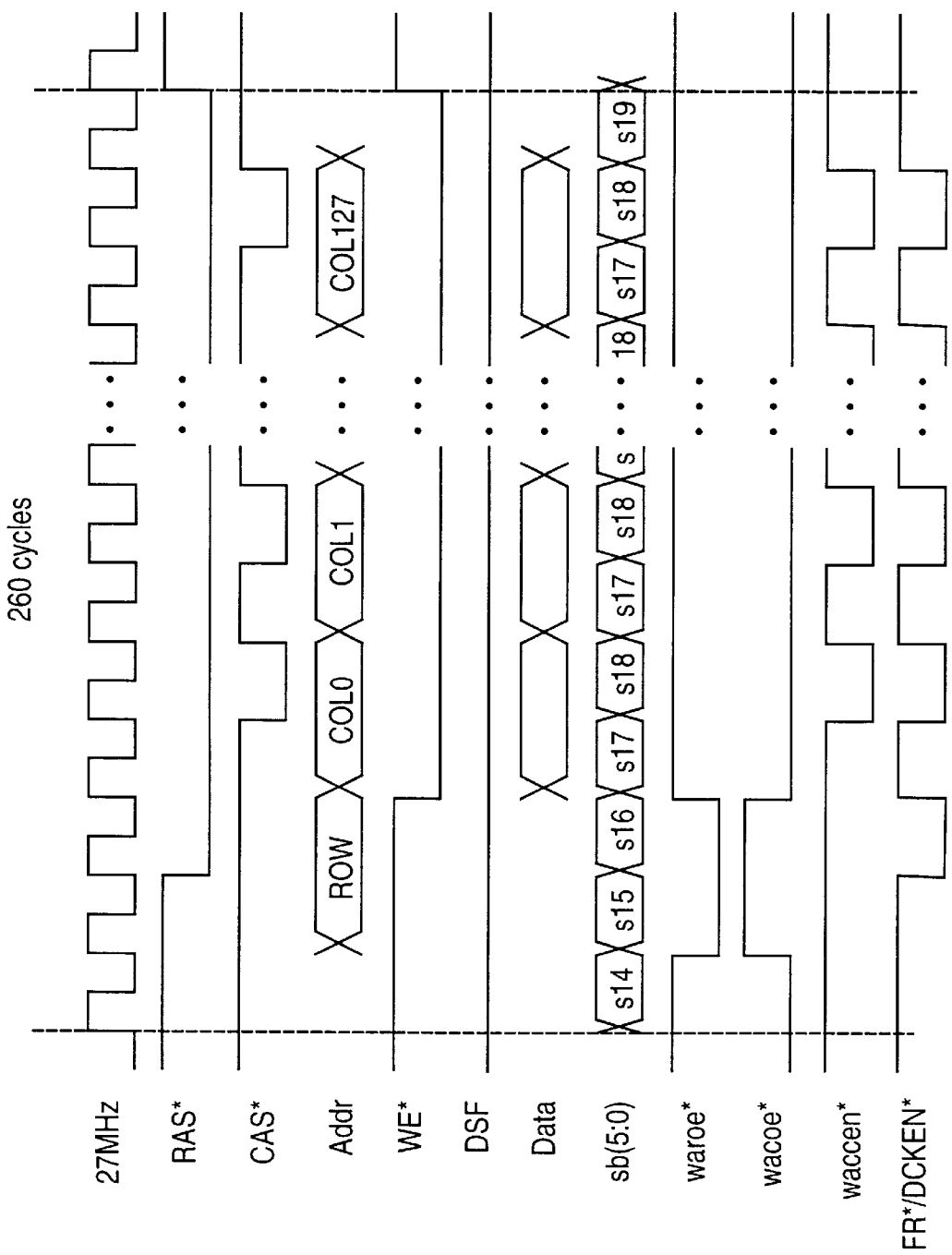

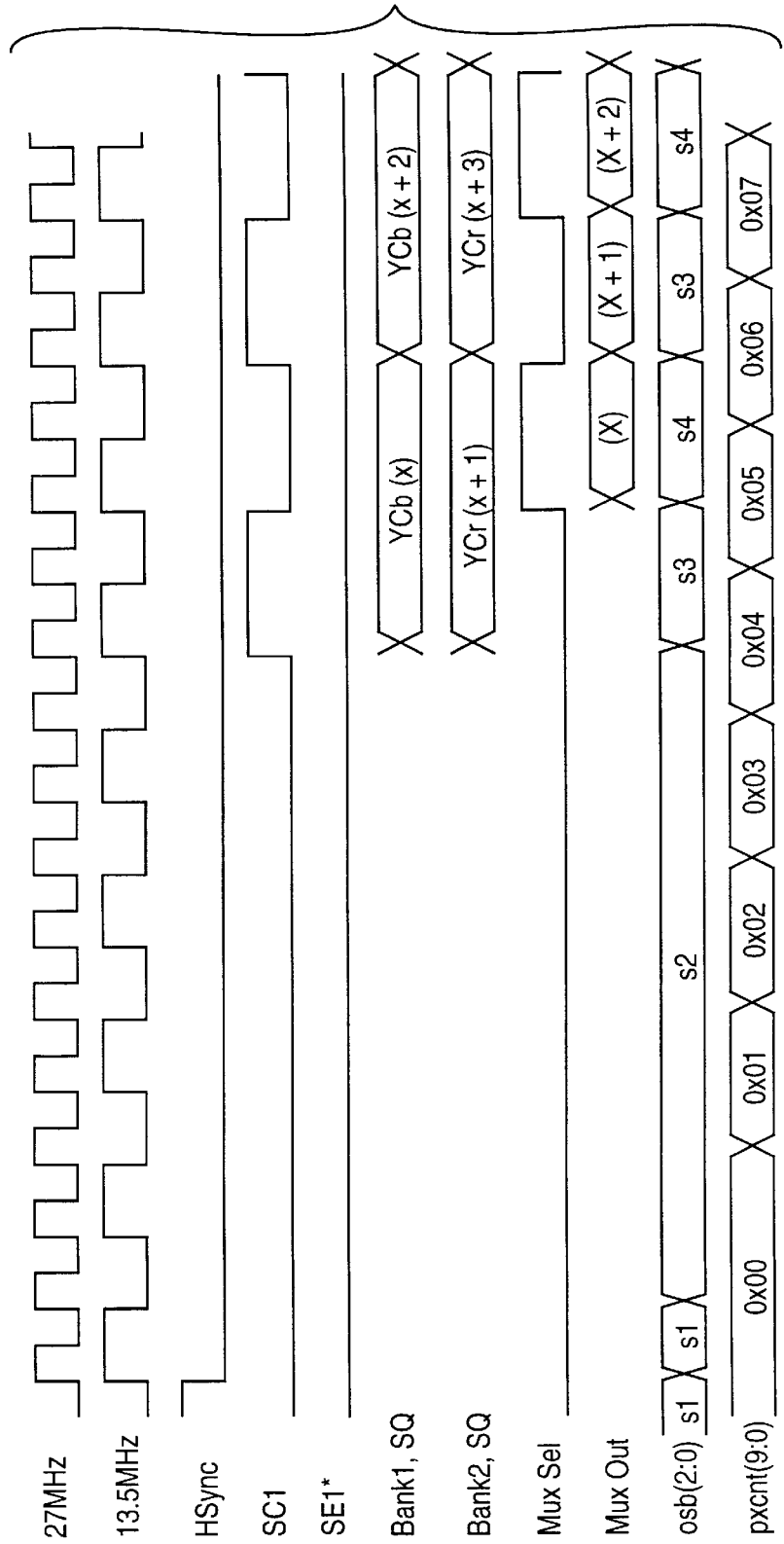

ANALYZER AND METHODS FOR DETECTING AND PROCESSING VIDEO DATA TYPES IN A VIDEO DATA STREAM

This application is a division of application Ser. No. 08/162,511, filed Dec. 2, 1993, now U.S. Pat. No. 5,828,786.

REFERENCE TO MICROFICHE APPENDIX

Appendix A, which is a part of the present disclosure, is a microfiche appendix consisting of one sheet of microfiche having a total of 46 frames. Microfiche Appendix A is a listing of one embodiment of the methods and processes utilized in the video data stream analyzer of this invention, which is described more completely below, and is incorporated herein by reference in its entirety.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. Field of the Invention

This invention relates generally to compression of video data and more specifically to real time detection of each of a variety of common video data streams and real time modification of the video data streams.

2. Background of the Invention

Video data typically includes luminance and chrominance data for each pixel in a frame. Raw digital video data contains too much information for transmittal over normal communication media and requires considerable storage capacity. Consequently, to utilize either the limited bandwidth of the communication media, or storage capacity efficiently, coding techniques are commonly used to compress the information contained in raw digital video data.

For example, in FIG. 1, video camera 101 generates an analog video signal that drives input processor 102 in encoding system 110. Input processor 102 digitizes and typically filters the analog video signal to produce a raw digital video signal. The raw digital video signal is encoded, i.e., compressed, by encoder 103.

The compressed digital video signal is transmitted over a communications channel, for example, a satellite link, to a decoding system 120 that includes a decoder 121, a post-processor 122, and a display driver 123. Decoder 121 decompresses the encoded video data and supplies the resulting signal to post-processor 122, which in turn smooths and enhances the video signal. The video signal from post-processor 122 supplies display driver 123 that drives display unit 130.

The encoding, i.e., compression, of video signals for storage or transmission and the subsequent decoding is well-known. Moreover, the effectiveness of the compression is increased if a priori information concerning the content of the raw digital video data is available and exploited.

An important factor in the efficiency of the encoding and decoding processes is the prediction efficiency. Most commonly used encoding processes employ a motion compensated prediction loop. A motion compensated prediction loop is included, for example, in the H.261, MPEG1 and MPEG2 video compression standards. See for example, ITU-T Recommendation H.261, "Codec for Audiovisual Services at p×64 Kbps," Geneva 1993; ISO 11172-1 (MPEG1), "Coding of Moving Pictures and Associated Audio for Digital Storage Media at up to About 1.5 Mbps, Part 1," 1993; and CD ISO/IEC 13818-2 (MPEG2), "Generic Coding of Moving Pictures and Associated Audio," 1993, which are each incorporated herein by reference in its entirety.

Typically, in motion compensated prediction, a small portion of the current frame, usually a 16 pixel by 16 pixel block, is compared with a set of similarly sized blocks taken from a previously encoded frame, called the reference frame, which is stored in encoder 103. In the encoding process, a difference metric, such as mean-squared or mean-absolute difference between the current block and a reference block, is used for a comparison of the blocks. The block in the reference frame that best matches the current block, i.e., has the smallest difference metric, is chosen as the prediction block for the current block.

After the prediction block is selected, the difference between the current block and the prediction block, or in some cases, between the current block and a weighted prediction block, is computed to form a difference block. The difference block is then encoded and transmitted. Simultaneously, a vector pointing to the location of the prediction block in the reference frame is also transmitted as side channel information.

Decoder 121 has a copy of the reference frame in its memory. On receiving the prediction block vector, decoder 121 fetches the prediction block from the memory, and adds the prediction block to the decoded difference block to generate the new decoded block.

A motion compensated prediction loop is effective in increasing the encoding efficiency because most of the time there is a good correlation between successive frames of a sequence. Clearly, the better the prediction is, the better the encoding efficiency is, because a better prediction means less information in the difference block and so less information to encode and transmit.

The content of the raw digital data depends on several factors. Video signals of commercial interest have a variety of formats. Typically, the format of the video signal is determined by the source of the video data. For example, the video frames supplied to input processor 102 may represent the output of a vidicon adhering to the NTSC prescribed rate of 30 frames per second (fps), or the video frames may represent certain cartoon sequences that are produced at 15 fps and then converted to 30 fps by repeating each frame once. (Herein, the NTSC prescribed rate is taken as 30 fps, which is 60 fields per second. As is known by those skilled in the art, the actual NTSC prescribed rate is 29.97 fps, which is 59.94 fields per second.) Herein, a frame includes two fields, an odd parity field and an even parity field. The first field contains lines 1 through 262 of the frame and the second field contains lines 263 through 525 of the frame. Typical display monitors display the first field followed by the second field for each frame in the video data stream. Also, each video source 101 is said to produce a type of video data.

If the characteristics of the video data source could be reliably detected in real time, the characteristics could be exploited to increase the efficiency of the data compression. For example, there is no need to send the repeated frames generated in a 15 fps to 30 fps cartoon conversion. A somewhat more complicated, but analogous, case arises when a 24 fps progressively scanned film sequence, referred to herein as a movie sequence, is converted to match the conventional NTSC frame rates.

A movie sequence, which was originally produced on photographic film and typically shot at 24 fps, is converted to the NTSC rate of 60 fields/second by a telecine machine using a process commonly known as 3:2 pulldown that is described below. In this document, either "film" or "movie" refers to a video data type shot at 24 fps while "video" refers to a video data type originally produced at 60 fields/second.

A video sequence is typically interlaced which means that the odd and even parity fields of the same frame are temporally disjoint. A film sequence, in contrast, is progressive which means that all the information in a frame is captured at the same time instant. Also, there are some cases when the source may be shot at NTSC video rate of 30 fps and yet be progressive.

A 3:2 pulldown increases the frame rate of a movie sequence by periodically repeating certain fields in the film sequence. As an example, consider the 24 fps film sequence given in FIG. 2A. The letters "a b c . . . " denote successive frames in the sequence while the numbers "1" and "2" denote the odd and even parity fields, respectively, in each frame. In a general situation, frames a b c . . . can be assumed to be different. The telecine machine increases the frame rate to 30 fps by replacing the set of frames in FIG. 2A with the set of frames in FIG. 2B.

The sequence of frames in FIG. 2B has a five-frame periodicity. Each set of four frames of the original 24 fps sequence (FIG. 2A) is converted to five frames by repeating once the first and sixth fields of the four frame set. Moreover, the repetition is done in a manner that introduces two mixed-frames in the five frame set. In FIG. 2B, the mixed-frames are underlined. Mixed-field frames are those frames that contain fields from different temporal instants and are introduced in this case by the aforementioned frame rate conversion process. Herein, the term mixed-field frame and the term mixed-frame are used interchangeably.

From the point of encoder 103 such a 3:2 pulldown operation is doubly inefficient. First, part of the information is coded redundantly because of repetition of some fields. Secondly, forty percent of the frames are now "mixed" (a1b2, b1c2, e1f2 and f1g2 here), which means they are composed of temporally disjoint fields. This introduces interlace effects, which in turn result in a drop in the prediction efficiency of the frame-based encoding. For example, in a motion compensated prediction loop, if a mixed-frame is suddenly introduced into the sequence, the mixed-frame decreases significantly the probability of finding a good prediction block. As a result, the best possible difference block has a significant amount of information that must be encoded and transmitted.

Hence, appearance of mixed-field frames in the input video data sequence affects the compression performance of encoder 103 significantly. Thus, it would be beneficial to remove or, if possible, repair such frames before compression. Such processing could be performed in either real or non-real time. Unfortunately, the inventors are unaware of any prior art method or apparatus for removing or repairing such mixed-frames in real time.

A significant additional savings in data rate transmission could be achieved by eliminating transmission of one, all, or most repeated fields. Similarly, elimination of mixed-field frames would improve the prediction mechanism employed by commonly used video compression schemes.

There are other instances when mixed-field frames might be present in a video sequence. Sometimes mixed-field frames are intentionally created in the studio, but often mixed-field frames are accidentally introduced during editing operations. For example, in FIG. 2C a normal 30 fps interlaced video sequence is represented. An edit was intended to switch from a first scene to a new scene beginning with frame u1u2, but in the editing process, a mixed-field frame d1u2 was created (FIG. 2D). Mixed-field frame d1u2 is said to contain a scene cut. Similarly, in FIG. 2E, two telecine sequences were edited and merged, but the editing process created mixed-field frame c1v2 that contains a scene cut.

Thus, the mixed-field frames in FIGS. 2D and 2E were created by mid-frame edits. In general, mid-frame edits refer to an abrupt change in scene in the middle of a frame, i.e., the odd and even parity fields of a frame belong to different scenes. Such frames are also difficult to compress efficiently.

To meet a wide variety of user requirements, and bandwidth constraints, video compressors need to process video frames of different spatial resolutions, even if the original source material was all of the same resolution. Spatial resolution is altered by digitally filtering each frame of sequence before the frame is compressed. The filtering may be done in the horizontal direction, the vertical direction, or both. When filtering is done in the vertical direction, preferably the nature of the frame, i.e., whether the frame is interlaced or progressive, would be taken into account, because different modes of vertical filtering are required for interlaced and progressive frames to produce good visual quality in decoding system 120. Typically, interlaced frames have a better visual quality when the frames are vertically filtered on a field basis, while the opposite is true for progressive frames.

SUMMARY OF THE INVENTION

According to the principles of this invention, a video data stream analyzer modifies, preferably in real time, an input digital video signal. The video data stream analyzer of this invention eliminates redundancy in the input video signal, and reorganizes the input video signal so that the spatial and temporal redundancy is increased. Hence, the modifications to the video signal made by the video data stream analyzer of this invention increase the efficiency of encoding the video signal.

In addition, the video data stream analyzer generates side channel information that aids in selecting an appropriate vertical filter, if required, and in reconstructing the encoded data. Specifically, the video data stream analyzer generates, in real time, side channel information that is supplied to the video encoder. The side channel information tells the video encoder whether vertical frame-based filtering or vertical field-based filtering is preferable. Additional side channel information specifies the order and duration of the display of the fields after decoding and this information preferably is encoded with the video signal.

The video data stream analyzer provides real time scan detection of the incoming video digital data, and automatically and reliably detects scene cuts, repeated fields, and mixed-field frames in the incoming digital video data in real time independent of the video data type. The video data stream analyzer modifies the input video data stream by dropping repeated fields and replacing a frame with a scene cut with a frame having identical fields for video, cartoon, telecine video data types as well as arbitrary combinations of these video data types. The prior art video compression inefficiencies introduced by scene cuts, mixed-field frames, and repeated fields are either completely eliminated or greatly reduced by the video data stream analyzer of this invention.

In one embodiment, the video data stream analyzer includes a statistical analyzer having an input bus and an output bus. The statistical analyzer passes a video data stream on the input bus to the output bus and generates a plurality of parameters in real time for each field in the video data stream. The statistical analyzer passes the video data stream to a reordering memory having an input bus coupled to the output bus of the statistical analyzer and an output line. Each field in the video data stream is stored in the reordering memory. A controller, coupled to the statistical analyzer to receive the plurality of parameters and coupled to the reordering memory, analyzes the plurality of parameters and selects one of the fields stored in the reordering memory for output at each field interval onto the reordering memory output line in real time.

The statistical analyzer includes a first-in-first-out memory (FIFO) and a plurality of differential accumulators connected to the FIFO. The FIFO, in one embodiment, includes a first field memory connected to the statistical analyzer input bus and a second field memory connected to the first field memory and to the statistical analyzer output bus. The plurality of differential accumulators includes: a strip activity differential accumulator that has a first input bus connected to the statistical analyzer input bus and a second input bus connected to the statistical analyzer output bus; a differential activity differential accumulator having a first input bus connected to the statistical analyzer output bus and a second input bus connected between the first field memory and the second field memory; and an intra-activity differential accumulator having a first input bus connected to the statistical analyzer output bus and a second input bus connected to an output bus of a line delay memory that has an input bus connected to the statistical analyzer output bus.

The controller in the video data stream analyzer includes (i) a statistical processor coupled to receive the parameters from the statistical analyzer and to a plurality of registers, and (ii) a state machine coupled to the statistical analyzer, to the reordering memory, to an output counter, and to the plurality of registers. The state of a bit in each of the plurality of registers represents a characteristic of a field in the reordering memory. Specifically, one register in the plurality of registers is a repeated field register and a bit in the repeated field register indicates, in one embodiment, whether a field in the reordering memory is a repeated field. One register in the plurality of registers is a scene cut register and a bit in the scene cut field register indicates whether a scene cut occurs at a field in the reordering memory. One register in the plurality of registers is a scan pattern register and a bit in the scan pattern register indicates whether a field pair in the reordering memory is progressive or interlaced. One register in the plurality of registers is an odd-even compare register.

The state machine, in the controller, analyzes in real time the information in the plurality of registers and detects: a scene change in the video data stream; a repeated field in the video data stream; a change from a video sequence in the video data stream to a cartoon sequence; a change from a video sequence in the video data stream to a telecine sequence; a change from a cartoon sequence in the video data stream to a video sequence; a change from a cartoon sequence in the video data stream to a telecine sequence; a change from a telecine sequence in the video data stream to a cartoon sequence; and a change from a telecine sequence in the video data stream to a video sequence.

Further, the operation of the state machine in combination with the statistical processor can distinguish between, i.e., detect, seventy-two different input video data streams to the video data stream analyzer given in Appendix I, which are incorporated herein by reference. Note that the sequences given in Appendix I are not inclusive of all input video data streams processed by the video data stream analyzer. For example, transitions to and from cartoon sequences are not included in Appendix I. The input video data streams considered in Appendix I represent a pure video input data stream; a video input data stream that includes a mid-frame edit; the ten possible video to movie sequences; the ten possible movie to video sequences; and the fifty possible movie to movie sequences.

In one embodiment, the state machine includes a plurality of states that includes a video state, a cartoon state, a first seek state, a movie state, a second seek state, and a transfer state. The state machine also includes a plurality of status conditions that are derived from information in the plurality of registers. The status conditions are utilized to determine the transition between various states in the state machine.

The state machine remains in the video state so long as the input video data stream is a video sequence. The state machine transitions from the video state to the cartoon state upon detecting a sequence of fields in the input video data stream that have characteristics indicating a possible start of a cartoon sequence.

The state machine transitions from the video state to the first seek state upon the state machine detecting a sequence of fields in the input video data stream that indicates that a telecine sequence may be starting. The state machine also transitions from the cartoon state to the first seek state under certain conditions.

The state machine transitions from the first seek state to the movie state upon detection of a telecine sequence. The state machine transitions from the movie state to a second seek state to determine whether the telecine sequence continues in the input video data stream. So long as the telecine sequence continues, the state machine oscillates between the movie state and the second seek state. When the second seek state detects that the telecine sequence in not continuing, the state machine transfers to a transfer state that controls termination of the telecine sequence.

Each state in the state machine has a plurality of substates. Some sub-states simply transition to the next substate, while other sub-states generate control information for the reordering memory and side channel information if the output counter has a predetermined value. The side channel information includes a display code and an output format code. The control information to the reordering memory includes an address to read data from the reordering memory for a particular field or fields. Alternatively, the state machine can indicate that for a particular frame, no fields are to be read from the reordering memory and no side channel information generated thereby creating a dead interval in the output video data stream.

In one embodiment, the reordering memory includes a second first-in-first-out memory having an input bus connected to the statistical analyzer output bus and an output bus. A third first-in-first-out memory has an input bus connected to the statistical analyzer and an output bus. A video random access memory is connected to the output bus of the second FIFO memory and to the output bus of the third FIFO memory. A read-write circuit is coupled to the video random access memory and to the controller. A video random access memory controller is coupled to the video random access memory and to the read write circuit.

Hence, the video data stream analyzer implements a method for preprocessing a stream of video data, that can include any one of a plurality of video data types, that includes the steps of:

generating a plurality of parameters that characterize a field for each field in the stream of video data; and using the plurality of parameters to identify a video data type in the plurality of video data types for each field in the stream of video data.

Upon detection of the video data type, the video data stream analyzer removes each detected repeated field and repairs frames with a mid-frame edit by replacing one of the fields with the other field and so improves the encoding efficiency of the video data stream. Preferably, the video data stream analyzer performs the method in real time so that the output data stream from the video data steam analyzer is passed directly to a video encoder. Herein, real time means that the video data stream analyzer receives input video data at a predetermined rate and processes each field without delaying the input video data stream and without danger of overwriting or otherwise losing any portion of the incoming video data.

Numerous methods are incorporated in the video data stream analyzer of this invention. The video data stream analyzer analyzes the input video data stream to determine whether each field pair in the video data steam has a progressive or an interlaced format. This input scan detection is done in a scan pattern analysis process within the controller. The scan pattern analysis process is performed for each field pair in the input video data stream. In an index generation step, a plurality of scan pattern activity indices for a field pair are generated by the controller, using parameters from the statistical analyzer, i.e., the characteristics of each field pair in the input video data stream are monitored. In one embodiment, each scan pattern activity index is an inter-intra index for each strip. Following the index generation step, each of the scan pattern activity indices are compared to a scan pattern threshold in an interlaced-progressive analysis step. If a predetermined number of the scan pattern activity indices are greater than the scan pattern threshold, the field pair is identified as interlaced and otherwise as progressive.

The video data stream analyzer also includes a method for processing telecine and cartoon sequences in a video data stream to enhance the efficiency of encoding the video data stream. The method includes the steps of:

monitoring each field in the video data stream to detect repeated fields wherein upon detection of a repeated field, the repeated field is flagged;

analyzing a pattern formed by the fields flagged as repeated to identify whether the repeated fields are in a cartoon sequence or a telecine sequence;

dropping repeated fields from the video data stream based upon identification of the repeated field as being in one of the cartoon sequence and the telecine sequence.

As explained above, the monitoring step is performed by the statistical analyzer and statistical processor while the state machine performs the analysis and dropping steps. Preferably, all of the steps are performed in real time.

The video data stream analyzer detects, i.e., identifies, a scene cut in a video data stream by:

measuring a cumulative difference in activity between a first field having a parity in the video data stream and a second field of the parity in the video data stream; and identifying a scene cut between the first and second fields upon the cumulative difference satisfying a predetermined condition.

In one embodiment, the cumulative difference in activity is a field activity. The field activity is the sum of a plurality of strip activities. The predetermined condition includes comparison of the cumulative difference activity with a scene cut threshold. The scene cut threshold is, in one case, a running average of the field activities for the fields of the given parity. The scene cut threshold is updated after detection of each scene cut. The scene cut threshold is updated only if another predetermined condition is true, i.e, there is not a sudden deviation between the field activity of the field and the scene cut threshold. In another embodiment, the predetermined condition includes comparison of the cumulative difference in activity with a minimum value threshold and a scene cut threshold.

The video data stream analyzer also performs a method for detecting repeated fields in the input video data stream. In one embodiment, the method for detecting repeated fields includes:

determining if a primary criterion is true for a first field in a frame; and identifying the first field as an unrepeated field upon determining that the primary criterion is not true.

In one embodiment, the method next determines if the primary criterion is true for the other field in the frame upon determining that the primary criterion is true for the first field. The first field is identified as a repeated field upon determining that the primary criterion is not true for the other field in the frame. If the primary criterion is true for the other field in the frame, the method determines if a secondary criterion is true for the first field. If the secondary criterion is not true for the first field, the first field is not a repeated field. If the secondary criterion is true for the first field, the method determines if a secondary criterion is true for the other field in the frame. If the secondary criterion is not true for the other field in the frame, the first field is identified as a repeated field.

In an alternative embodiment, a method for detecting a repeated field in a video data stream having a plurality of frames wherein each frame includes a field of a first parity and a field of a second parity, the method comprises the steps of:

comparing a field activity of a field with a first threshold; and identifying the field as a repeated field if the field activity of the field is less than the first threshold and the field has the second parity.

If the field does not have the second parity, the method compares a strip activity of each strip of the field with a second threshold; and identifies the field as a repeated field if a predetermined number of the strip activities of the field are less than the second threshold and the field has the second parity.

Next, the method repeats the field activity and strip activity comparison steps for a second field of the second parity if (i) the field has the first parity; (ii) the field activity of the field is less than the first threshold; and (iii) a predetermined number of the strip activities of the field are less than the second threshold; and identifies the field as a repeated field if (i) the field activity of the second field is greater than the first threshold; or (ii) a predetermined number of the strip activities of the second field are greater than the second threshold.

Finally, the method repeats the field activity and strip activity comparison steps for a second field of the second parity if (i) the field has the first parity; (ii) the field activity of the field is less than the first threshold; and (iii) a predetermined number of the strip activities of the field are less than the threshold;

compares a measure of field activity of the field with a third threshold if (i) the field activity of the second field is less than the first threshold; and (ii) a predetermined number of the strip activities of the second field are less than the second threshold; and identifies the field as a repeated field if the measure of field activity of the field is less than the third threshold.

Hence, a plurality of conditions can be used, according to the principles of this invention to detect repeated fields in a video data stream. Moreover, each condition can be used individually, or in a selected combination with other conditions.

A real time method for detecting a telecine sequence in a sequence of frames of video data wherein each frame has a field of a first parity followed by a field of a second parity, according to the principles of this invention, includes the steps of:

monitoring, in real time, each field in the video data stream to detect repeated fields and flagging each repeated field; and analyzing, in real time, a pattern formed by the fields flagged as repeated to identify whether the repeated fields are in a telecine sequence.

The analyzing step includes determining whether every fifth field is a repeated field.

A method for detecting a cartoon sequence in a sequence of frames of video data wherein each frame has a field of a first parity followed by a field of a second parity includes the steps of:

monitoring each field in the sequence to detect repeated fields and flagging each repeated field; and analyzing a pattern formed by the fields flagged as repeated to identify whether the repeated fields are in a cartoon sequence.

The analyzing step includes determining whether the two fields in every other frame of the sequence are flagged as repeated fields. Preferably, the monitoring and analyzing steps are performed in real time.

According to the principles of this invention, a method for improving encoding efficiency of a video data stream includes the steps of:

analyzing each field in the video data stream to detect repeated fields; and dropping each detected repeated field from the video data stream to generate a modified video data stream thereby eliminating encoding of redundant information and so improving encoding efficiency.

The method further includes the step of:

generating a display code for each frame in the modified video data stream wherein the display code indicates a display combination for fields in the modified video data stream to recreate the video data stream.

Another real time method for improving encoding efficiency of a video data stream includes the steps of:

analyzing each frame in the video data stream to detect frames that include a mid-frame edit;

dropping a first field in a frame in which a mid-frame edit was detected; and replacing the first field with a second field in the frame in which a mid-frame edit was detected thereby eliminating an abrupt change in activity within the frame and so improving encoding efficiency.

A method for introducing dead times in a video data stream to a video encoder includes the steps of:

storing for each frame in the video data stream a field of a first parity and a field of a second parity;

passing selected stored fields to the video encoder in response to a first output field selection code; and passing no stored fields to the video encoder in response to a second output field selection code wherein the second output field selection code is used to introduce a dead time in the video data stream.

The methods and apparatus of this invention operate on a video data stream and produce a modified video data stream and side channel information. The modified video data stream is organized to improve the efficiency of encoding the video data stream. Preferably, the methods and apparatus of this invention operate in real time. However, the methods and apparatus can also be utilized in non-real time applications.

BRIEF DESCRIPTION OF THE DRAWINGS

FIG. 2A is a representation of a normal 24 frames per second progressive movie sequence.

FIG. 2B is a representation of a normal 24 frames per second progressive movie sequence converted to a 30 frames per second video sequence through a telecine process.

FIG. 2C is a representation of a normal 30 frames per second interlaced video sequence.

FIG. 2D is a representation of two interlaced video sequences, one for a first scene and one for a second scene, that have been combined so that mixed-frame, i.e, one with a scene cut between fields in a frame, is created.

FIG. 2E is a representation of two telecine sequences, one for a first scene and one for a second scene, that have been combined so that a mixed-frame, i.e, one with a scene cut between fields in a frame, is created.

FIG. 24 is a timing diagram for a 128 word page mode write cycle to the VRAM in the reordering memory.

FIG. 25 is a timing diagram for a transfer from the serial port to the output line of the video data stream analyzer of this invention.

DETAILED DESCRIPTION OF THE INVENTION

According to the principles of this invention, a video data stream analyzer modifies, preferably in real time, an input digital video signal so that the resulting output digital signal can be optimally compressed, in one embodiment, using a prior art digital video encoder. The video data stream analyzer of this invention eliminates redundancy, e.g., removes repeated fields, in the input video signal, and reorganizes the input video signal so that the spatial and temporal redundancy is increased, e.g., fixes mid-frame edits and detects and fixes scene cuts.

The modifications to the video signal made by the video data stream analyzer of this invention increase the efficiency of subsequently encoding the video signal. In addition, the video data stream analyzer generates, in real time, side channel information that aids in selecting an appropriate vertical filter, if required, and in appropriately displaying the video data after decoding. Specifically, as described more completely below, the video data stream analyzer generates side channel information that is supplied to the video signal encoder. The side channel information tells the video encoder whether vertical frame-based filtering or vertical field-based filtering is preferable. Additional side channel information specifies the order and duration of the display of the fields after decoding and this information preferably is encoded with the video signal.

The video data stream analyzer provides real time scan detection of the incoming video digital data, and automatically and reliably detects scene cuts, repeated fields, and mixed-field frames in the incoming digital video data, which is sometimes referred to as "an input video data stream," in real time.

The video data stream analyzer modifies the input video data stream by dropping repeated fields and replacing a frame with a scene cut with a frame having identical fields. Hence, the prior art compression inefficiencies introduced by scene cuts, mixed-field frames and repeated fields are either completely eliminated or greatly reduced.

As explained more completely below, the modifications to the input video data stream are either lossless or lossy. If the modifications are lossless, the modified video data stream from the video data stream analyzer can be used to re-generate the original video data in its entirety. On the other hand, if the modification to the video data stream by the video data stream analyzer is lossy, the original video data can not be reproduced exactly.

Figure 1:
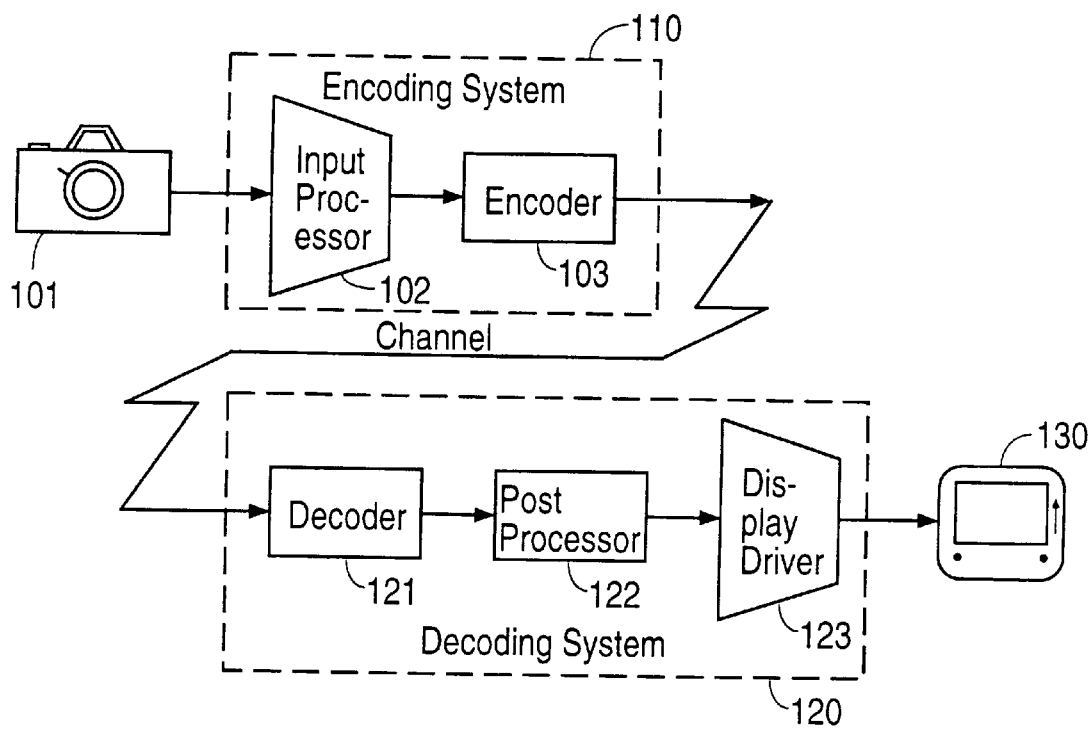
FIG. 1 is a block diagram of a prior art video encoding and decoding systems.
Figure 3:
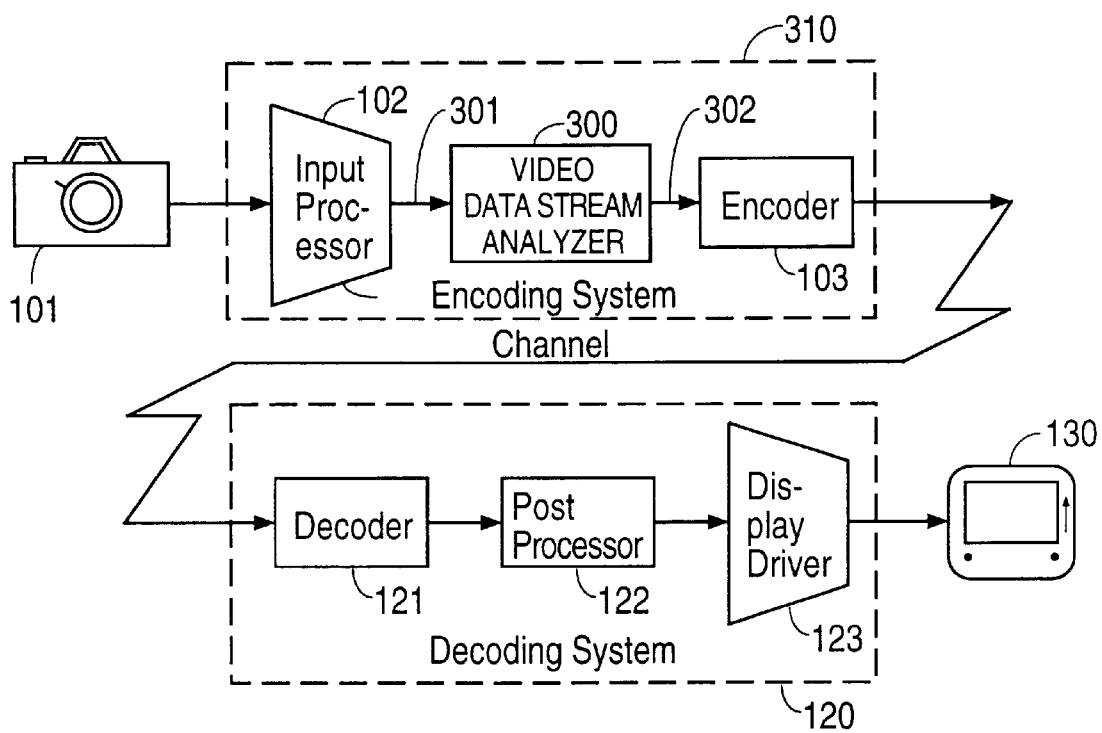
FIG. 3 illustrates the location of the video data stream analyzer of this invention within the prior art encoding system.

Video data stream analyzer 300 of this invention (FIG. 3) is incorporated in prior art digital video encoding system 310 in FIG. 3 between input preprocessor 102 and encoder 103. Hence, video data stream analyzer 300 receives as an input signal 301 the video data stream from input processor 102 and provides a modified video data stream, i.e., an output video data stream 302, as an input signal to encoder 103. As described more completely below, video data stream analyzer 300 also generates information on a side channel (not shown) to encoder 103. The other components in FIG. 3 are identical to the components with the same reference numeral in FIG. 1 and the description of those components is incorporated herein by reference.

Input signal 301 from input processor 102 is a stream of video fields that are accompanied by a field synchronization signal, sometimes called a VSync signal, or simply a field sync. A frame is defined as an adjacent odd-even pair of fields, i.e., a field of a first parity and a field of a second parity.

Each field is accompanied by a signal indicating the parity of the field, i.e., whether the field is an even parity field or an odd parity field. Since as defined herein, a frame always begins with an odd parity field, this signal is used to define a frame boundary and so is referred to herein as the frame synchronization signal.

Input signal 301 may or may not include chrominance data. In one embodiment of this invention, the luminance data is processed and then identical operations are performed on the chrominance data. Thus, any re-ordering of the fields by video data stream analyzer 300 is applied in an identical fashion to the chrominance data. Of course, if additional robustness is desired, the chrominance data could be independently processed by video data stream analyzer 300.

Video data stream analyzer 300 of this invention includes a plurality of features for enhancing the quality of the display in decoding system 120. Specifically, video data stream analyzer 300 automatically detects via a scan detection process if the incoming video data is interlaced or progressive and appropriately organizes the data for subsequent vertical resampling, if any.

If the incoming video data is an interlaced sequence with substantial motion, vertical filtering on a frame grid can cause a significant loss in temporal resolution, because the two fields of an interlaced frame are captured at different time instants. To minimize such a temporal resolution loss, video data stream analyzer 300 specifies in information on the side channel that an interlaced sequence with substantial motion should be filtered on a field grid instead of a frame grid.

On the other hand, in the absence of substantial motion in the interlaced sequence, or in the case of progressively scanned data, vertical filtering on the frame grid is preferable because such filtering renders higher spatial resolution. Hence, for progressively scanned input data and interlaced sequences without substantial motion, video data stream analyzer 300 specifies in the information on the side channel that the video data should be filtered on a frame grid instead of a field grid.

Thus, video data stream analyzer 300 organizes, in one embodiment, the data in output signal 302 differently depending on whether input signal 301 is interlaced. For an interlaced input signal, output signal 302 is specified in the side channel as fields with the odd and even parity fields alternating. For a progressive input signal, output signal 302 is specified in the side channel as frames, i.e, with the odd and even parity fields of a frame interleaved. This designation in the side channel for output signal 302 is well suited for any vertical filtering and re-sampling, if needed. As mentioned above, typically, it is preferable to separate the fields of an interlaced frame before doing any vertical filtering, whereas it is preferable to keep the fields of a progressive frame interleaved. In another embodiment, the scan detection process is not utilized by video data stream analyzer 300 or alternatively, the scan detection process is switched on and off.

In addition to scan detection, video data stream analyzer 300 detects and reverses the effects of the 3:2 pulldown of the telecine operation in real time. Specifically, the repeated fields in a telecine sequence in input video data stream 301 are detected and dropped from output video data stream 302. The repeated fields in the telecine sequence are dropped independent of whether the telecine sequence is interlaced or progressive. Consequently, output video data stream 302 typically includes only conventional frames such as those illustrated in FIGS. 2A and 2C. However, to prevent buffer management problems in decoding system 120, video data stream analyzer 300 introduces, as explained more completely below, dead time intervals in output video data stream 302, i.e., time intervals in which no video data is output in output video data stream 302.

In reality, the periodicity of a telecine mixed-frame pattern in input signal 301 is constant for only a short duration of time. The loss of periodicity is usually a result of different factors such as studio editing of a telecine sequence and addition of noise into the video signal. Two possible effects of these operations are that either the telecine repetitive pattern of repeated fields disappears (because the new sequence is a regular 30 fps NTSC sequence) in input signal 301, or the telecine repetitive pattern in input signal 301 takes on a different phase. As explained more completely below, video data stream analyzer 300 tracks, in real time, such changes in input signal 301 and corrects all telecine mixed-frames that are detected.

Video data stream analyzer 300 also detects and repairs in real time a mid-frame edit created in a transition from an interlaced video sequence to a progressive telecine movie sequence; from a progressive telecine movie sequence to an interlaced video sequence; from a progressive telecine sequence to another progressive telecine sequence; from a cartoon sequence to a video sequence and conversely; and from a cartoon sequence to a telecine movie sequence and conversely. Video data stream analyzer 300 repairs mixed-frames created by these transitions from a first video data type to a second video data type by dropping one of the two fields of the mixed-frame and replacing the dropped field with the other field. This operation is lossy, because the dropped field cannot be subsequently recovered. However, the compression efficiency of a frame-based encoder is considerably enhanced because there is no longer an abrupt change between the fields in a frame. The side channel information generated by video data stream analyzer 300 tells decoder 121 the display order and duration for each field in the video signal so that the repaired frame is properly displayed.

Video data stream analyzer 300 also detects and repairs in real time a mid-frame edit created by a scene cut while maintaining the same video data type. For example, video data stream analyzer 300 detects and repairs each of the possible mid-frame edits created by a scene cut from a first progressive telecine movie sequence to a second progressive telecine movie sequence. Video data stream analyzer 300 repairs mixed-frames created by scene cuts by dropping one of the two fields of the mixed-frame and replacing the dropped field with the other field. The effect is the same as that just described for repair of mixed-frames created by a transition from a first video data type to a second video data type. Alternatively, video data stream analyzer 300 repairs mixed-frames by re-mixing the fields of a mixed-frame such that the scene cut in the middle of the frame is eliminated. Again, the side channel information generated by video data stream analyzer 300 tells decoder 121 the display order and duration for each field in the video signal so that the repaired frame is properly displayed.

Finally, video data stream analyzer 300 detects in real time any sequence in input video data stream 301 that was originally produced at 15 fps and converted to 30 fps by repeating each frame exactly once, e.g., some cartoon sequences. Video data stream analyzer 300 drops the redundant fields in output video data stream 302. The side channel information generated by video data stream analyzer 300 tells decoder 121 the display order and duration for each field in the video signal so that the original cartoon sequence can be recreated.

Figure 4A:
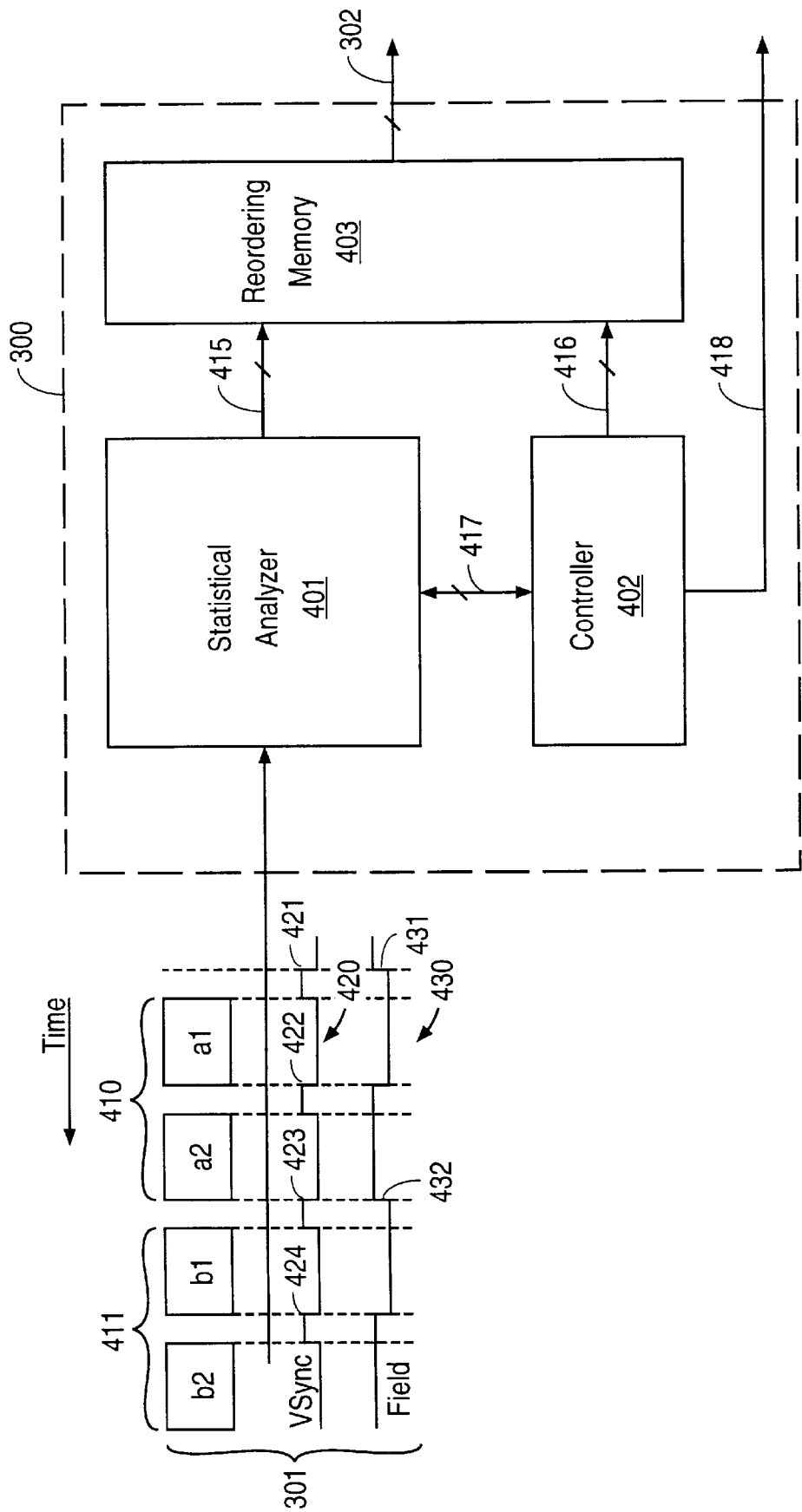
FIG. 4A is a block diagram of one embodiment of the video data stream analyzer of this invention.

FIG. 4A is a more detailed block diagram of video data stream analyzer 300. Statistical analyzer 401 receives input video signal 301. As illustrated in FIG. 4A, input video signal 301 includes a plurality of fields a1, a2, b1, b2 that include luminance data and chrominance data, but, in this embodiment, only the luminance data is analyzed by statistical analyzer 401.

Frame 410 includes a first parity field a1 and a second parity field a2, while frame 411 includes fields b1 and b2 of the first and second parity, respectively. As explained above, each field a1, a2, b1, b2 is accompanied by pulse 421, 422, 423, 424 respectively of a signal 420 called "VSync". Also, each field is associated with a field signal 430 that indicates the field's parity, i.e, even or odd. Since, in this embodiment of the invention, each frame begins with an odd parity field, signal 431 indicating an odd parity field also indicates the start of a frame. Herein, a frame sync is referring to signal 431, for example, that indicates an odd parity field. Most of the operations of controller 402 are triggered by signal VSync.

As input video data stream 301 is clocked in real time, e.g., at 30 fps, through statistical analyzer 401 to reordering memory 403 via bus 415, statistical analyzer 401 generates a plurality of parameters for each field. The plurality of parameters characterize the field, as described more completely below. In one embodiment, the parameters are for a strip of the field. After the parameters for a strip have been generated by statistical analyzer 401 and while parameters for the next strip are being generated, controller 402 retrieves the parameters for the completed strip from statistical analyzer 401 overs lines 417 and stores the parameters.

After a field is clocked through statistical analyzer 401, the field is written into reordering memory 403, which is video random access memory (VRAM). In one embodiment, reordering memory 403 is eight fields deep.

All the parameters for a field from statistical analyzer 401 are available to controller 402 immediately after all the data in the field is loaded into reordering memory 403. Unless otherwise explicitly mentioned, all time instances are measured with respect to the field entering reordering memory 403. Thus, a field sync refers to an edge of field signal 430 that appears immediately after all the data of the field has entered reordering memory 403. Likewise, a frame sync (or frame boundary) refers to an edge of field signal 430 that follows immediately after all the data of a frame, defined as an adjacent odd-even pair of fields, has entered reordering memory 403. Herein, the term "current field" refers to the field that has most recently been completely loaded in reordering memory 403. The term "next field" refers to a field in input signal 301 following the current field. The term "previous field" refers to the field that entered reordering memory 403 just before the current field.

When all the parameters for a field are available, i.e., the field has been loaded in reordering memory 403, controller 402 generates in real time any additional parameters needed using the stored strip parameters. Controller 402 uses the parameters to analyze the field and subsequently analyzes the sequence of fields stored in reordering memory 403. Based on the analysis of the sequence of fields stored in reordering memory 403, controller 402 either chooses via control signals on lines 416 at least one field for output in output video data stream 302 or determines that at this time no fields should be output. Controller 402 also generates side channel display codes, which indicate how to reconstruct the original video input sequence, and format codes, which indicate whether the sequence is progressive or interlaced for side channel 418. Controller 402 also determines the location in reordering memory 403 into which the next incoming field data is placed.

Hence, in this embodiment, controller 402, which includes a statistical processor 490 and a state machine 480 (FIG. 4B), uses the parameters for scan detection, fixing mid-frame edits, detecting scene changes, and removing redundant fields generated either by the 3:2 telecine process, or by changing a 15 fps cartoon sequence to 30 fps video sequence. In one embodiment, controller 402 is a Motorola 68302 microprocessor executing the methods of this invention. The software in Microfiche Appendix A is a non-real time simulation of the operation of video data stream analyzer 300 that was compiled and linked using the C++ compiler "Object Center" sold by Centerline Software of Cambridge, Mass. and executed on a Sparc Station 2 computer (that is sold by Sun MicroSystems, of Mountain View, Calif.) running the Unix operating system.

In view of the disclosure in Microfiche Appendix A, those skilled in the art can implement the processes in Microfiche Appendix A in a real time embodiment. For example, the real time embodiment could be in the C programming language and compiled and linked using the Microtec "C" cross-compiler for the 68000 adapted to run on a Motorola 68302. The object code generated by this process is stored as firmware within video data stream analyzer 300. Moreover, where values or definitions are utilized in Microfiche Appendix A that are different than those given within this detailed description, the values and definitions given in this detailed description are preferred.

The data path through statistical analyzer 401 includes two field memories 450, 451 that are configured in the form of a first-in-first-out memory circuit (FIFO). As the luminance field data of input signal 301 passes through memory 450 and memory 451 into reordering memory 403, three differences are generated by differential accumulators 452, 453, and 454 respectively for subsequent use by controller 402.

Each field is divided into 15 disjoint "strips" of data, where a strip is of 16 adjacent rows of pixels in the field (the implicit assumption here is that each field consists of 240 active lines; however, if the number of active lines in a field is different then the number of strips would be also be different). Preferably, the number of active rows in a strip is selected to be the same as the number of rows used in a block by encoder 103. This selection provides a reasonable tradeoff between hardware complexity and performance. It has been empirically demonstrated that this approach gives adequate performance.

Differential accumulator 452 generates a first parameter for a field, i.e., a difference measure between two strips in successive fields of the same parity. Specifically, the difference measure, a "strip_activity" SA, is calculated by summing the absolute differences between a pixel of the current field, e.g., field a1, and the same pixel of the next field of the same parity. When all the data for a strip has been processed, an interrupt is sent to controller 402, and statistical processor 490 reads strip activity SA for that strip and stores strip activity SA. When all the data of the current field are loaded in reordering memory 103, statistical processor 490 generates an overall "field activity" FA for the current field, i.e., a second parameter, which is the sum of the fifteen strip activities that have been read for the current field. If input signal 301 is noiseless and a field is repeated, each strip activity SA and field activity FA are zero. As explained more completely below, the strip activities and field activity FA for a field are used by controller 402 in the real time detection of repeated fields and scene cuts. Strip activity SA is a cumulative difference measure for a strip while field activity FA is a cumulative difference measure for a field.

Differential accumulator 453 generates a third parameter for the field, i.e., a difference measure between two strips in successive fields of different parity. Specifically, a difference measure, "differential activity" DA, is calculated by summing the absolute differences between a pixel of the current field, e.g., field a1, and the same pixel of the next field of a different parity, e.g., field a2. As indicated above, when all the data for a strip has been processed, the interrupt is sent to controller 402, and statistical processor 490 also reads and stores differential activity DA for that strip.

Since differential activity DA is determined for each strip in a field, each field has fifteen values of differential activity DA, one for each strip. As explained more completely, differential activity DA is used in this embodiment to determine whether fields are interlaced or progressive. However, differential activity DA could also be used for either scene cut or repeated field detection.

Differential accumulator 454 generates a fourth parameter for the field, i.e., a difference measure between every adjacent even-odd line pair belonging to the same field. Specifically, difference measure "intra activity" IA is obtained by summing the absolute differences between pixel pairs belonging to adjacent even and odd lines from the same field. Again, this calculation is done on a strip basis. In other words, pixel differences are obtained between the following line pairs of each strip: (0,1), (2,3), (4,5), . . . , (12,13), (14,15). Differential accumulator 454 is disabled, i.e., does not generate any difference data during every other line time interval so that only a difference measure between every adjacent even-odd line pair is generated.

Again, when all the data for a strip has been processed and the interrupt is sent to controller 402, statistical processor 490 also reads and stores intra-strip activity IA for that strip. The intra-strip activities are used with the differential activities in the scan detection by controller 402 to distinguish between interlaced and progressive input video data.

As explained more completely below, the parameters for each field generated by differential accumulators 452, 453, and 454 are sampled at regular real time intervals and used by controller 402 to determine which field, if any, is repeated in input video data stream 301, and at what point in input video data stream 301 there is a scene cut. In addition, these parameters are used to determine the scan pattern (i.e., whether interlaced or not) of each field-pair combination in the video data stream.

Controller 402, which as described above includes a statistical data processor 490 and a state machine 480, controls the actual writing of the incoming video data stream 301 into a particular location, i.e., field, in reordering memory 403 and as well as the location or locations from which to read the field or fields for the next outgoing frame. In selecting the next outgoing frame, controller 402 must know in real time whether the frame includes a repeated field, a mixed-frame edit, or a scene cut, and whether the frame is interlaced or progressive. In addition to selecting the next outgoing frame, controller 402 also generates the side channel information describing the output signal format and a display code for the frame.

As explained more completely below, controller 402 uses statistical data processor 490 and the parameters from statistical analyzer 401 to determine whether the current field is a repeated field, or a field belonging to a new scene, and whether the current field is part of a sequence that is interlaced or progressive. To make these determinations, statistical data processor 490 uses and updates several thresholds. As explained more completely below, the parameters for the current field are compared against the thresholds to determine, in real time, the characteristics of the current field. At each frame sync, controller 402 records the characteristics of the two fields in the current frame in a plurality of status registers 470, e.g., a scene cut register SC that holds the scene cut history, a repeated field register RF that holds the status of primary criterion, an odd-even compare register OEC that holds the status of secondary criterion, and a scan pattern register SP that holds the scan pattern history. The primary and secondary criteria for a field are described below. Controller 402 also maintains an output counter 460 for indicating when to actually drive a frame onto output line 302. While in this embodiment registers are used, in view of this disclosure those skilled in the art will appreciate that the important aspect is that the information in the registers is stored for future use. Accordingly, storage mechanisms other than registers can be used to implement the principles of this invention.

Figure 5A:
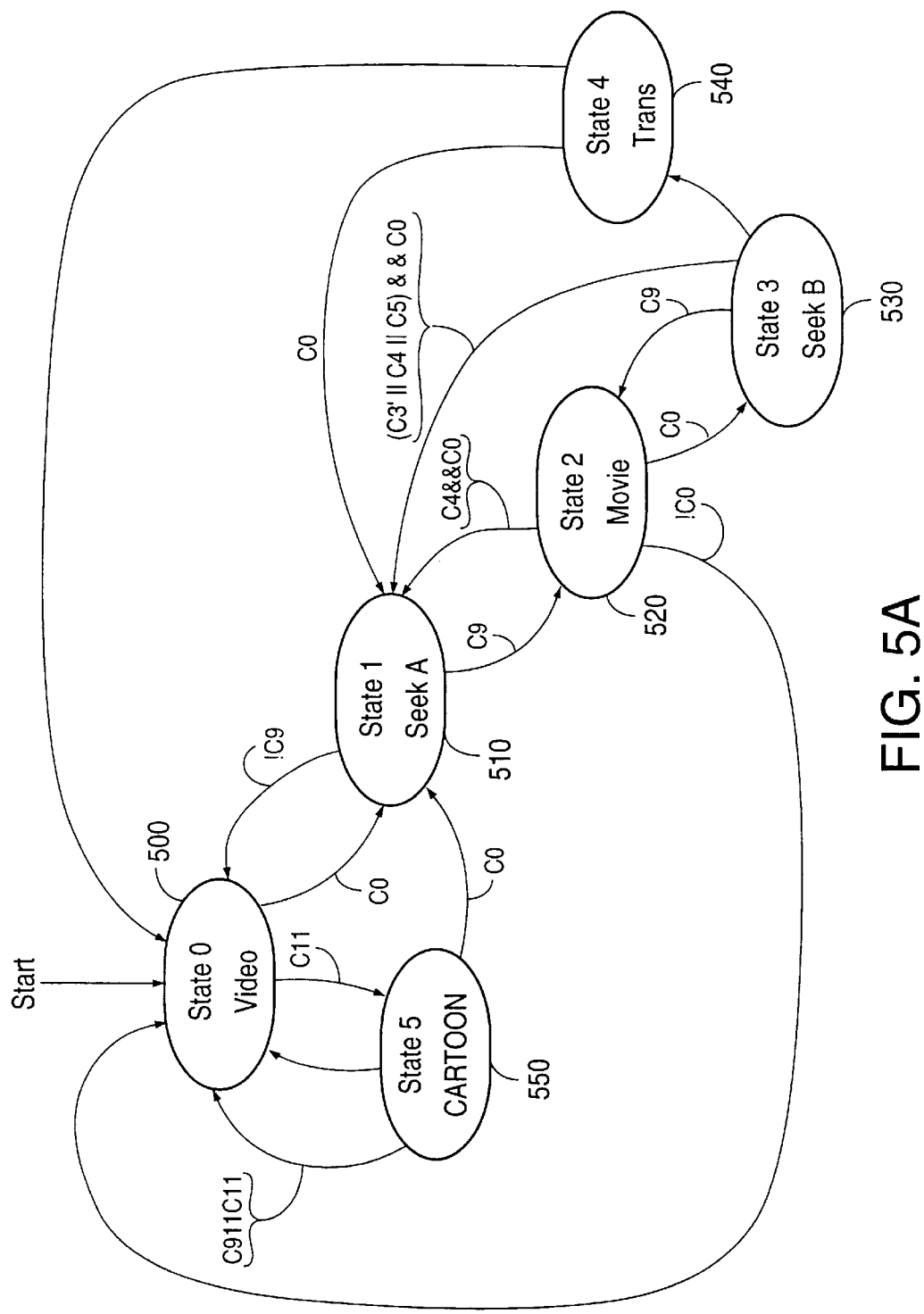
FIG. 5A is a first state diagram for the state machine within the controller of FIGS. 4A and 4B.
Figure 5B:
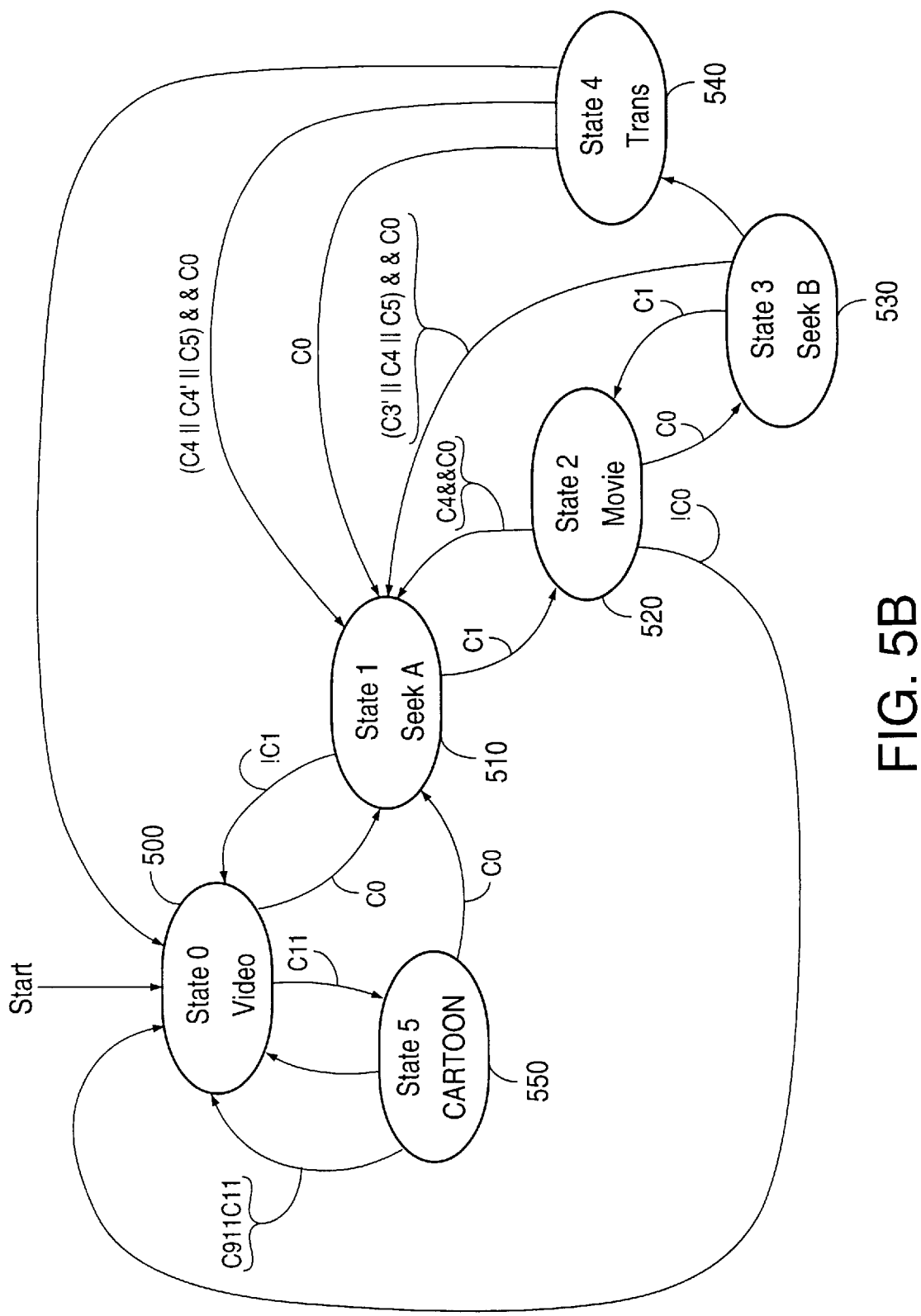
FIG. 5B is a second state diagram for the state machine within the controller of FIGS. 4A and 4B.

In this embodiment, state machine 480, as explained more completely below, has six states, video state 500, seek A state 510, movie state 520, seek B state 530, trans state 540, and cartoon state 550 (FIGS. 5A and 5B). Each state has one or more sub-states. Herein, a sub-state is defined as one field period of time that begins with the field sync preceding the field that is about to enter reordering memory 403, e.g., field sync 420, and ends with field sync 421 that follows after the field is loaded in reordering memory 403. Also, as explained more completely below, the transitions between states and the operations within a state, e.g., which fields in reordering memory 403 are selected for output video data stream 302 during the next sub-states, are determined by status conditions. Each status condition is defined using information in status registers 470. See Table 1 below. In FIGS. 5A and 5B, if a status condition is not given along an arrow from one state to another, the arrow without the status condition is a default selection, i.e, the path indicated by this arrow is chosen if all other relevant status conditions are not true.

The default mode of operation of video data stream analyzer 300 is defined by state zero, i.e., video state 500, of state machine 480. In this mode of operation, input signal 301 is 30 fps and output signal 302 is 30 fps with no re-ordering or dropping of fields. A frame in input signal 301 with a repeated odd parity field and without a repeated even parity field, i.e, status condition C0, indicates to controller 402 that a telecine sequence may be beginning. Consequently, state machine 480 moves from video state 500 to state one, i.e., Seek A state 510.

In seek A state 510, controller 402 examines status registers 470 to determine if the fifth field after the last repeated odd parity field, which is an even parity field, is repeated, i.e, whether status condition C9 is true. If condition C9 is true, i.e., the even parity field that is the fifth field after the last repeated odd parity field is itself a repeated field, state machine 480 moves from state seek A 510 to state two, i.e., movie state 520.

Upon entering movie state 520, controller 402 has detected that input signal 301 is a telecine movie sequence. If the fifth field after the previous repeated even parity field, which is now an odd parity field, is a repeated field, i.e., status condition C0 is true, state machine 480 moves from movie state 520 into state 3, i.e, seek B state 530.

In seek B state 530, controller 402 examines status registers 470 to determine if the fifth field after the last repeated odd parity field, which is an even parity field, is repeated, i.e, whether status condition C9 is true. If condition C9 is true, state machine 480 moves from state seek B 530 to movie state 520. So long as status conditions C0 and C9 are alternately satisfied at every fifth field, state machine 480 oscillates between states 520 and 530.

Seek A state 510 and seek B state 530 are both required because the process of leaving the respective state is different. When controller 402 is in seek B state 530, input signal 301 included at least one repeated odd parity field and one repeated even parity field, at the correct relative locations. Therefore, whenever state machine 480 is in seek state B 530, controller 402 is in the middle of processing a telecine sequence.

Conversely, when controller 402 is in Seek A state 510, only a repeated odd parity field has been detected, but controller 402 must wait to determine whether the appropriate repeated even parity field follows for a telecine sequence. Thus, in Seek A state 510, the fact that input signal 301 is a telecine sequence is not yet established, but the start of telecine sequence is possible. If controller 402 does not find a repeated field at the end of seek A state 510, i.e., status condition C9 is false, state machine 480 moves from seek A state 510 to video state 500. Thus, implicitly assuming that the previous repeated odd parity field was a false alarm.

On the other hand, when controller 402 does not find a repeated field at the end of seek B state 530, i.e, status condition C9 is not true, controller 402 is exiting a telecine sequence, and has to be careful about how the last few frames of the telecine sequence are remixed, e.g., the last frame of the telecine sequence can be any one of "a1a2", "a1b2", "b1c2", "c1c2", or "d1d2". Thus, when status condition C9 is not true, state machine 480 moves by default from seek B state 530 to state 4, i.e., trans state 540.

In trans state 540, controller 402 essentially ascertains which one of the possible five frames in the telecine sequence actually ended the telecine sequence, and ensures that controller 402 only re-mixes the frame(s) appropriately. For example, if the last frame in the telecine sequence was "a1a2", the frame is passed through as output signal 302. However, if last frame in the telecine sequence was frame "b1c2", controller 402 repairs the last two mixed-frames "a1b2" and "b1c2" so that the mixed-frames are not sent. For example, mixed-frames "a1b2" and "b1c2" are both repaired, e.g. sent, as frame "b1b2".

While controller 402 must exit a telecine sequence correctly, controller 402 must also sense the beginning of a new telecine sequence, if there is one, as quickly as possible. Consequently, controller 402 is constantly looking for the beginning of a new telecine sequence. Specifically, controller 402 looks for isolated repeated odd parity fields and transitions to seek A state 510 to look for a repeated even parity field five fields later.

Hence, the numerous arrows showing transitions to seek A state 510 in FIG. 5A.

In video state 500, controller 402 checks status registers 470 to determine whether both even and odd parity fields of the current frame are repeated, i.e., status condition C11 is true. When status condition C11 is true, input signal 301 could possibly be a 15 fps cartoon sequence. Consequently, state machine 480 moves from video state 500 to state five, i.e., cartoon state 550.

Specifically, consider the input cartoon sequence:
a1a2 a1a2 b1b2 b1b2 c1c2 c1c2 d1d2 d1d2 . . .
In video state 500, detection that the first frame "a1a2" is repeated causes the transition from video state 500 to cartoon state 550. However, the confirmation that the input sequence is in fact a cartoon sequence is obtained only when it is determined that the following frame "b1b2", which is different from "a1a2," is also repeated. If the frame following the second "a1a2" frame is not different, most probably the input sequence is a "still" sequence, i.e., with very little motion. It is best to treat a still sequence as video because the compression efficiency of a still sequence is anyway quite high. Thus, in this case, state machine 480 transitions from cartoon state 550 back to video state 500. Further, even if frame "b1b2" is different from the second "a1a2" frame, but frame "b1b2" is not repeated, controller 402 decides that the input sequence is not a cartoon sequence and hence it loops back to video state 500 from cartoon state 550.

As explained more completely below, in each state, controller 402 selects particular fields from reordering memory 403 as output signal 302. In addition to selecting particular fields for output, state machine 480 also determines the time sequence and order of the fields in output video data stream 302. This information is buried in the display code for each output frame, which is available along with each frame as a separate side channel signal from video data stream analyzer 300.

FIG. 5B is similar to FIG. 5A except status condition C9 has been replaced by status condition C1. As explained more completely, status condition C1 is true if a primary criterion for an even parity field is satisfied while status condition C9 is true if both a primary criterion and a secondary criterion are true. Hence, when state machine 480 operates according to the state diagram of FIG. 5A, the operation is more robust than when state machine 480 operates according to the state diagram of FIG. 5B. However, generally, either state diagram provides acceptable real time performance.

The operation of state machine 480 in combination with statistical processor 490 detects and repairs most of the mixed-frames in the 71 possible edit combinations involving video and telecine sequences in input video data stream 301. Appendix I gives the input video data stream 301 in row "In"; the output video data stream 302 in row "Out"; a display code, as defined in Table 3 below, in row "Display code"; and the video sequence displayed by decoding system 120 using after decoding the output video data stream and display code in row "Display." Note that the sequences given in Appendix I are not inclusive of all input video data streams processed by video data stream analyzer 300. Transitions to and from cartoon sequences, for example, are not included in Appendix I.

The input video data streams considered in Appendix I represent a pure video input data stream; a video input data stream that includes a mid-frame edit; the ten possible video to movie transitions; the ten possible movie to video transitions; and the fifty possible movie to movie transitions. The features of video data stream analyzer 300, as explained in more detail below, process each of the various input video data streams given in Appendix I and generate the output video data sequence and display codes given in Appendix I.

If video data stream analyzer 300 does not drop any fields from input video data stream 301, each frame is displayed for exactly two field periods because input and output video data streams 301, 302 as well as the decoded sequences, all are at exactly 30 frames/second, or equivalently, 60 fields/second. However, if video data stream analyzer 300 drops some fields, the transmitted data stream from encoder 103 is no longer at 30 frames/second. In fact, the dropping of fields can be random and consequently, the transmitted frame rate is a non-deterministic value less than 30 frames/second. On the other hand, display device 130 almost invariably refreshes the screen at a fixed rate of 60 fields/second. In such cases, therefore, decoder 121 must display some frames for more than the normal two field periods.

A smart encoder can transmit the display information generated by video data stream analyzer 300 to a smart decoder which in turn can display the video sequence at the correct rate and in a order that is very close to the original sequence. The methodology of encoding and transmitting display codes is an encoder option and is not required to understand the principles of this invention. An example of such an encoder/decoder pair is represented by the MPEG2 standard, that is currently under development. However, note that not all the display codes generated by video data stream analyzer 300 of this invention are covered by the MPEG2 standard.

Since input video data stream 301 to video data stream analyzer 300 is at 60 fields/second and output video data stream 302 may be less than 60 fields/second, synchronization between the input and output video data streams may be required. In one embodiment, synchronization is achieved through insertion of dead time periods in output video data steam 302. A dead time period is an interval of time, equal to a field period, when encoder 103 does not read any data from video data stream analyzer 300. A special output signal in side channel 418 is used to inform encoder 103 that the data in the following field period has been dropped and is not to be read. One dead time period is required for each extra field period in excess of two field periods that a frame is to be displayed.

There are other methods that can be used to achieve synchronization between the input and output video data streams. For example, the field sync preceding a dropped frame can be delayed instead of introducing dead time periods. Additionally, the rate of data output from the reordering memory 403 may or may not be changed. Several of these alternative are presented graphically in FIGS. 6A to 6C.

Figure 6A:
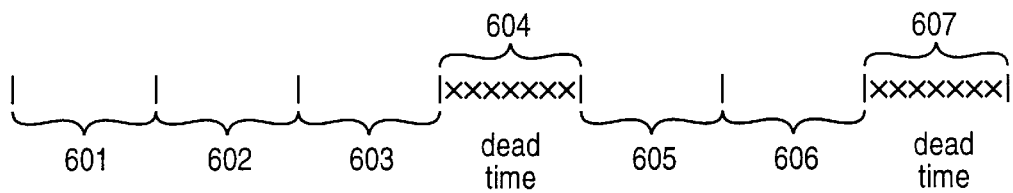
FIGS. 6A to 6C are illustrations of alternative ways to insert dead time intervals in the output data stream of the video data stream analyzer of this invention.

In FIG. 6A, the side channel contains information telling encoder 103 not to read any information from video data stream analyzer 300 during the dead time periods. Each of the tick marks in FIG. 6A represents a field sync. Specifically, data is transmitted to encoder 103 during field periods 601, 602 and 603. During field period 604, encoder 103 is instructed not to read data. Encoder 103 again reads data during field periods 605 and 606 and then is instructed not to read data during field period 607. Field periods 604 and 607 correspond to fields that have been dropped from input video data stream 301.

Figure 6B:
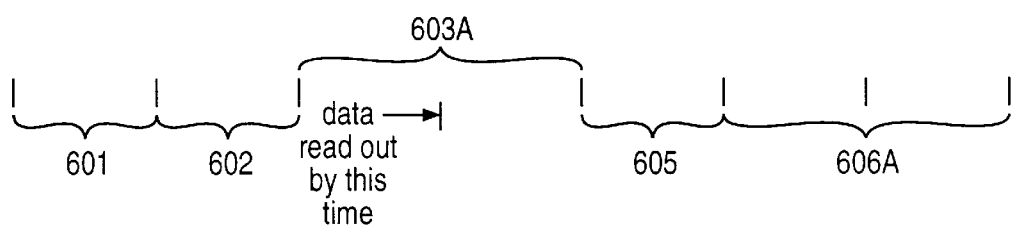

FIG. 6B is an alternative way to achieve the same result as that achieved by the method represented in FIG. 6A. The field syncs preceding fields 601, 602 and 603A are generated in the normal manner and the data rate is the same as in FIG. 6A. However, no field sync is generated at the start of field 604, which was dropped. The next field sync is generated at the start of frame 605. A field sync is generated for frame 606 and the next field sync is generated at the start of frame 608 because field 607 was dropped. During field period 603A (FIG. 6B), which is two field periods in length, all of the data is transferred from video data stream analyzer 300 to encoder 103 during the first field period.

Figure 6C:
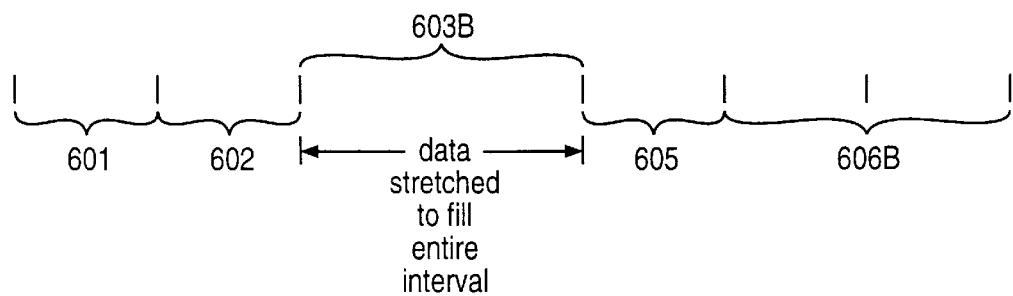

In FIG. 6C, the field syncs are generated in a way that is identical to that described for FIG. 6B. However, in this embodiment, the data rate for field period 603B is modified so that the data in the frame 603B is transferred over the two field periods of field period 603B. The exact method of handling the mapping from a fixed to a variable frame rate is not required to understand the principles of this invention. The important aspect is simply that synchronization is maintained so that decoder 121 can effectively decode the transmitted sequence.

Figure 7A:
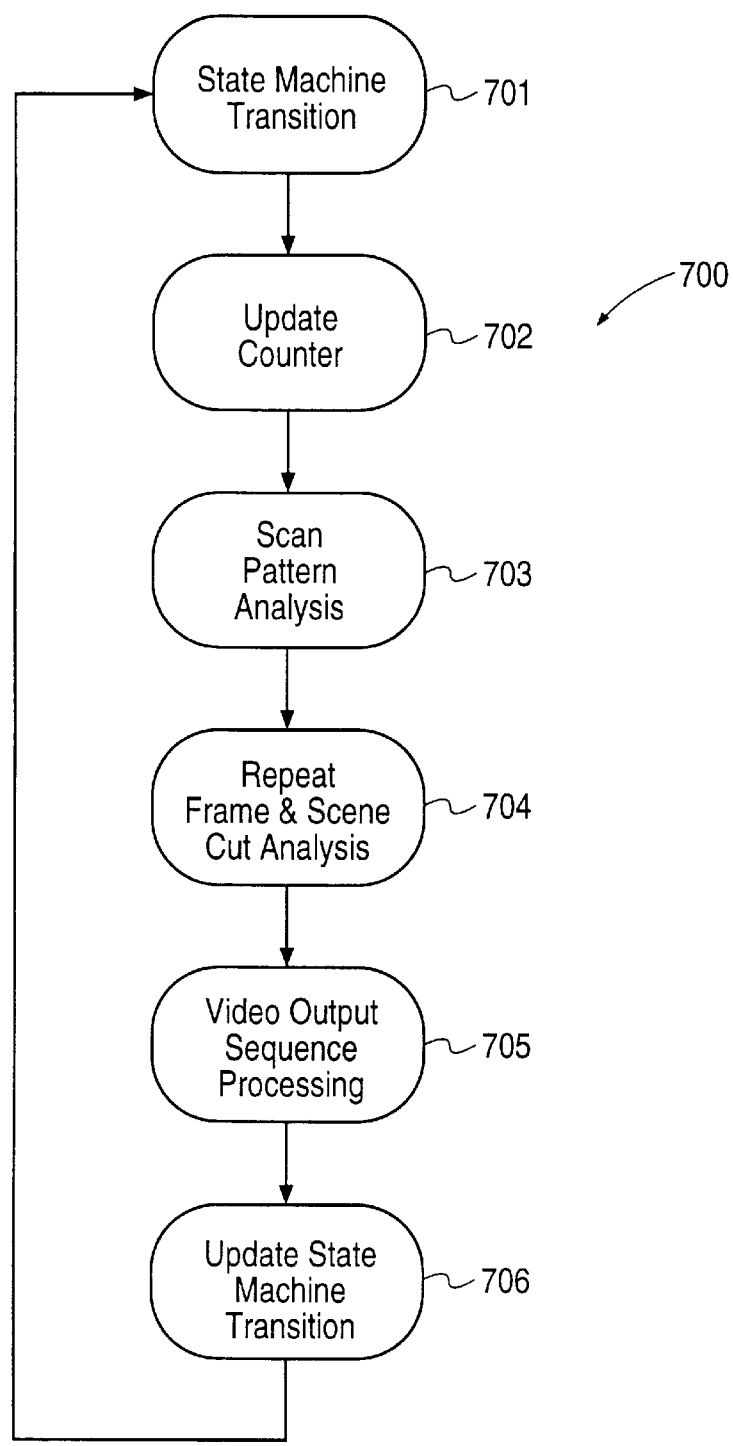
FIG. 7A is a process flow diagram for one embodiment of the process performed by the video data stream analyzer of this invention.

FIG. 7A is a process flow diagram for controller 402. In state machine transition step 701, state machine 480 makes the transition to a new sub-state as indicated by a next state selector and transfers processing to update counter step 702. In update counter step 702, the value of output counter 460 (FIG. 4B), usually referred to as output counter OC, is decremented. As is explained more completely below, output counter 460 is, in this embodiment, a modulo three output counter OC and must have a value of zero before state machine 480 performs the steps necessary to select a field from reordering memory 403 for output video data stream 302.

In scan pattern analysis step 703 (FIG. 7A), parameters used for the scan pattern analysis are updated using the newly available values from statistical analyzer 401 for the current field. After the parameters are updated, statistical processor 490 analyzes the scan pattern and updates the scan pattern history in scan pattern register SP at each field sync. Processing transfers from scan pattern analysis step 703 to repeat frame and scene cut analysis step 704.

In repeat frame and scene cut analysis step 704, parameters and thresholds used for repeat frame and scene cut analyses are updated as required by controller 402 using the newly available values from statistical analyzer 401 for the current field. Scene cut register SC, repeat frame register RF and odd-even compare register OEC are updated at each frame sync. As explained more completely below, in one embodiment, the operations in steps 703 and 704 are intermingled to achieve more efficient processing.

In video output sequence processing step 705, state machine 480 checks the value of modulo three output counter OC. If and only if the value of modulo three output counter OC is zero, state machine 480 executes the operations for the sub-state being processed. Specifically, the addresses for the fields in the next frame that will be in video output data stream 302, the display code for the next frame, the output format (i.e., field or frame) and the new value of modulo three output counter OC are all determined at this time and then processing transfers to step 706. If the value of modulo three output counter OC is not zero, processing transfers directly to step 706.

In step 706, the next sub-state is determined and the next state selector is updated. At the next field sync, process 700 loops from step 706 back to step 701 and the process is repeated for the next sub-state.

The first two steps in process 700 are straightforward and do not require further explanation. However, steps 703, 704, and 705 are more complex and so are described in more detail. The operations in scan pattern detection, scene cut detection, and repeated field analysis are each considered in turn, and then a particular implementation of each process is described.

Figure 7B:
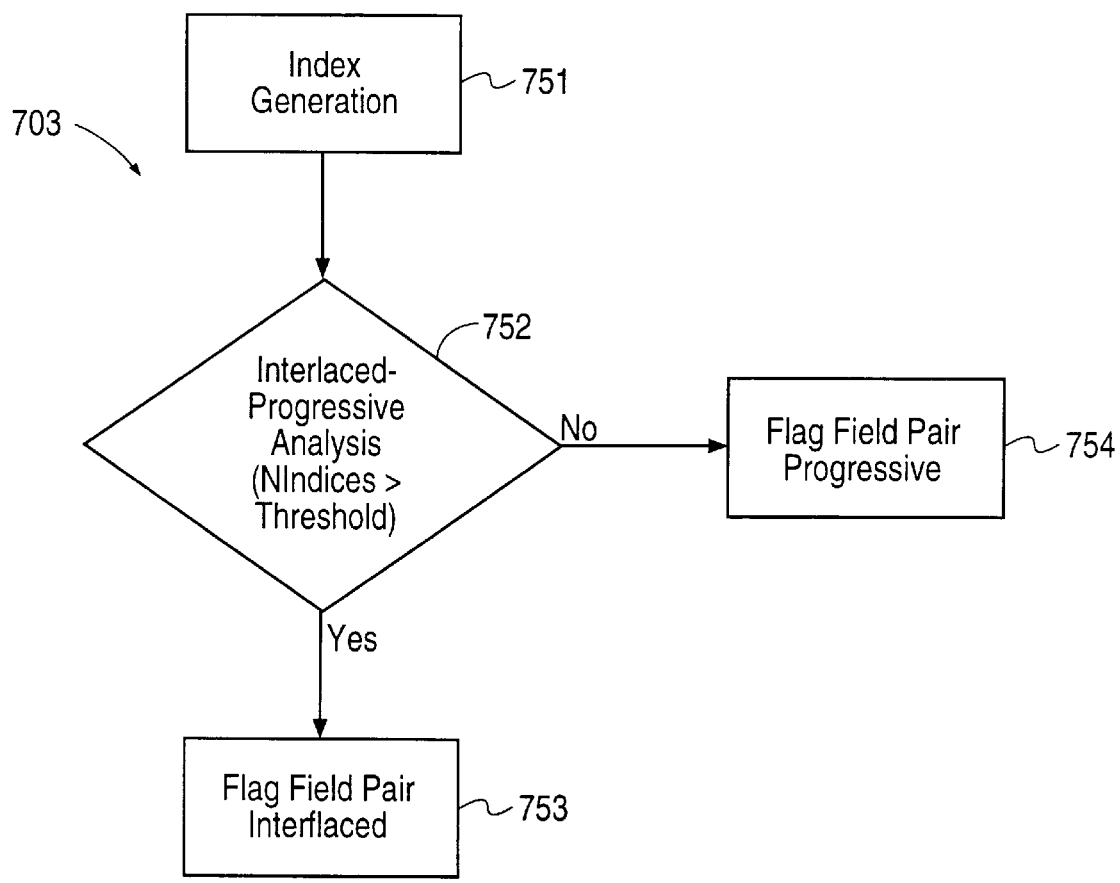
FIG. 7B is a process flow diagram for one embodiment of the scan detection process of this invention.

As explained above, video data stream analyzer 300 analyzes, in real time, input video data stream 301 to determine whether the video sequence has a progressive or an interlaced format. This input scan detection is done in a scan pattern analysis process 703 (FIG. 7B) within controller 402. Scan pattern analysis process 703 is performed for each field pair in input video data stream 301. In index generation step 751, a plurality of scan pattern activity indices for a field pair are generated by controller 402, using parameters from statistical analyzer 401, i.e., the characteristics of each field pair in input video data stream 301 are monitored. In one embodiment, each scan pattern activity index is a strip inter-intra index. In interlaced-progressive analysis step 752, each of the scan pattern activity indices are compared to a scan pattern threshold. If a predetermined number of the scan pattern activity indices are greater than the scan pattern threshold, the field pair is identified as interlaced in step 753 and otherwise as progressive in step 754.

Specifically, in one embodiment of scan pattern analysis process 703, two parameters, differential strip activity DA from differential accumulator 453 and intra-strip activity IA from differential accumulator 454, are utilized. If the current field is an odd parity field, intra-strip activity for each strip is stored in random access memory as odd intra-strip activity IAODD-i, where "i" is the strip number, by controller 402 and conversely if the current field is an even parity field, intra-strip activity IA for each strip is stored in the random access memory as even intra-strip activity IAEVEN-i. Note that the field-pair under consideration consists of the current field and its immediately preceding field. Thus, one of the intra-strip activities represents the current field, while the other intra-strip activity represents the previous field. The differential strip activity DA for each strip represents the strips in the previous field and is thus the inter field difference activity measure between the previous field and the current field.

An interlaced/progressive decision is made in the scan pattern analysis process for each pair of adjacent fields in input video data stream 301, i.e., for every odd-even and even-odd pair of fields. The scan pattern information for every odd-even and even-odd pair of fields is used by controller 402, as described more completely below. Briefly, controller 402 can re-order fields in output data stream 302 so that the odd field of one frame and the even field of the preceding frame constitute a new frame. The even-odd pair scan pattern analysis is used to determine the scan pattern of the new frame.

Figure 7C:
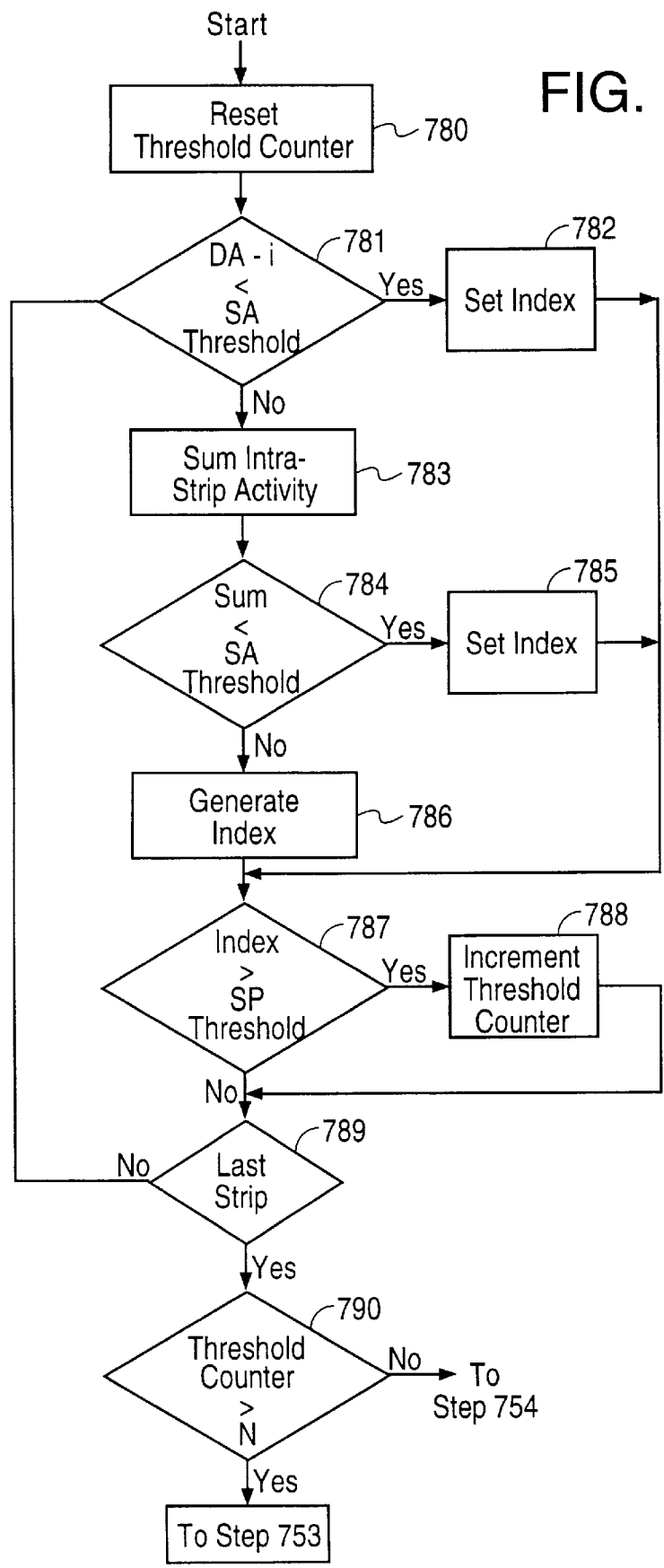
FIG. 7C is a more detailed process flow diagram for selected steps in the scan detection process of FIG. 7B.

For each field pair in the input data stream, a plurality of inter-intra indices R-i, i.e., scan pattern activity indices, are utilized to make the interlaced/progressive decision. Specifically, one embodiment of steps 751 and 752 of scan pattern analysis process 703 is illustrated in FIG. 7C. Initially, in step 780, a threshold counter is reset and processing transfers to step 781. In step 781, differential activity DA-i for strip "i" is tested against a strip activity threshold T_m. The definition, updating, and resetting of strip activity threshold T_m is described more completely below. If differential activity DA-i is greater than strip activity threshold T-m, processing transfers to step 783 and otherwise to step 782.

In first set index step 782, inter-intra index R-i for strip "i" is set to a value less than the scan pattern threshold. Processing transfers from set index step 782 to index test step 787.

In sum intra-strip activity step 783, the sum of the odd intra-strip activity IAODD-i and even intra-strip activity IAEVEN-i for strip "i," is generated. Processing transfers from sum intra-strip activity step 783 to step 784.

In sum test step 784, the sum of the odd intra-strip activity IAODD-i and even intra-strip activity IAEVEN-i is tested against a strip activity threshold T_m. If the sum of the odd intra-strip activity IAODD-i and even intra-strip activity IAEVEN-i is greater than strip activity threshold T_m, processing transfers to step 786 and otherwise to step 785.

In second set index step 785, inter-intra index R-i for strip "i" is set to a value greater than the scan pattern threshold. Processing transfers from set index step 785 to index test step 787.

In generate index 786, inter-intra index R-i is defined, in this embodiment, as the ratio of differential activity DA-i for strip "i" of the two fields to the sum of the odd intra-strip activity IAODD-i and even intra-strip activity IAEVEN-i for strip "i," i.e., $$R\text{-}i = \frac{DA\text{-}i}{IAODD\text{-}i + IAEVEN\text{-}i}$$

After generation of inter-intra index R-i for strip "i", processing transfers to index test step 787.

In index test step 787, inter-intra index R-i is tested against the scan pattern threshold. If inter-intra index R-i is less than scan pattern threshold, processing transfers to last strip test step 789 and conversely to increment threshold counter 788, which in turn increments the threshold counter to indicate that inter-intra index R-i is greater than the scan pattern threshold. Processing transfers from step 788 to step 789.

Step 789 determines whether all the strips in a field have been processed. If additional strips remain to process, processing branches to step 781 and steps 781 to steps 788 are repeated as required. If all the strips have been processed, processing transfers from step 789 to step 790.

In threshold counter check step 790, if three or more strips out of the fifteen strips, i.e., a predetermined number, have an inter-intra index R-i that exceeds unity, i.e, the scan pattern threshold, the pair of fields is flagged as interlaced in step 753. Otherwise, the pair is flagged as progressive in step 754. Specifically, the value of the threshold counter is checked against the predetermined number N and the process branches to either step 753 or step 754, as described. The embodiment of steps 751 and 752 given in FIG. 7C is illustrative only and is not intended to limit the invention to the particular sequence of steps described. In view of this disclosure, those skilled in the art can implement the real time scan pattern detection process in a variety of ways.

Thus, in this embodiment, real-time scan pattern detection is based on generating an inter-intra index for each strip of two successive opposite parity fields. The index is obtained either by setting the index to a particular value or by dividing the differential activity metric, i.e, differential activity DA-i, between the two successive opposite parity fields by the sum of the metrics representing the intra field activities of the two fields. If three or more of the indices for strips in the field exceed the threshold, the frame consisting of the field pair is declared interlaced, else the frame is declared as progressive.

As explained above, the differential activity metric measures the pixel-to-pixel difference between adjacent lines of a frame because the corresponding lines of two successive fields form adjacent lines of that frame. The intra-activity metric measures the pixel-to-pixel difference between adjacent lines of the field.

The two fields of an interlaced frame are temporally disjoint. Hence, the correlation between adjacent lines of an interlaced frame, i.e., between two lines belonging to different fields of the frame, is lower than the correlation between lines belonging to the same field, i.e., lines that were captured at approximately the same time. Thus, the inter-intra index is expected to be greater than unity for an interlaced frame.

On the other hand, a progressive frame has all its lines captured at the same time instant. As a result, the correlation between adjacent lines, indicated in a way by the differential activity metric, is likely to be greater than that between alternate lines since the former are spatially closer. In such cases, the inter-intra index is likely to be less than unity. The value of three for the number of strips whose indices exceed unity was chosen empirically. This analysis is performed on a strip by strip basis because such an analysis improves the chances of capturing localized activity in the frame.

In one embodiment, scan pattern register SP is an eight bit register that is used to store the scan pattern history of the last eight field-pairs. As explained above the scan pattern analysis process is performed after every field sync. Scan pattern register SP is updated as follows: if the field-pair is interlaced, a one is shifted in from the right, i.e, entered as the least significant bit of register SP, else a zero is shifted in as the least significant bit. The most significant bit MSB of register SP is discarded. In this embodiment, the size of the scan pattern register is selected so that the number of bits is equal to the number of fields that can be stored in reordering memory 403.

Hence, scan pattern analysis process 703 determines in real time whether a field pair in input video data stream 301 is in a progressive or interlaced format. For each field-pair the format is recorded in scan pattern register SP for subsequent use by state machine 480.

Repeated field and scene cut analysis processes use several threshold values in conjunction with strip activities SA and field activities FA. Recall that for a particular field, field activity FA is the sum of strip activities SA-i, i=1, 2, . . . , n for the field. In this embodiment, the number of strips n is fifteen.

The repeated field analysis process uses both strip activities and field activity FA to check if any two successive fields of the same parity are identical, i.e., if the second field is merely a repetition of the first. In some situations, field activity FA may be sufficient to detect repeated fields. However, in general, strip activities make the detection of repeated fields more robust. The reason is that sometimes only a small portion of a field may change, and this change may not be captured by using only field activity FA, i.e, the field would be flagged as a repeated field when in fact the field was not a repeated field. Since one of repeated fields is dropped, the erroneous flagging may affect the visual quality of the display because the human eye may catch the change in the video sequence. Using strip activities SA in addition to field activity FA increases the likelihood of catching localized changes in the field.

Two different decision criteria are used, a primary and a secondary criterion that are described more completely below, in the repeated field decision analysis. Preferably, both criteria are used for both odd and even parity fields. However, for one embodiment, in the case of odd parity fields, both of the criteria may be used in the repeated field decision analysis, and in the case of even parity fields, the primary criterion is sufficient to make the repeated field decision and the secondary criterion is not used, although the secondary criterion is evaluated. In general the repeated field decision analysis can be performed using only the primary criterion, only the secondary criterion, or the combinations of primary and secondary criteria just described.

Prior to considering detection of repeated fields more completely, the detection of scene cuts is described. As described below, information from the scene cut analysis, i.e., a threshold, may be used in the repeated field analysis, and the repeated field analysis is used in updating thresholds in the scene cut analysis. Therefore, it is informative to consider the scene cut analysis and then return to a more detailed description of the repeated field analysis.

Figure 8A:
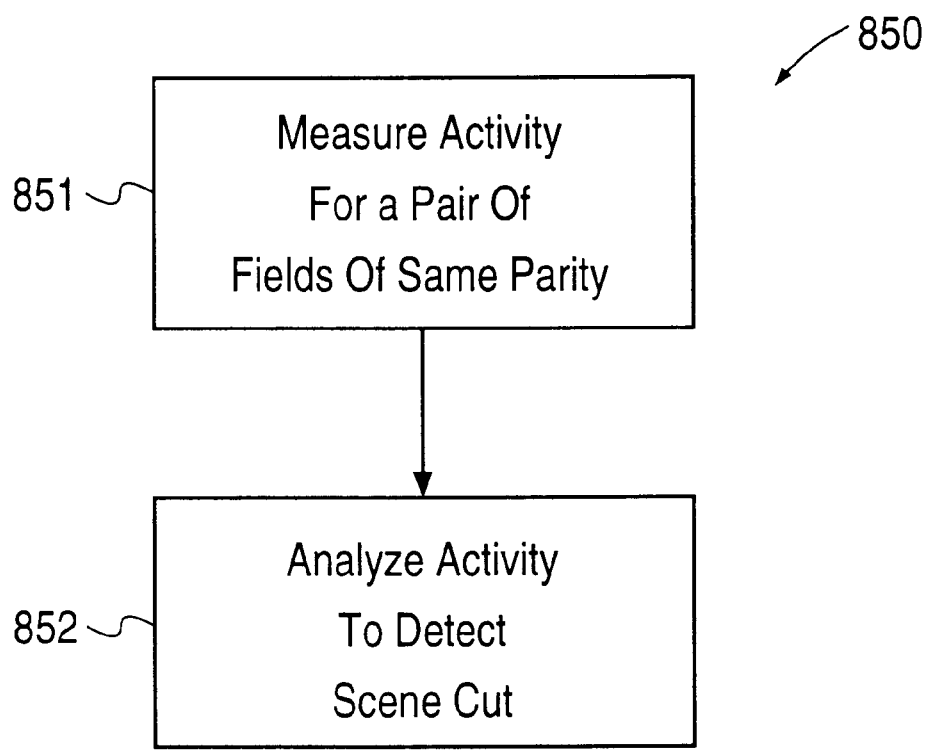
FIG. 8A is a process flow diagram for one embodiment of the scene cut detection process of this invention.

In scene cut analysis process 850 (FIG. 8A), in step 851, a cumulative difference in activity between a first field of a given parity and a second field of the given parity is measured. Specifically, statistical analyzer 401 generates a plurality of strip activities, as described above, and controller 402 generates a field activity FA.

In step 852, the cumulative difference in activity is used to detect a scene cut, preferably in real time. Specifically, a scene cut is identified if the cumulative difference is greater than a scene cut threshold. Whenever there is a scene cut in input video data stream 301, there is a sudden jump in the value of the field activities FAs of the last two fields of the old scene. This is because, the two fields processed by differential accumulator 452 are now drastically different. Thus, by comparing the field activity of each field to typical field activities for the scene, i.e, a threshold, a change in scene can be detected.

In this embodiment of process 850, typical field activities are maintained for odd parity fields and even parity fields. Specifically, an odd scene cut threshold $T\_s1$ and an even scene cut threshold $T\_s2$ are used to determine when a scene cut occurred. As explained more completely below, odd scene cut threshold $T\_s1$ is a running average of the field activities for the odd parity fields in a scene. Similarly, even scene cut threshold $T\_s2$ is a running average of the field activities for the even parity fields in the scene.

If the current field is odd, field activity FA is compared to odd scene cut threshold $T\_s1$ in step 852. Specifically, to assure that a scene cut has occurred and the change in field activity FA is not caused by noise or some other spurious activity, for an odd parity field, the field activity FA must be substantially greater than odd scene cut threshold $T\_s1$. In one embodiment, field activity FA of an odd parity field must be greater than a constant $K\_s1$ times scene cut threshold $T\_s1$, i.e., $K\_s1*T\_s1$, and greater than a constant $N\_s1$ times field activity threshold $T\_n$, which is described more completely below, i.e., greater than $N\_s1*T\_n$. In one embodiment constant $K\_s1$ is 1.75 and constant $N\_s1$ is 3.5. The requirement that field activity FA is greater than $N\_s1*T\_n$ assures that field activity FA has a minimum value before a scene cut is declared. Hence, when field activity FA of an odd parity field is greater than $K\_s1*T\_s1$ and greater than $N\_s1*T\_n$, the current odd parity field and the next odd parity field are declared, i.e., identified, as belonging to different scenes. Hence, in this embodiment, the threshold has two components, and field activity FA must be greater than both components.

Similarly, for an even parity field, the field activity FA must be greater than even scene cut threshold $T\_s2$. Preferably, field activity FA must be greater than a constant $K\_s2$ times even scene cut thresholds $T\_s2$, i.e., $K\_s2*T\_s2$, and greater than a constant $N\_s2$ times field activity threshold $T\_n$, i.e, $N\_s2*T\_n$. In one embodiment, constant $K\_s2$ is 1.75 and constant $N\_s2$ is 3.5. Hence, when field activity FA for an even parity field is greater than $K\_s2*T\_s2$ and greater than $N\_s2*T\_n$, the current even parity field and the next even parity field are declared, i.e., identified, as belonging to different scenes. Hence, in this embodiment, the threshold has two components, and field activity FA must be greater than both components.

In one embodiment, scene cut register SC is an eight bit register that is used to store the scene cut history of the last eight fields. At each frame boundary, scene cut register SC is updated by shifting in two bits from the right as explained below. The two most significant bits of register SC are discarded.

Scene cut register SC is updated at each frame boundary as follows: if a scene cut was detected at the last odd parity field, the first bit shifted in is a one, and conversely a zero is shifted in; and if a scene cut was detected at the last even parity field, the second bit shifted in is a one and conversely a zero is shifted in. Thus, analysis of the bit pattern in scan cut register SC identifies whether a scene cut occurred within a frame or at a frame boundary.

Figure 8B:
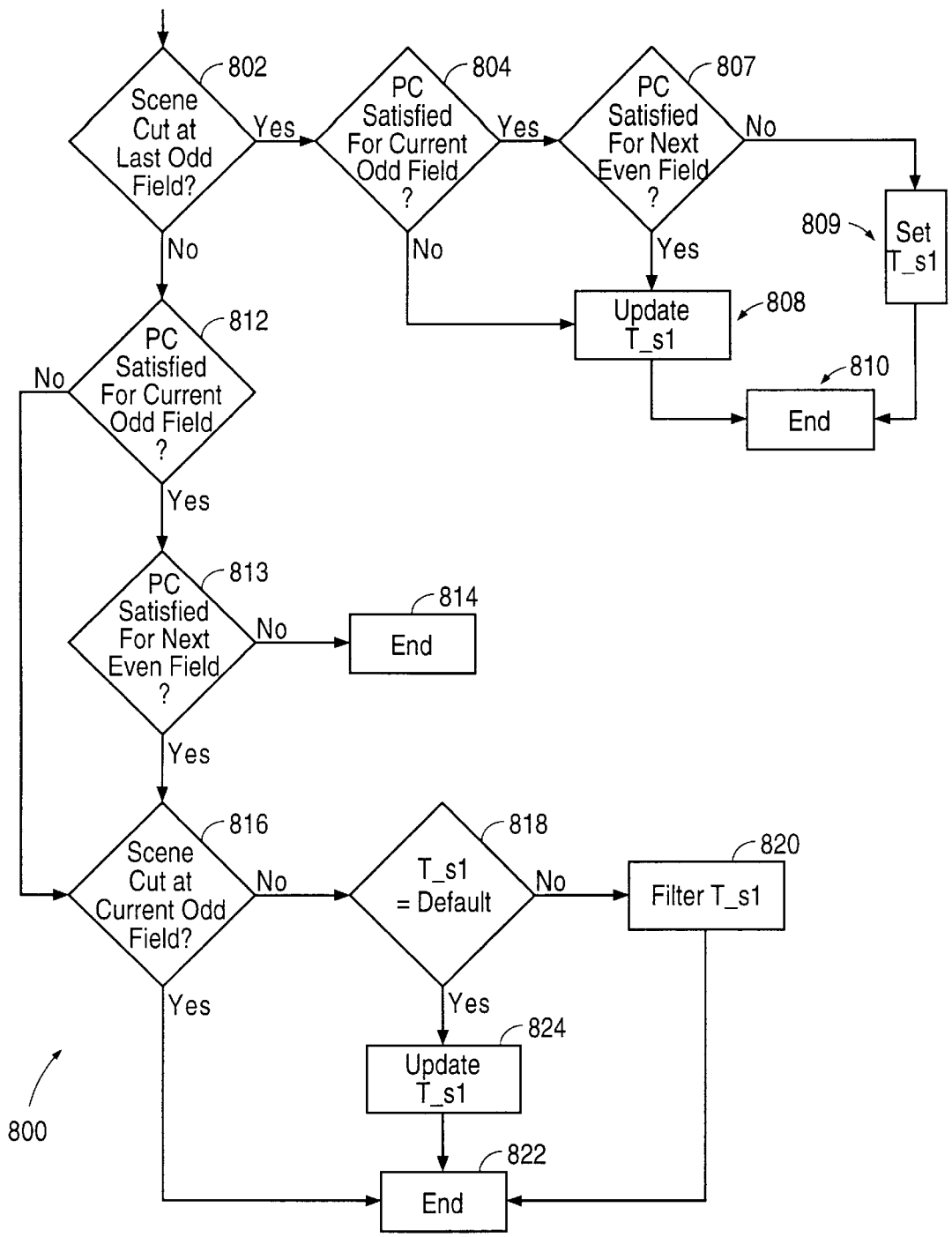
FIG. 8B is a process flow diagram for one embodiment of the updating of the scene cut threshold for odd parity fields.

Scene cut thresholds $T\_s1$ and $T\_s2$, are running parameters and at each frame boundary, an analysis is performed to determine how to update the thresholds. Process 800 illustrated in FIG. 8B is used to analyze odd scene cut threshold $T\_s1$. In process 800, various criteria and flags are checked. As explained more completely below, each piece of information used in process 800 is available at the time process 800 is performed.

In scene cut at last odd parity field step 802, an odd parity field scene cut flag is checked to determine if there was a scene cut at the previous odd parity field. Each time a scene cut is detected at an odd parity field in process 850 (FIG.

8A), the odd parity field scene -cut flag is set and conversely. Alternatively, the second bit in scene cut register SC could be examined. If the odd parity field scene cut flag is set, processing transfers to step 804 and conversely to step 812.

If a scene cut was detected at the last odd parity field, step 804 determines whether the primary criterion for repeated field detection for the current odd parity field is satisfied. If the primary criterion is not satisfied, processing transfers to a first update step 808. Update step 808 sets odd scene cut threshold T_s1 equal to field activity FA for the current odd parity field.

Conversely if the primary criterion for the current odd parity field is satisfied, processing transfers from step 804 to step 807. In step 807, if the primary criterion for the next even parity field was satisfied, processing transfers from step 807 to step 808 that was just described. Here, the next even parity field means the field immediately following the current odd parity field. In step 807, if the primary criterion for the next even parity field was not satisfied, processing transfers from step 807 to step 809. Step 809 sets odd scene cut threshold T_s1 to the default value. In one embodiment, the default value for odd scene cut threshold T_s1 is 40.667*N_f, where N_f is the number of pixels in a field. Both step 809 and step 808 transfer to end step 810 upon completion. The check performed by step 807 distinguishes between the case where both the odd and even parity fields are repeated and the case where only the odd parity field is repeated.

If a scene cut was not detected at the last odd parity field in step 802, step 812 checks to determine if the primary criterion for repeated field detection for the current odd parity field is satisfied. If the primary criterion is satisfied, processing transfers to step 813 and otherwise to step 816.

Primary criterion satisfied for next even parity field step 813 checks to determine whether the primary criterion for the next even parity field was satisfied. If the primary criterion was not satisfied processing transfers from step 813 to end step 814 and so even scene cut threshold T_s1 is not changed. If the primary criterion was satisfied, processing transfers from step 813 to scene cut at current odd parity field step 816.

Step 816 compares odd scene cut threshold T_s1 with field activity FA for the current odd parity field, as described above. If a scene cut is detected, processing transfers from step 816 to end step 822 so that in this case, threshold T_s1 is not changed.

If step 816 shows that there is no scene cut processing transfers to step 818. Step 818 determines whether odd scene cut threshold T_s1 is equal to the default value. If odd scene cut threshold T_s1 is equal to the default value, processing transfers from step 818 to a second update step 824 which in turn sets odd scene cut threshold T_s1 equal to field activity FA for the current field.

If odd scene cut threshold T_s1 is not equal to the default value, processing transfers from step 818 to a filter step 820. In step 820, a recursive filter is used to determine the new value of odd scene cut threshold T_s1. In one embodiment, the new odd scene cut threshold T_s1 is:

$$T\_s1 = (\alpha * (T\_s1) + (1-\alpha) * FA).$$

Constant $\alpha$ is in the range from zero to one and in one embodiment is 0.1. Upon completion of step 820, processing transfers to end step 822. In end steps 810, 814 and 822, if odd scene cut threshold T_s1 is less than 2*N_f, threshold T_s1 is set to 2*N_f, i.e., the threshold is clamped at a minimum level.

Figure 8C:
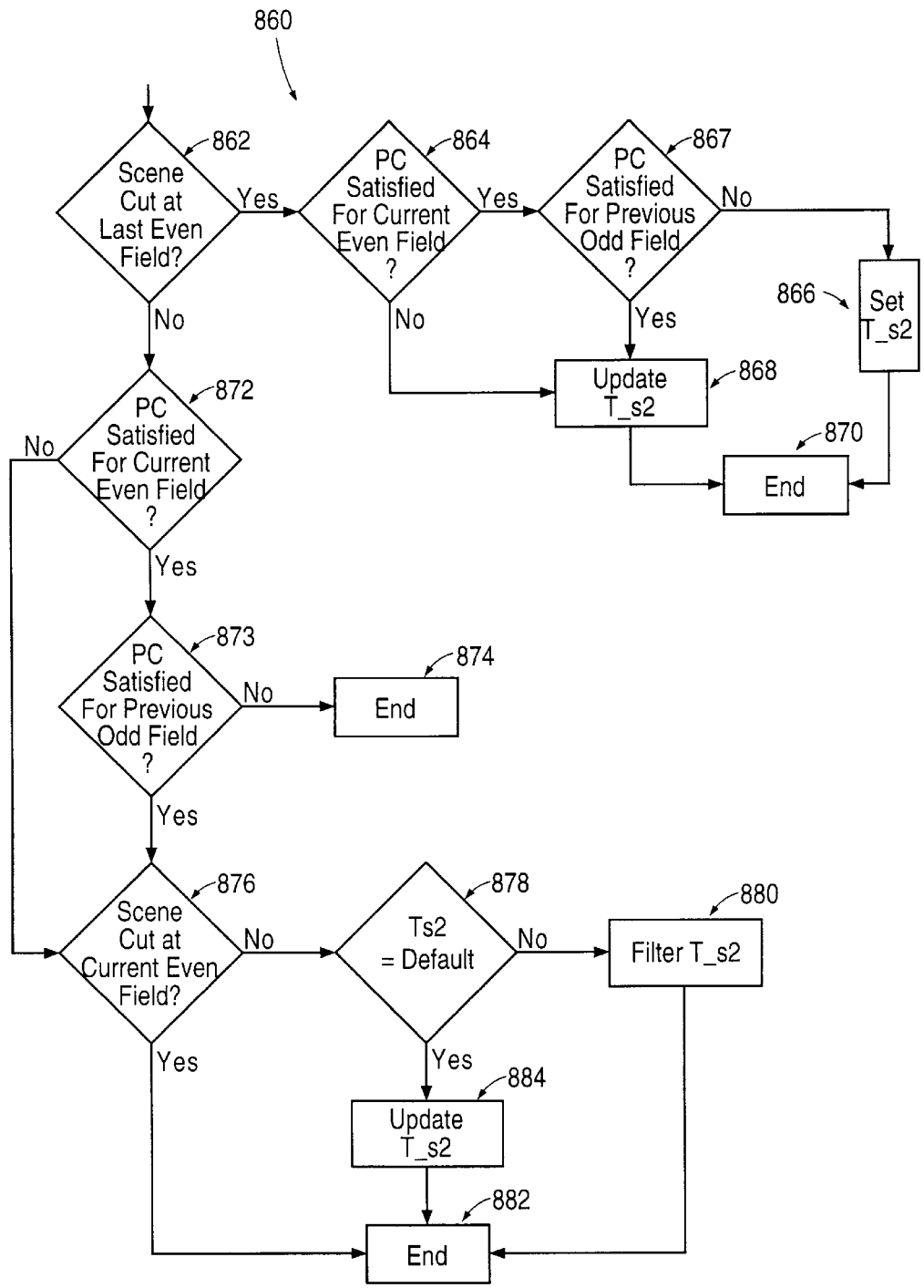
FIG. 8C is a process flow diagram for one embodiment of the updating of the scene cut threshold for even parity fields.

The updating of even scene cut threshold T_s2 is similar to that of odd scene cut threshold T_s1. Process 860 illustrated in FIG. 8C is used to analyze even scene cut threshold T_s2. Again, as explained more completely below, all the information needed in process 860 is available at the time the process is performed.

In scene cut at last even parity field step 862, an even parity field scene cut flag is checked to determine if there was a scene cut at the previous even parity field. Each time a scene cut is detected at an even parity field in process 850 (FIG. 8A), the even parity field scene cut flag is set and conversely. Alternatively, the first bit in scene cut register SC could be examined. If the even parity field scene cut flag is set, processing transfers from step 862 to step 864 and conversely to step 872.

If a scene cut was detected at the last even parity field, step 864 determines whether the primary criterion for repeated field detection for the current even parity field is satisfied. If the primary criterion is not satisfied, processing transfers to a first update step 868. Update step 868 sets even scene cut threshold T_s2 equal to field activity FA for the current even parity field.

Conversely if the primary criterion for the current even parity field is satisfied, processing transfers from step 864 to step 867. In step 867, if the primary criterion for the previous odd parity field was satisfied, processing transfers from step 867 to step 868 that was just described. Conversely, in step 867, if the primary criterion for the previous odd parity field was not satisfied, processing transfers from step 867 to step 866. Step 866 sets even scene cut threshold T_s2 to the default value. Both step 866 and step 868 transfer to end step 870 upon completion. The check performed by step 867 distinguishes between the case where both the odd and even parity fields are repeated and the case where only the even parity field is repeated.

If a scene cut was not detected at the last even parity field in step 862, step 872 checks to determine if the primary criterion for repeated field detection for the current even parity field is satisfied. If the primary criterion is satisfied, processing transfers to step 873 and otherwise to step 876.

Primary criterion satisfied for previous odd parity field step 873 checks to determine whether the primary criterion for the previous odd parity field was satisfied. If the primary criterion was not satisfied, processing transfers from step 873 to end step 874 and so even scene cut threshold T_s2 is not changed. If the primary criterion was satisfied, processing transfers from step 873 to scene cut at current even parity field step 876.

Step 876 compares even scene cut threshold T_s2 with field activity FA for the current even parity field, as described above. If a scene cut is detected, processing transfers from step 876 to end step 882 so that in this case, threshold T_s2 is not changed.

If step 876 shows that there is no scene cut processing transfers to step 878. Step 878 determines whether even scene cut threshold T_s2 is equal to the default value. In one embodiment, the default value for even scene cut threshold T_s2 is 40.667*N_f, where N_f is the number of pixels in a field. If even scene cut threshold T_s2 is equal to the default value, processing transfers from step 878 to a second update step 884 which in turn sets even scene cut threshold T_s2 equal to field activity FA for the current field.

If even scene cut threshold T_s2 is not equal to the default value, processing transfers from step 878 to a filter step 880. In step 880, a recursive filter is used to determine the new value of even scene cut threshold T_s2. In one embodiment, the new even scene cut threshold T_s2 is:

$$T\_s2 = (\alpha * (T\_s2) + (1-\alpha) * FA).$$

Constant $\alpha$ is in the range from zero to one and in one embodiment is 0.1. Upon completion of step 880, processing transfers to end step 882. In end steps 870, 874 and 882, if even scene cut threshold T_s2 is less than 2*N_f, threshold T_s2 is set to 2*N_f, i,e., the threshold is clamped at a minimum level.

Hence, under "normal" conditions, thresholds T_s1 and T_s2 are updated using a "recursive filter". The numbers "0.9" and "0.1" currently used in the recursive filters were obtained empirically. However, "abnormal" conditions, i.e., sudden deviations in field activity FA, are ignored. Such sudden deviations can be introduced by repeated fields when field activity FA is very small and hence not a realistic indicator of the field-to-field activity, and by scene cuts when field activity FA is suddenly very high, and again does not indicate the normal field-to-field activity. Hence, the numerous tests in processes 800 and 860 are utilized to detect possibly abnormal conditions and prevent such conditions from biasing the thresholds used in the scene cut detection process of this invention.

Returning to the repeated field detection and the evaluation of the primary and secondary criteria, two different thresholds T_n and T_m, are used in evaluating whether the primary criterion is satisfied. Each strip activity SA-i for the pair of fields being processed is compared to strip activity threshold T_m, and field activity FA for the pair of fields being processed is compared to field activity threshold T_n. Recall that the pair of fields being processed is the current field and the next field having the same parity as the current field. The strip activities and the field activity are associated with the current field. If either two or more strip activities exceed strip activity threshold T_m, or field activity FA exceeds field activity threshold T_n, the primary criterion is not satisfied; otherwise, the primary criterion is satisfied. Specifically, the primary criterion is satisfied if field activity FA is less than or equal to field activity threshold T_n, and at least fourteen strip activities are less than or equal to strip activity threshold T_m.

If the primary criterion is not satisfied, the two fields under consideration, whether of odd or even parity, are different. If the primary criterion is satisfied for an even parity field and the primary criterion is not satisfied for the odd parity field of the same frame, i.e, the previous field, the even parity field is a repeated field. If the primary criterion is satisfied for both the odd and even parity fields of a frame, a secondary criterion is evaluated for the even parity field. If the secondary criterion is true, i.e, satisfied, the even parity field is flagged as a repeated field. In another embodiment, if the primary criterion is satisfied for the even parity field, the field is flagged as repeated.

In the case of odd parity fields, if the primary criterion is found to be true for an odd parity field, and the primary criterion for the following even parity field is false, the odd parity field is flagged, i.e., identified, as a repeated field. If the primary criterion for the following even parity field is also found to be true, the secondary criterion is checked to arrive at a final decision. If the secondary criterion is satisfied, the odd parity field is flagged as a repeated field.

The secondary criterion for odd and even parity fields is examined after odd scene cut threshold T_s1 and even scene cut threshold T_s2 are updated using processes 800 and 860, respectively, as described above. However, the secondary criterion is tested only if the appropriate scene cut threshold, as explained below, is not equal to the default value. If the appropriate scene cut threshold equals the default value, the secondary criterion is declared not satisfied. Otherwise, the secondary criterion compares a measure of field activity for the field under consideration, e.g., a scaled version of field activity FA, with the scene-cut threshold corresponding to the other parity fields.

Specifically, in one embodiment, if the field under consideration is of odd parity, the secondary criterion compares a constant K times field activity FA with even scene cut threshold T_s2, which, is a running even parity field activity parameter. Thus, a measure of the field activity is compared with the threshold. In one embodiment, the value of constant K was taken as 1.75. Conversely, if the field under consideration is of even parity, the secondary criterion compares constant K times field activity FA with odd scene cut threshold T_s1, which is a running odd parity field activity parameter. Again, a measure of the field activity is compared with the threshold. If the product of constant K and field activity FA is less than the threshold value the secondary criterion is satisfied for either odd or even parity fields. However, if the product of K and field activity FA is less than the appropriate threshold value for both the even and odd parity fields, the secondary criterion for both the even and odd parity fields is declared unsatisfied, i.e., not true. In other words, if a frame is repeated, the secondary criterion for the two fields in the frame are declared unsatisfied by controller 402.

Thus, for an odd parity field, if the primary criterion for odd parity field and the even parity field is satisfied, and the secondary criterion for the odd parity field is satisfied, the odd parity field is flagged as a repeated field. Similarly, for an even parity field, if the primary criterion for odd parity field and the even parity field of a frame is satisfied, and the secondary criterion for the even parity field is satisfied, the even parity field is flagged as a repeated field.

Figure 9A:
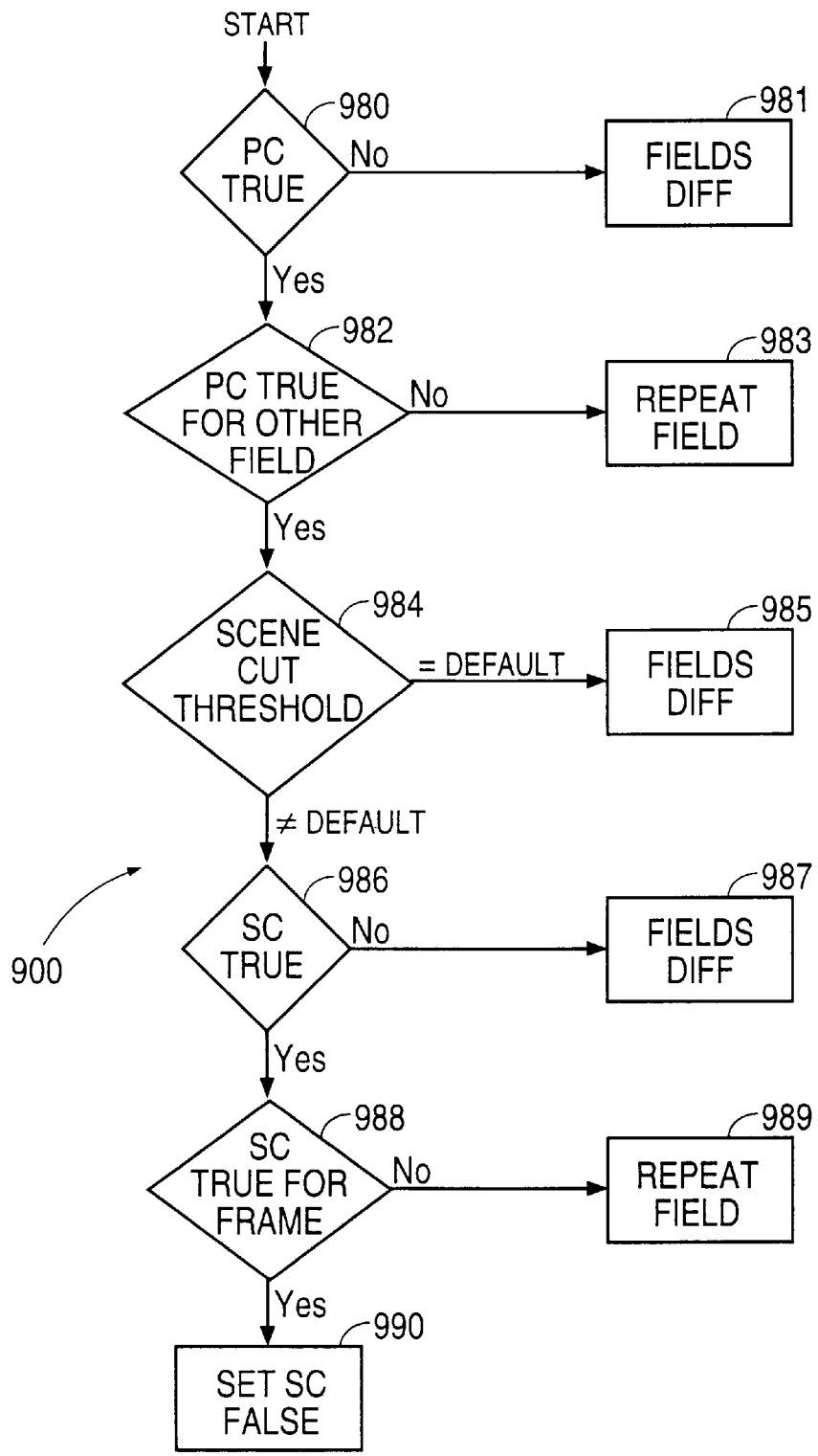
FIG. 9A is a process flow diagram for one embodiment of the real time repeated field detection process of this invention.

The repeated field detection process, as described above, is illustrated in FIG. 9A as repeated field detection process 900. PC true step 980 checks to determine whether field activity FA is less than or equal to field activity threshold T_n, and at least fourteen strip activities are less than or equal to strip activity threshold T_m. If either test is not satisfied, processing transfers to fields different step 981 where the current field is identified as an unrepeated field, i.e., the primary criterion field flag is not set. If both tests are satisfied, a flag is set indicating that the primary criterion for the field is true and processing transfers from step 980 to step 982.

In PC true for other field test step 982, a check is made to determine whether the other field in the same frame as the current field has the primary criterion flag set. Note that for the odd parity field in the frame, this test is performed after the even parity field has entered reordering memory 403. If the primary criterion flag for the other field in the frame is not set, processing transfers from step 982 to step 983 where the field is identified, e.g., flagged, as a repeated field. If the primary criterion flag for the other field in the frame is set, processing transfers from step 982 to step 984.

In scene cut threshold test step 984, the scene cut threshold for the parity opposite to the parity of the current field is checked to determine whether that scene cut threshold has the default value. If the scene cut threshold has the default value processing transfers from step 984 to fields different step 985 which in turn does not flag the current field as a repeated field. If the scene cut threshold does not have the default value, processing transfers from step 984 to step 986.

In SC true step test 986, the secondary criterion is checked, as described above, to determine whether the secondary criterion is true. If the secondary criterion is not satisfied, processing transfers from step 986 to step 987, which in turn identifies the current field as an unrepeated field. If the secondary criterion is satisfied, a secondary criterion flag is set and processing transfers from step 986 to step 988.

In SC true for frame test step 988, the secondary criterion flag for both fields in the frame is tested to determine whether both flags are set. If one secondary criterion flag is not set, processing transfers to step 989, which in turn sets the repeated field flag for the current field. If both secondary criterion flags are set for the frame, processing transfers from step 988 to step 990.

In step 990, the secondary criterion flags for both fields in the frame are set to false. In this case, either the frame is a repeated frame or neither field in the frame is repeated. State machine 480 makes the determination by checking whether the primary criterion for both fields of the frame following the next frame are satisfied and the secondary criterion are false.

Prior to considering another embodiment of the repeated field detection process in more detail, it is informative to consider the actual sequence in which the scan pattern, scene cut, and repeated field analyses are performed since now all the terms and thresholds have been defined. After every field sync, statistical processor 490 determines all of the parameters pertaining to the field that most recently entered reordering memory 403.

Figure 7D:
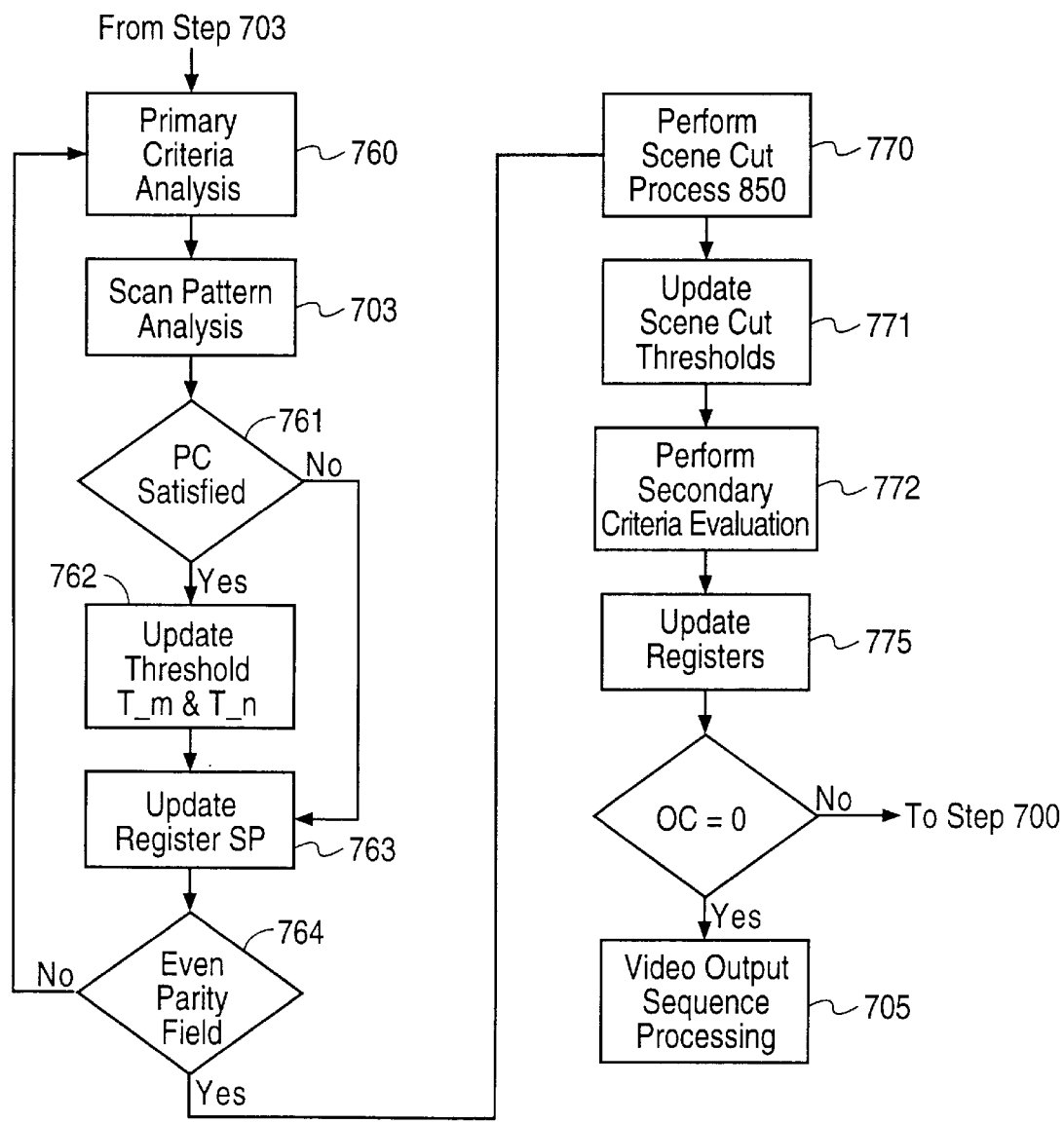
FIG. 7D is a more detailed of one embodiment of the steps 703 and 704 in process 700 of FIG. 7A.

In this embodiment of steps 703 to 705, in primary criterion analysis step 760, (FIG. 7D) the primary criterion for the field is checked and the result is stored in a temporary variable, e.g., a primary criterion flag is set if the primary criterion is satisfied. Next, scan pattern analysis process 703 (FIGS. 7B and 7C) is performed. Primary criterion satisfied check 761 determines whether the temporary variable was set in step 760. If the temporary variable was set, processing transfers from step 761 to step 762, which in turn updates strip activity threshold T_m and field activity threshold T_n, as explained more completely below.

Step 762 transfers processing to step 763 as does step 761 if the temporary variable was not set. In step 762, scan pattern register SP is updated. Of course, this step could be combined with step 703.

Even parity field check 764 determines whether both the odd and even parity fields of a frame have entered reordering memory 403. If both fields have not entered reordering memory 403, step 764 transfers to step 760 and steps 760, 703, 761, 762 and 763 are repeated for the even parity field. When both fields have entered reordering memory 703, step 764 transfers to perform scene cut analysis step 770.

Step 770 performs scene cut detection process 850 (FIG. 8A), as described above, and transfers processing to update scene cut thresholds step 771. Step 771 performs processes.800 and 860, as described above, to update scene cut thresholds T_s1 and T_s2. Next, in step 772, the secondary criterion is evaluated for the odd and even parity fields, e.g., steps 982 to 990 of process 900 are completed. Upon completion of step 770 processing transfers to update registers step 775.

In step 775, since a frame boundary has occurred, registers 470 with the exception of scan pattern register SP are updated as described above. Finally, as described more completely below, if the output counter has a zero value, step 776 transfers to step 705 where the appropriate operations are performed to send information to encoder 103 and otherwise to step 706.

Figure 9B:
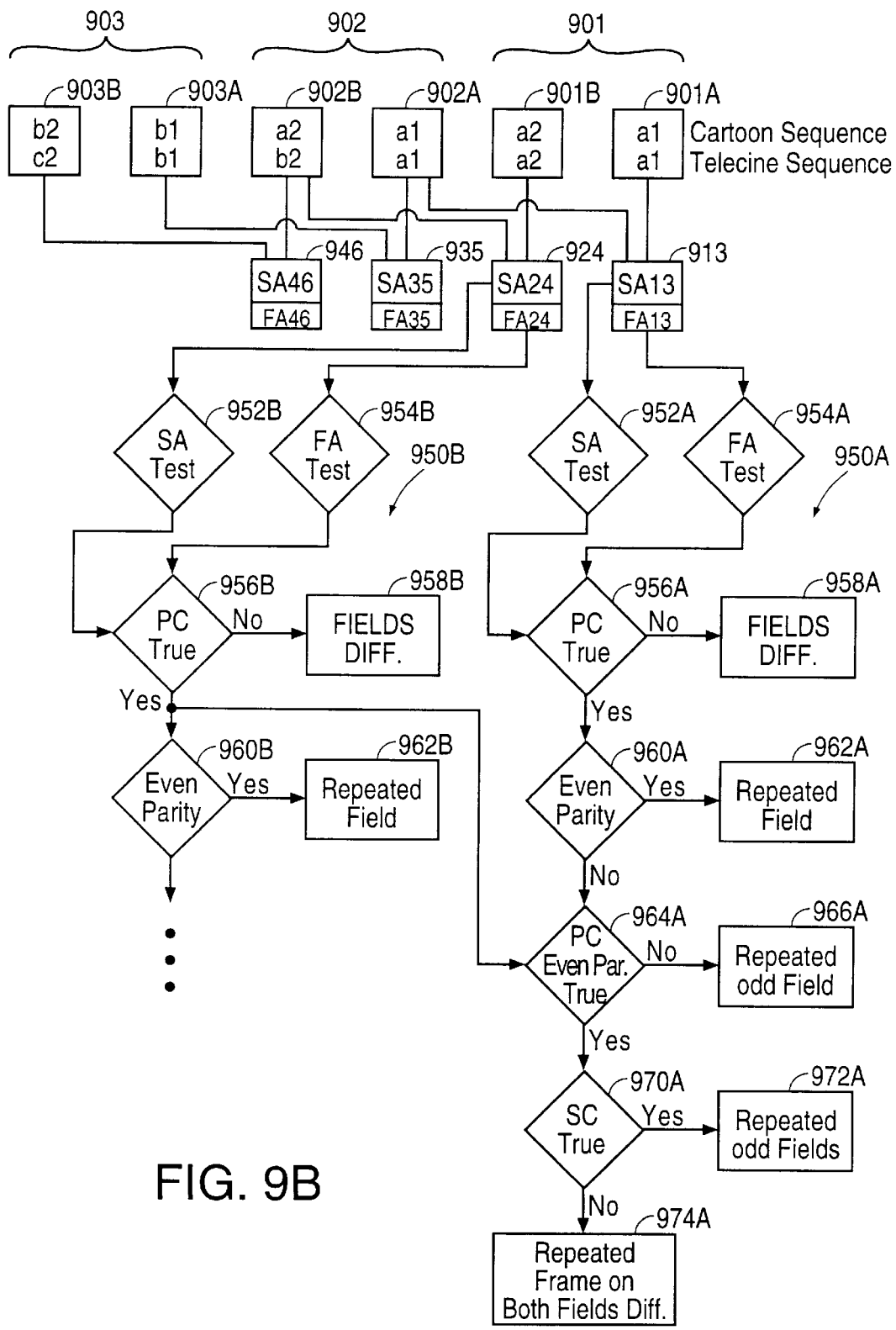
FIGS. 9B and 9C are a process flow diagram for another embodiment of the real time repeat field detection as applied to a cartoon sequence and a telecine sequence.
Figure 9C:
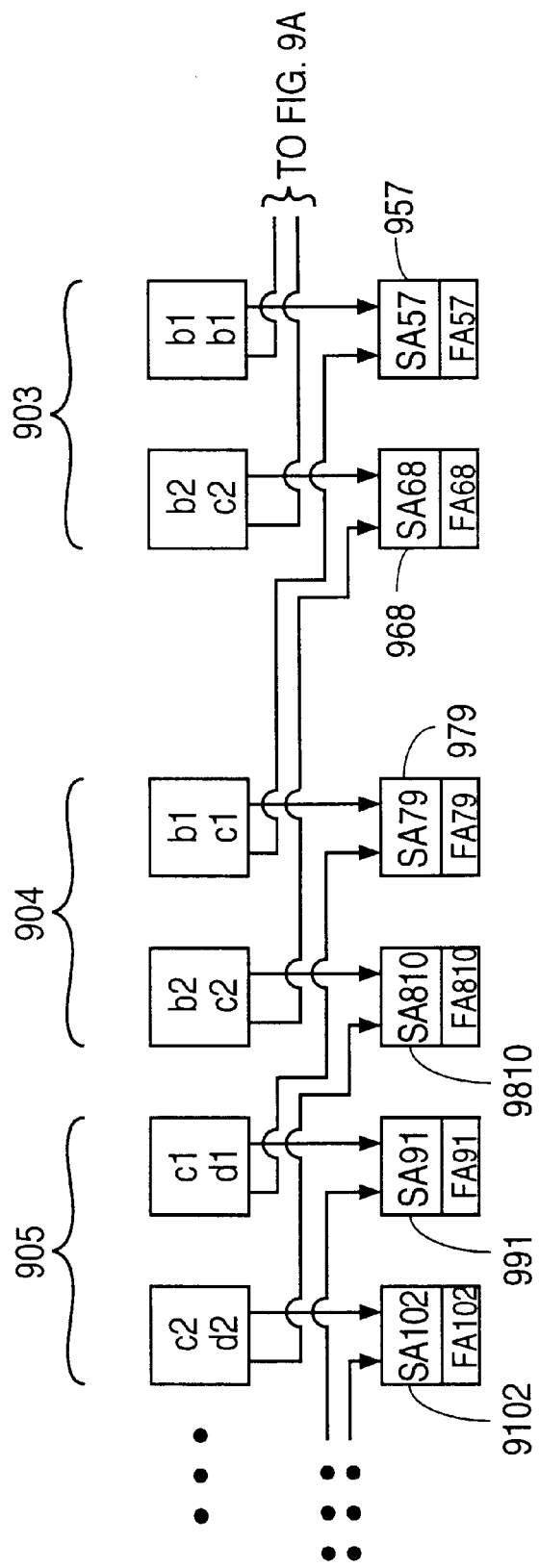

The use of another embodiment of the repeated field detection process is illustrated in FIGS. 9B and 9C for a cartoon input video sequence and a telecine input video sequence. In this embodiment, only the primary criterion is used to determine whether an even parity field is repeated while both the primary and secondary criteria are used to determine whether an odd parity field is repeated.

For purposes of illustration only five frames 901 to 905 are considered. Each frame 901 to 905 contains two fields. For example, frame 901 contains an odd parity field 901A and an even parity field 901B. Sometimes in this discussion the reference numerals for the fields are not used, but rather the content of the field is used. specifically, as shown in FIGS. 9B and 9C, the cartoon video sequence is:

a1a2 a1a2 b1b2 b1b2 c1c2;

and the telecine video sequence is:

a1a2 a1b2 b1c2 c1c2 d1d2.

The processing of the cartoon video sequence is considered first and then the telecine video sequence is considered. As described above, as each strip of fields a1, a2, and a3 moves through field memories 450 and 451, differential accumulator 452 is producing a strip activity SA-i for that strip. When a strip is processed and loaded into reordering memory 403, an interrupt is sent to controller 402, and statistical processor 490 reads the strip activity SA-i for the field. For fields 901A and 902A, which are both a1, the strip activities SA13 are stored in box 913, which, in one embodiment, is memory accessed by controller 402. When all the strips of field a1 are loaded in reordering memory 403, field activity FA13 is also generated by statistical processor 490 and repeated field detection process 950 is initiated. Note that in FIG. 9B process 950 shows the secondary criterion check immediately following the primary criterion check. However, in one embodiment (FIG. 7D) the two checks are not contiguous.

Since fields 901A and 902A are the same, each strip activity in strip activities SA13 is approximately zero and so field activity FA13 is also approximately zero. Thus, in strip activity test 952A, which compares each of strip activities SA13 to strip activity threshold T_m, none of the strip activities exceeded the threshold. Similarly, in field activity test 954A, which compares field activity FA13 to field activity threshold T_n, field activity FA13 is less than threshold T_n.

PC true step 956A checks to determine whether two or more strip activities exceeded threshold T_m in step 952A or field activity FA13 exceeded threshold T_n. Since neither threshold was exceeded, the primary criterion is satisfied and processing transfers from PC true step 956A to even parity check step 960A. Since field 901A and 902A are odd parity, even parity check step 960A transfers to PC even parity field true check step 964A. Processing in step 964A requires information from the next even parity field and so step 964A pauses until that information is available.

For fields 901B and 902B, which are both a2, the strip activities SA24 are stored in box 924, which, in one embodiment, is memory accessed by controller 402. When all the strips of field a2 are entered in reordering memory 403, field activity FA24 is generated by statistical processor 490 and repeated field detection process 950B is initiated. Repeated field detection processes 950A and 950B are the same process. However, to facilitate discussion of the process, different reference numerals are used for the analysis of odd and even parity field pairs.

Since fields 901B and 902B are the same, each strip activity in strip activities SA24 is approximately zero and so field activity FA24 is also approximately zero. Thus, in strip activity test 952B, which compares each of strip activities SA24 to strip activity threshold T_m, none of the strip activities exceed the threshold. Similarly, in field activity test 954B, which compares field activity FA24 to field activity threshold T_n, field activity FA24 is less than threshold T_n.

PC true step 956B checks to determine whether two or more strip activities exceed threshold T_m in step 952B or field activity FA24 exceeded threshold T_n. Since neither threshold was exceeded, the primary criterion is satisfied and processing transfers from PC true step 956B to even parity check step 960B. Since fields 901B and 902B are even parity, even parity check step 960B transfers to repeat step 962B which in turn marks, i.e., identifies, field 901B as a repeated field. The result of step 956B is also supplied to step. 964A. Note that as indicated above, in this embodiment for even parity fields only the primary criterion is needed to determine whether the field is a repeated field. Nevertheless the secondary criterion is evaluated. In FIG. 9B, the evaluation of the secondary criterion for even parity fields is not illustrated.

In step 964A, when the primary criterion for the even parity field is true, as in step 960B, processing transfers to secondary criterion true step 970A. In step 970A, field activity FA13 is multiplied by constant K and the product compared to even scene cut threshold T_s2. Since field activity FA13 is approximately zero, multiplication of zero by constant K gives a product that is still approximately zero. Consequently, the product is less than even scene cut threshold T_s2. Since the secondary criterion was true for both fields in the frame, controller 402 sets the secondary criterion for both fields in the frame to false. Processing transfers from step 970A to step 974A.

In step 974A, since the primary criterion for odd parity field 901A was found to be satisfied, the first bit from the right shifted into repeated field register RF is a one. Similarly, since the primary criterion for even parity field 901B was satisfied, the second bit shifted into repeated field register RF from the right is also one. Since the secondary criterion was not satisfied for both fields 901A and 901B, the first bit shifted into odd even compare register OEC is a zero, as is the second bit.

The default values of field activity threshold T_n and strip activity threshold T_m, in this embodiment as well as for process 900 (FIG. 9A), are 4*N_f and 6*N_s, respectively, where N_s and N_f are the number of pixels in a strip and a field, respectively. These default values are assigned during power-up or whenever a scene cut is detected. The values of strip activity threshold T_m and field activity threshold T_n are adjusted every time the primary criterion is satisfied as indicated above in FIG. 7D. Whenever the primary criterion is satisfied for a field, field activity FA for that field is compared with the value of a stored maximum value of the field activity up to this time. Initially and at scene cuts, the stored maximum value of the field activity is initialized to zero. Thus, field activity FA13 is compared to the stored maximum value of zero. Assuming that field activity FA13 is greater than zero, the value of field activity FA13 is stored as the maximum field activity.

Next field activity FA24 is compared to the stored maximum field activity, i.e., field activity FA13, and the larger of the two field activities is stored as the maximum field activity. After each change in the stored set equal to 1.15 times the stored maximum field activity, i.e., field activity threshold T_n is expressed in terms of the stored maximum field activity. Strip activity threshold T_m is set equal to 1.2 times field activity threshold T_n times the number of pixels in a strip N_s divided by the number of pixels in a field N_f, i.e., the new strip activity threshold is expressed in terms of the field activity threshold. The new values of field activity threshold T_n and strip activity threshold T_m are required to be in the range [3.5*N_f, 4.2*N_f] and [5.5*N_s, 6.25*N_s], respectively. Thus, if the new threshold is outside the specified range, the threshold is set to the appropriate endpoint of the range. In this embodiment, the constants 1.2, 1.15 and the ranges for the thresholds have been empirically determined. Moreover, the particular values used in the strip and field activity thresholds are illustrative only and are not intended to limit the invention to the particular values given. An important aspect is that the thresholds are defined so that as the frame size changes the thresholds are adjusted accordingly. Hence, the processes of this invention are not dependent upon a particular frame size.

After frame 901 is processed, frame 902 is processed. In FIG. 9B, for clarity, repeated field detection processes 950A, 950B are shown connected only to boxes 913 and 924. However, as will be understood by those skilled in the art, field detection processes 950A, 950B are repetitively used to process the data in subsequent boxes 924, 935, . . . Herein, process 950A is used for odd parity fields and process 950B for even parity fields.

For fields 902A and 903A, which are a1 and b1 respectively, the strip activities SA35 and field activity FA35 are stored in box 935. Since fields 902A and 903A are different, at least two of the strip activities in strip activities SA35 are large and consequently field activity FA35 is also large. Thus, in strip activity test 952A, which compares each of strip activities SA35 to strip activity threshold T_m, at least two of the strip activities exceed the threshold. Similarly, in field activity test 954A, which compares field activity FA35 to field activity threshold T_n, field activity FA35 is greater than threshold T_n.

PC true step 956A checks to determine whether two or more strip activities exceed threshold T_m in step 952A or field activity FA13 exceeded threshold T_n. Since both thresholds were exceeded, the primary criterion is not satisfied and processing transfers from PC true step 956A to different step 958A.

In different step 958A, field 902A is flagged as a different field. This effectively terminates process 950A. Nevertheless, as indicated above, the secondary criterion is evaluated and found not to be satisfied.

For fields 902B and 903B, which are a2 and b2 respectively, strip activities SA46 are stored in box 946. Since fields 902B and 903B are different, the primary criterion is not satisfied and so step 958B marks field 902B as a different field.

Hence, frame 902 has been processed and neither field 902A or 902B is a repeated field. Since the primary criterion for odd parity field 902A was not satisfied, the first bit shifted into repeated field register RF is a zero. Similarly, since the primary criterion for even parity field 902B was not satisfied, the second bit shifted into repeated field register RF is also a zero. Since the secondary criterion was satisfied for neither of fields 901A and 901B, the first bit shifted into odd even compare register OEC is a zero as is the second bit. Since the primary criterion was not satisfied for either field, thresholds T_n and T_m are not updated.

The processing of the remainder of the fields in the cartoon sequence are equivalent to that just described and so will be apparent to those skilled in the art in view of the above discussion. The pattern of bits in repeated field register RF with a pair of bits set followed by a pair of bits that are not set is indicative of the cartoon sequence.

The repeated field processing of the telecine video sequence is similar to the cartoon sequence, when the differences in the two sequences are considered. Nevertheless, the repeated field processing of the telecine sequence is considered in detail.

Since fields 901A and 902A in the telecine video sequence are the same, each strip activity in strip activities SA13 is approximately zero and so field activity FA13 is also approximately zero. Thus, in strip activity test 952A, which compares each of the strip activities in SA13 to strip activity threshold T_m, none of the strip activities exceed the threshold. Similarly, in field activity test 954A, which compares field activity FA13 to field activity threshold T_n, field activity FA13 is less than threshold T_n.

PC true step 956A checks to determine whether two or more strip activities exceed threshold T_m in step 952A or field activity FA13 exceeded threshold T_n. Since neither threshold was exceeded, the primary criterion is satisfied and processing transfers from PC true step 956A to even parity check step 960A. Since field 901A and 902A are odd parity, even parity check step 960A transfers to PC even parity field true check step 964A. Processing in step 964A requires information from the next pair of frames and so step 964A pauses until that information is available.

For fields 901B and 902B, which are a2 and b2 respectively, the strip activities SA24 are stored in box 924, which, in one embodiment, is memory accessed by controller 402. When all the strips of field a2 have entered reordering memory 403, field activity FA24 is also determined and repeated field detection process 950B is initiated. Repeated field detection processes 950A and 950B are the same process. However to facilitate discussion of the process, different reference numerals are used for the analysis of odd and even parity field pairs.

Since fields 901B and 902B are different, several strip activities in strip activities SA24 are most likely large and so field activity FA24 is also large. Thus, in strip activity test 952B, which compares each of the strip activities to strip activity threshold T_m, at least two of the strip activities exceed the threshold. Similarly, in field activity test 954B, which compares field activity FA24 to field activity threshold T_n, field activity FA24 is considered greater than threshold T_n.

PC true step 956B checks to determine whether two or more strip activities exceed strip activity threshold T_m in step 952B or field activity FA24 exceeded field activity threshold T_n. Since both were exceeded, the primary criterion is not satisfied and processing transfers from PC true step 956B to different step 958B which flags fields 901B and 902B as different and this effectively terminates repeated field detection process 950B. Note that as indicated above, in this embodiment for even parity fields, only the primary criterion is needed to determine whether a field is a repeated field. Nevertheless, the secondary criterion is evaluated.

The result of step 956B is also supplied to step 964A. In step 964A, when the primary criterion for the even parity field is not true as in step 956B, processing transfers to repeat step 966A. In step 966A, field 901A is marked as a repeated field. This effectively terminates process 950A. Nevertheless, the secondary criteria is evaluated and found to be true.

Hence, frame 901 has been processed and field 901A is a repeated field, but field 901B in not a repeated field. Since the primary criterion for odd parity field 901A was found to be satisfied, the first bit shifted into repeated field register RF is a one. Since the primary criterion for even parity field 901B was not satisfied, the second bit shifted into repeated field register RF is a zero. Since the secondary criterion was satisfied for field 901A but not field 901B, the first bit shifted into odd even compare register OEC is a one and the second bit is a zero. The values of strip activity threshold T_m and field activity threshold T_n are updated as described above, because the primary criterion for field 901A was satisfied.

After frame 901 is processed, frame 902 is processed. For fields 902A and 903A, which are a1 and b1 respectively, the strip activities SA35 and field activity FA35 are stored in box 935. Since fields 902A and 903A are different, at least two of the strip activities in strip activities SA35 are large and consequently field activity FA35 is also large. Thus, in strip activity test 952A, which compares each of strip activities SA35 to strip activity threshold T_m, at least two of the strip activities exceed the threshold. Similarly, in field activity test 954A, which compares field activity FA35 to field activity threshold T_n, field activity FA35 is greater than threshold T_n.

PC true step 956A checks to determine whether two or more strip activities exceed threshold T_m in step 952A or field activity FA35 exceeded threshold T_n. Since both thresholds were exceeded, the primary criterion is not satisfied and processing transfers from PC true step 956A to different step 958A.

In different step 958A, field 902A is flagged as a different field. This effectively terminates process 950A. Nevertheless, as indicated above, the secondary criterion is evaluated and found not to be satisfied.

For fields 902B and 903B, which are b2 and c2 respectively, the strip activities SA46 are stored in box 946. Since fields 902B and 903B are different, the primary criterion is not satisfied and so step 958B flags field 902B as a different field.

Hence, frame 902 has been processed and neither field 902A or 902B is a repeated field. Since the primary criterion for odd parity field 902A was not satisfied, the first bit shifted into repeated field register RF is a zero. Similarly, since the primary criterion for even parity field 902B was not satisfied, the second bit shifted into repeated field register RF is also a zero. Since the secondary criterion was satisfied for neither of fields 902A and 902B, the first bit shifted into odd even compare register OEC is a zero as is the second bit. Since the primary criterion was not satisfied for either field, thresholds T_n and T_m are not updated.

After frame 902 is processed, frame 903 is processed. For fields 903A and 904A, which are b1 and c1 respectively, the strip activities SA57 and field activity FA57 are stored in box 957 (FIG. 9C). Since fields 903A and 904A are different, at least two of the strip activities in strip activities SA57 are large and consequently field activity FA57 is also large. Thus, in strip activity test 952A, which compares each of strip activities SA57 to strip activity threshold T_m, at least two of the strip activities exceed the threshold. Similarly, in field activity test 954A, which compares field activity FA57 to field activity threshold T_n, field activity FA57 is greater than threshold T_n.

PC true step 956A checks to determine whether two or more strip activities exceed threshold T_m in step 952A or field activity FA57 exceeded threshold T_n. Since both thresholds were exceeded, the primary criterion is not satisfied and processing transfers from PC true step 956A to different step 958A.

In different step 958A, field 903A is flagged as a different field. This effectively terminates process 950A. Nevertheless, as indicated above, the secondary criterion is evaluated and found not to be satisfied.

Next, fields 903B and 904B in the telecine video sequence are the same. Thus, each strip activity in strip activities SA68 is approximately zero and field activity FA68 is also approximately zero. Thus, in strip activity test 952B, which compares each of the strip activities in SA68 to strip activity threshold T_m, none of the strip activities exceed the threshold. Similarly, in field activity test 954B, which compares field activity FA68 to field activity threshold T_n, field activity FA68 is less than threshold T_n.

PC true step 956B checks to determine whether two or more strip activities exceed threshold T_m in step 952B or field activity FA68 exceeded threshold T_n. Since neither threshold was exceeded, the primary criterion is satisfied and processing transfers from PC true step 956 to even parity check step 960B. Since field 903B and 904B are even parity, even parity check step 960B transfers to repeated field step 962B. Repeated field step 962B marks field 903B as a repeated field in this embodiment. This effectively terminates process 950B. Nevertheless, the secondary criteria is evaluated and found to be true.

Hence, frame 903 has been processed and field 903A is not repeated, but field 903B is repeated. Since the primary criterion for odd parity field 903A was not satisfied, the first bit shifted into repeated field register RF is a zero. Since the primary criterion for even parity field 901B was satisfied, the second bit shifted into repeated field register RF is a one. Since the secondary criterion was not satisfied for field 903A but was satisfied for field 903B, the first bit shifted into odd even compare register OEC is a zero and the second bit is a one. The values of strip activity threshold T_m and field activity threshold T_n are updated as described above, because the primary criterion for field 903B was satisfied.

The processing of the remaining fields is similar to that described above and each field is determined to be a different field. As explained more completely below, there are a plurality of telecine combinations. However, the repeated field detection process is the same sequence of steps for each telecine video sequence and reliably detects each repeated field.

In the above examples, since the input sequence was known, the repeated field register and the odd-even compare register have the same information and appear redundant. However, as explained more completely below, the primary criterion, i.e, the information contained in repeated field register RF, is sufficient to uniquely identify a repeated frame, but the primary criterion may fail to distinguish between a telecine sequence and frames with only small differences. Thus, in a real-time analysis with an unknown input video data stream, information in both repeated field register RF and odd-even compare register OEC is needed to reliably distinguish between repeat frames and telecine sequences.

In the above examples, it was assumed that each strip activity and each field activity was approximately zero. However, noise is almost invariably introduced in input video data stream 301. Thus, it is rare to have either a strip activity or a field activity that is equal to zero even if a field is repeated. In reality, each strip activity SA and field activity FA for a pair of repeated fields of the same parity should be "close" to zero. In the process of this invention, strip activity threshold T_m and field activity threshold T_n define, adaptively, what "close" means. Thus, if a multiplicity of strip activities SA and field activity FA are less than thresholds T_m and T_n, respectively, the two fields are declared identical.

The values chosen for thresholds T_m and T_n and the way these thresholds are adapted were empirically determined based on computer simulations. Preferably, the thresholds should not be too small, or too large. In the former case, some repeated fields may not be detected because the noise may exceed the threshold, while in the latter case different fields may be flagged as repeated, since the threshold may actually exceed their difference. Consequently, the thresholds are clamped within a certain range of values that were also selected empirically.

The default values of 4*N_f and 6*N_s for field activity threshold T_n and strip activity threshold T_m respectively translate to absolute per pixel values of 4 and 6. As explained above, the circuitry sums the differences between pixel pairs to obtain the strip and field activities. If the resultant values are normalized by the number of pixels in each, i.e., by the number of pixels in a strip N_s and the number of pixels in a field N_f, respectively, the result is the average pixel-to-pixel difference over a strip and a field. The default threshold values now imply that at power-up, a field is declared repeated if its field-normalized field activity value (i.e., per pixel value) is less than four. The default values were chosen empirically. Likewise, the condition that two or more strip activities SA should exceed strip activity threshold T_m also was chosen empirically.

Herein, the secondary criterion is a decision based on "relative" measurements. If the primary criterion is true for both fields in a frame, either the whole frame is repeated, or there is only a slight change between two successive frames. However, while the primary criterion is sufficient to identify a repeated field, the primary criterion by itself is not sufficient to determine if the video sequence is a telecine video sequence. The characteristic of a telecine video sequence is that only one field of a frame is repeated. Consequently, to assure differentiation between a telecine video sequence and a video sequence with a repeated frame, the secondary criterion is utilized.

As explained above, the secondary criterion compares the field activity for a field of a first parity with the scene-cut threshold of the other parity field. This threshold is a running average of the field activities of the other parity. Normally, the scene-cut thresholds for the odd and even parity fields are close to each other, because the field activities of the odd and even parity fields are themselves close to each other. The only times the field activities could be different are if one of the field activities is associated with a repeated field and/or there is a scene cut. Thus, by comparing the field activity FA of the current field with the scene cut threshold of the other parity field, sudden deviations in the field activity are detected. Specifically, if the current field is repeated, and the other field of this frame is not repeated, then the field activity of the current field is likely to be much smaller than the scene cut threshold of the other field. Therefore, the secondary criterion distinguishes between a sequence of fields that appears to be repeat frames but in actuality contains a telecine sequence.

In the previous discussion of state machine 500, several conditions were briefly described that determined the various transitions between states. The various conditions are defined using the information in repeated field register RF, odd-even compare register OEC, scene cut register SC, scan pattern register SP. Table 1 lists eleven status conditions, for one embodiment of this invention. The status conditions are specified using the reference numeral for the register and the conventions of the C programming language. Also, each status condition has two states, a true state and a false state. Sometimes herein, the true state is referred to as a status condition being satisfied and the false state is referred to as a status condition being unsatisfied.

TABLE 1

Status Conditions

| Condition | Explanation |
|---|---|
| C0 | (RF & 0x03 == 0x02) \|\| ((RF & 0x03 == 0x03) && (OEC & 0x02)) |
| C1 | (RF & 0x01) |
| C2 | (SC & 0x03 == 0x03) |
| C2' | (Scan & 0x03 == 0x03) |
| C3 | (SC & 0x06 == 0x06) |
| C3' | (Scan & 0x0C == 0x0C) |
| C4 | (SC & 0x0C == 0x0C) |
| C4' | (Scan & 0x06 == 0x06) |
| C5 | (SC & 0x3C == 0x18) |
| C6 | (SC & 0x30 == 0x30) |
| C6' | (Scan & 0x18 == 0x18) |
| C7 | (SC & 0x60 == 0x60) |
| C8 | (((RF & 0x04) && !(RF & 0x08)) \|\| (((RF & 0x0C) == 0x0C) && (OEC & 0x04))) |
| C9 | ((RF & 0x03 == 0x01) \|\| ((RF & 0x03 == 0x03) && (OEC & 0x01))) |
| C10 | ((RF & 0xC0 == 0x80) \|\| ((RF & 0xC0 == 0xC0) && (OEC & 0x80))) |
| C11 | ((RF & 0x03 == 0x03) && !(OEC & 0x03)) |

Each of status conditions C0 to C11 are briefly considered and then the operation of state machine 480 is described in more detail. As explained above, all of registers except scan register SC, which is given as Scan in Table 1, are updated at frame boundaries. Thus, the two least significant bits of the registers correspond to the two most recently entered fields. In other words, the two least significant bits in each register correspond to properties of the odd-even pair of two fields of the frame that most recently entered reordering memory 403. As successive frames enter reordering memory 403, the bits in these registers are shifted from the least significant bit of the register towards the most significant bit of the register.

When status condition C0 is true, it means that the primary criterion for the odd parity field of the most recently entered frame is true and the primary criterion for the even parity field of most recently entered frame is false, or the primary criterion for both fields of the frame are true and the secondary criterion for the odd parity field is true. Thus, status condition C0 is true if the odd parity field in the frame is repeated, but not the even parity field. For example, status condition C0 is true if frame a1a2 just entered reordering memory 403 and the following frame is a1b2. However, if two successive frames are identical, as in a still scene i.e., frame a1a2 followed by frame a1a2, status condition C0 is not true.

Status condition C1 is true if the primary criterion for the even parity field of most recently entered frame, i.e, the current frame, is true.

Notice that in the embodiment given in FIG. 5B where only the primary criterion is used to determine whether an even parity field is repeated, i.e., status condition C1 is true, there are two conditions in status condition C0 for checking whether an odd parity field is repeated and only one condition in status condition C1 to check whether an even parity field is repeated. The only time controller 402 checks for a repeated even parity field is after controller 402 has already encountered a repeated odd parity field. As discussed above, the primary criterion is one indicator of a repeated field, but not always a sure indicator. However, the fact that a repeated odd parity field has already been detected at an appropriate location in the past provides additional information so that finding the primary criterion satisfied for the even parity field is considered sufficient in this embodiment. In another embodiment, the same status conditions could be used for both even and odd parity fields, i.e, status conditions C0 and C9 are used to detect repeated fields.

Status condition C2 is true when the scene cut conditions discussed above are satisfied for both fields of the current frame. When status condition C2 is true, the current frame is the last frame of the old scene.

Status condition C2' is true, if the current frame and the frame formed by taking the odd parity field of the current frame and the even parity field of the preceding frame are both interlaced. Status condition C2' is used to detect where an edit (if any) has occurred. As explained below, two fields belonging to different frames in the input sequence are combined only if the new frame produced by combining the two fields is non-interlaced; otherwise, the combination is not made.

Status condition C3 is true if the odd and even parity fields of the current frame are from different scenes. Status condition C3 is true when there is a mid-frame edit in current frame. Status condition C3' is true, if the frame previous to the current frame and the frame formed by taking the odd parity field of the frame previous to the current frame and the even parity field of the frame preceding the frame previous to the current frame are both interlaced.

Status condition C4 is true if the current frame and the one before it belong to different scenes. Hence, status condition C4 is true when a frame-boundary edit occurred just before the current frame, i.e., the current frame starts a new scene. Status condition C4' is true if the frame preceding the current frame and the frame formed by combining the odd parity field of the current frame and the preceding even parity field are both interlaced.

Status condition C5 is true if the two fields of the frame previous to the current frame belong to different scenes. Status condition C5 is true if there was an isolated mid-frame edit in the frame previous to current frame. Specifically, there should not be a mid-frame edit in the fields immediately preceding and following the current frame. In the stream of video data a1a2 b1b2 c1u2 v1v2 w1w2 there is a mid-frame edit in frame c1u2. However, in the stream of video data a1m2 p1x2 neither frame is flagged as having a mid-frame edit because it is likely that such a sequence was purposely created and so should not be altered. In another embodiment, the requirement that a mid-frame edit is isolated may not be implemented.

Status condition C6 is true if there is a scene cut between the frame previous to the current frame and the frame preceding that frame. For example, the video sequence, c1c2 u1u2 x1x2 y1y2, would make status condition C6 true where frame x1x2 is the current frame; frame u1u2 is the frame previous to the current frame x1x2; frame c1c2 is the frame preceding frame u1u2; and there is a scene cut between frame c1c2 and frame u1u2. Status condition C6' is true if the frame previous to the frame preceding the current frame and the frame formed by combining the odd parity field of the frame previous to the current frame and the preceding even parity field are both interlaced.

Status condition C7 is true if the two fields of the frame appearing two frames before the current are from different scenes. For example, status condition C7 is true for the video sequence, c1t2, u1u2, x1x2 where frame x1x2 is the current frame and frames u1u2 and c1t2 are in reordering memory 403. Specifically, status condition C7 is true when a mid-frame edit occurred in the frame two frames before current frame.

Status condition C8 is true if the even parity field of the frame previous to the current frame is a repeated field. Notice that both the primary and secondary criteria are used for status condition C8.

Status condition C9 is true if the even parity field of the current frame is repeated. Notice that both the primary and secondary criteria also are used for status condition C9 in a manner parallel to that described above for status condition C0.

Status condition C10 is true if the odd parity field in the frame that entered reordering memory 403 three frames before the current frame was a repeated field. Again, both the primary and secondary criteria are used in the determination. For example, for the video sequence a1a2 a1b2 b1c2 c1c2 d1d2 where frame c1c2 is the current frame and frame a1a2 is the frame that entered reordering memory 403 three frames before the current field, field a1 is a repeated field and so status condition C10 is true.

Status condition C11 is true when both the even and odd parity fields of the current frame are repeated, i.e., the current frame is repeated and the secondary criterion for both fields is false.

As explained more completely below, various combinations of the status conditions are checked in each sub-state of state machine 480 and depending on what combination of the status conditions is true, controller 402 chooses the output format, display code, and reordering memory read addresses. Consequently, prior to considering the detailed operation of state machine 480, the output formats and display codes are considered.

Figure 20:
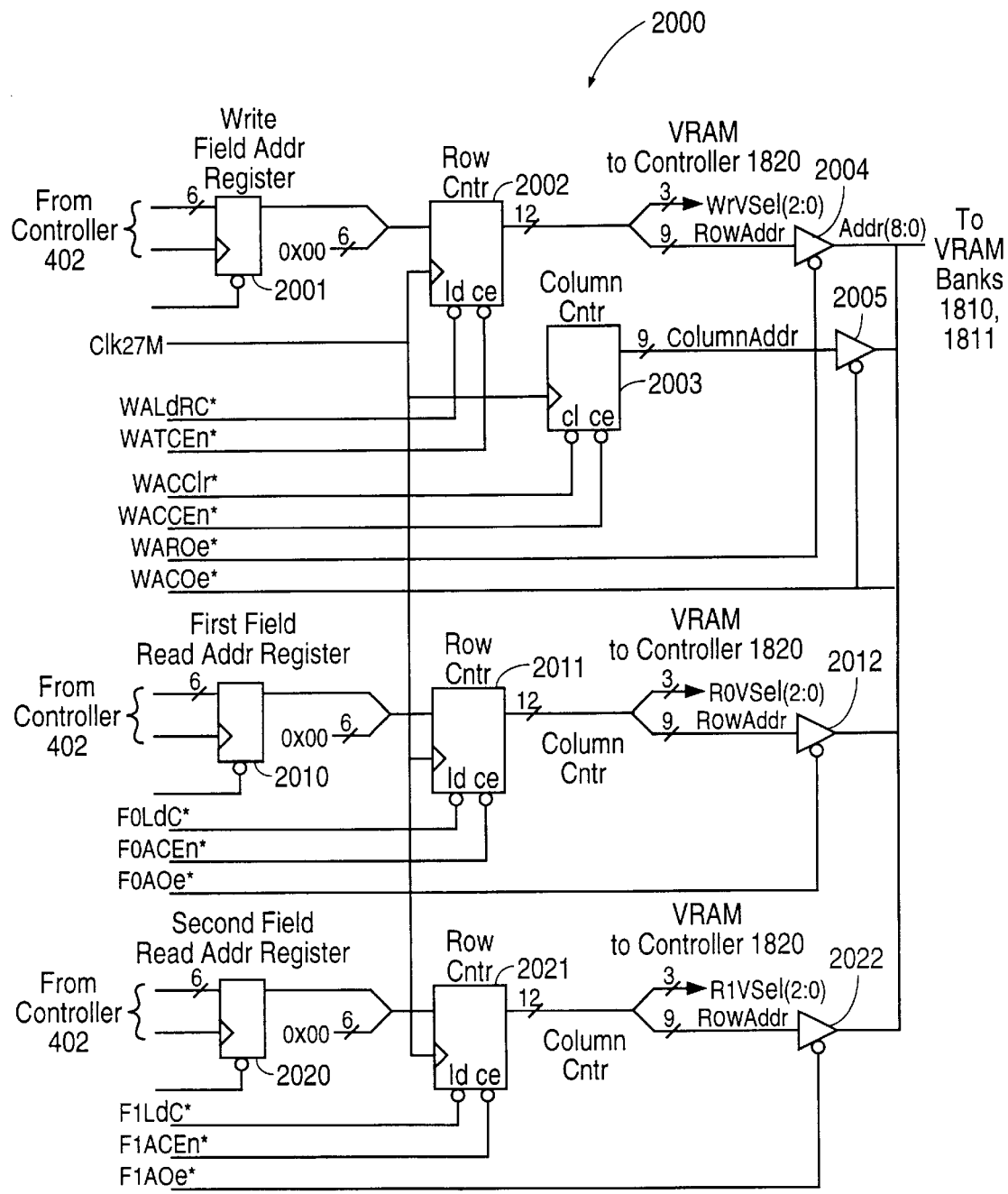
FIG. 20 is a schematic diagram of the read-write address generation circuit of this invention.

Two read address registers, i.e, read_1 register and read_2 register, are used to select the data in reordering memory 403 that is provided in output video sequence 302. The two read address registers are loaded with the address of the fields to be read out during the following field period. Hence, when a new address is loaded into either or both of the two read address registers, the address comes into effect at the first field sync following loading of the registers. Read address registers read_1 register and read_2 register are registers 2010, 2020 (FIG. 20).

In a default mode, controller 402 loads new addresses into the two read address registers once on every other field sync, i.e, every two field periods. However, there are situations when a new address is loaded after only one field period following the last update. To keep track of when to load the read address registers, controller maintains modulo three output counter OC. During power-up, or reset, modulo three output counter OC is initialized with a value of two. At each field sync, if modulo three counter OC has a value greater than zero, modulo three output counter OC is decremented by one. This is the first thing controller 402 does upon seeing a field sync. The read address registers are updated then if and only if the value of modulo three output counter OC equals zero. The new address comes into affect at the next field sync. Along with updating the address read registers, controller 402 also resets the value of modulo three output counter OC to either one or two.

As mentioned before, reordering memory 403 has eight field memory banks, which for convenience are numbered consecutively from zero through seven. At power-up, or reset, a write pointer is initialized to point to the first field location of reordering memory 403, i.e., location zero. Read_1 register is initialized to point to the third field location and read-2 register to the fourth field location, i.e., the value of read_1 register is two, and the value of read_2 register is three. At each field sync, the write pointer is incremented by one based on modulo eight. The read registers are updated by controller 402 as dictated by state machine 480.

Apart from updating the read address registers, state machine 480 also determines the order in which to read out the fields, i.e, the field addressed by read_1 register first or the field addressed by read_2 register first, or if either field should not be read at all. There are five possible output field selection codes in this embodiment that are listed, along with the symbolic code for each selection, in Table 2. These codes are selected based on some combination of the status conditions listed in Table 1, as discussed more completely below.

TABLE 2

List of output field selection codes

| Output Selection Code | Explanation |
| --- | --- |
| T0 | read_1 register = (read_1 register + 2) % 8<br>read_2 register = (read_2 register + 2) % 8<br>read (field 1, field 2) |
| T1 | read_1 register = (read_1 register + 2) % 8<br>read_2 register = (read_2 register + 2) % 8<br>read (field 2, field 1) |
| T2 | read_1 register = (read_1 register + 2) % 8<br>read_2 register = (read_2 register + 2) % 8<br>read (field 2, field 2) |
| T3 | read_1 register = (read_1 register + 2) % 8<br>read_2 register = (read_2 register + 2) % 8<br>read (field 1, field 1) |
| T4 | read_1 register = (read_1 register + 1) % 8<br>read_2 register = (read_2 register + 1) % 8<br>No data read out |

Notice that for both output field selection codes T2 and T3, a field is dropped in the frame and one field is used for both fields of the frame.

The nominal delay time introduced by video data stream analyzer 300 in the video data path is equal to eight field periods, i.e, four frame periods. This means, in the default mode of operation that corresponds to a "clean" video sequence with no mixed-frames, a frame entering video data stream analyzer 300 exits exactly four frame periods later, with its field ordering retained. In this mode of operation, the reordering memory read and write address registers increment at the same rate relative to each other. However, when the input video data stream is a film source, some perturbations are periodically introduced in the read address registers to eliminate repeated fields. These perturbations could be selecting a field that is out of its natural order or not reading one of the fields of a frame, or inhibiting the output for a field period. Usually, if one field of a frame is inhibited, the other field is read out twice to complete the frame of data. Similarly, in the case of 15 fps cartoon sequences, the output from reordering memory 403 is inhibited during alternate frame periods. To facilitate buffer management in the encoder and decoder, video data stream analyzer 300 introduces dead times at appropriate intervals in the video output sequence, as explained above.

Along with the output field selection code of Table 2, state machine 480 generates a display code. To ensure proper display of the fields selected by the output field selection code in decoding system 120, the display code should accompany the two fields selected. As mentioned before, this information is part of the side channel provided for transmission to decoding system 120. Table 3 gives an example of one embodiment of the display codes.

TABLE 3

Field display codes

| Display Code | Explanation |
| --- | --- |
| D02 | display (odd, even) |
| D03 | display (odd, even, odd) |
| D12 | display (even, odd) |
| D13 | display (even, odd, even) |
| D04 | display (odd, even, odd, even) |

Most display monitors are interlaced. An interlaced display monitor does not display frames but rather fields, at a rate of 60 times a second. In the normal mode, a 30 frames/second video sequence is displayed as 60 fields/second. That is each frame is displayed for exactly two field times, i.e., the odd parity field first followed by the even parity field. As explained above, video data stream analyzer 300 of this invention drops all repeated fields that are found, and in general, the fields that are dropped are not guaranteed to follow any fixed pattern, because of edits, etc. In other words, the video data output stream from video data stream analyzer 300 that is compressed and transmitted is not guaranteed to be of any fixed frame rate, and is of a rate less than or equal to 30 fps. However, the ultimate display device (tv monitor, e.g.) has to display the uncompressed information exactly at the rate of 60 fields/second.

Hence, the display code tells decoding system 120 how to generate a data rate of 60 fields/second. Specifically, this is accomplished by displaying some frames for more than two field times, specifically three or even four field times. Display code D02 is the default ode for a frame and is the normal interlaced pattern. Display code D03 indicates that the decoder should display a frame for three field periods and specifically, the odd parity field should be displayed, followed by the even parity field, and then the odd parity field again. Display code D12 indicates that the decoding system should display the frame for two field periods, but the even parity field should be displayed first and followed by the odd parity field. Display code D13 is similar to display code D03, but the odd and even parity fields are reversed. Display code D04 indicates that the decoding system should display the frame for four field periods in an odd, even, repeat odd, repeat even sequence.

For example, if a cartoon sequence is converted by video data stream analyzer 300 from 30 fps to 15 fps and then coded and transmitted, display code D04 would be associated with each frame to tell the decoding system to repeat each frame exactly once so as to display on a 60 fields/second monitor. In this embodiment, the display code is loaded in a register that can be read by encoder 103. The particular method used by encoder 103 to encode the side channel information for transmission to decoding system 120 is beyond the scope of this invention. The important aspect is that information is provided to encoder 103 to enable reconstruction of a 30 frame per second video sequence by decoding system 120.

Output video data stream 302 from video data stream analyzer 300 can be characterized either as a frame or a pair of fields. Frame output means that the alternate lines in output video sequence 302 belong to the same field while field output means that all lines of field one in output video sequence 302 are output first followed by all the lines of field two. Additionally, production of frame output implies that subsequent processing, such as vertical resampling would generate visually superior images if performed on the frame as a whole. Production of field output implies that subsequent processing would generate visually superior images if performed on the fields individually. Alternatively, if it is required that the format of the output data be fixed (to either frame or field), video data stream analyzer 300 outputs the scan pattern information as additional side channel information.

A variety of criteria are utilized to select the output format. In some cases, the output format is determined by the present state of state machine 480, e.g., if state machine is in movie state, the output format is in frame output format.

However, in other situations, the state of state machine 480 is not sufficient to select the output format. For example, in video state 500, input video data stream 301 can be 30 fps interlaced or progressive. In this situation, the information in scan pattern register SP is used to determine the output format. If bit 3, where bit 0 is the least significant bit, of scan pattern register SP is a one, the output format during the next frame period is chosen as the field format, and otherwise the output format is chosen as the frame format. In the subsequent discussion of state machine 480, the following notation is used for the output format codes:

TABLE 4

Output format codes

| Output Format code | Explanation |
| --- | --- |
| F0 | Output is in frame format. |
| F1 | Output is in field format. |

In the state machine discussion that follows, when the state of bit three in scan pattern register SP determines the output format, the output format code is preceded by an "I:" in the state diagrams. If no "I" appears before the output format code, its selection is assumed not to be conditioned on any event. Also, if read code T4 is chosen, i.e., no data is read out of reordering memory 403, no side channel information is generated. The side channel information, i.e, the display code and the scan pattern code, is generated only when data is output from video data stream analyzer 300.

Figure 10:
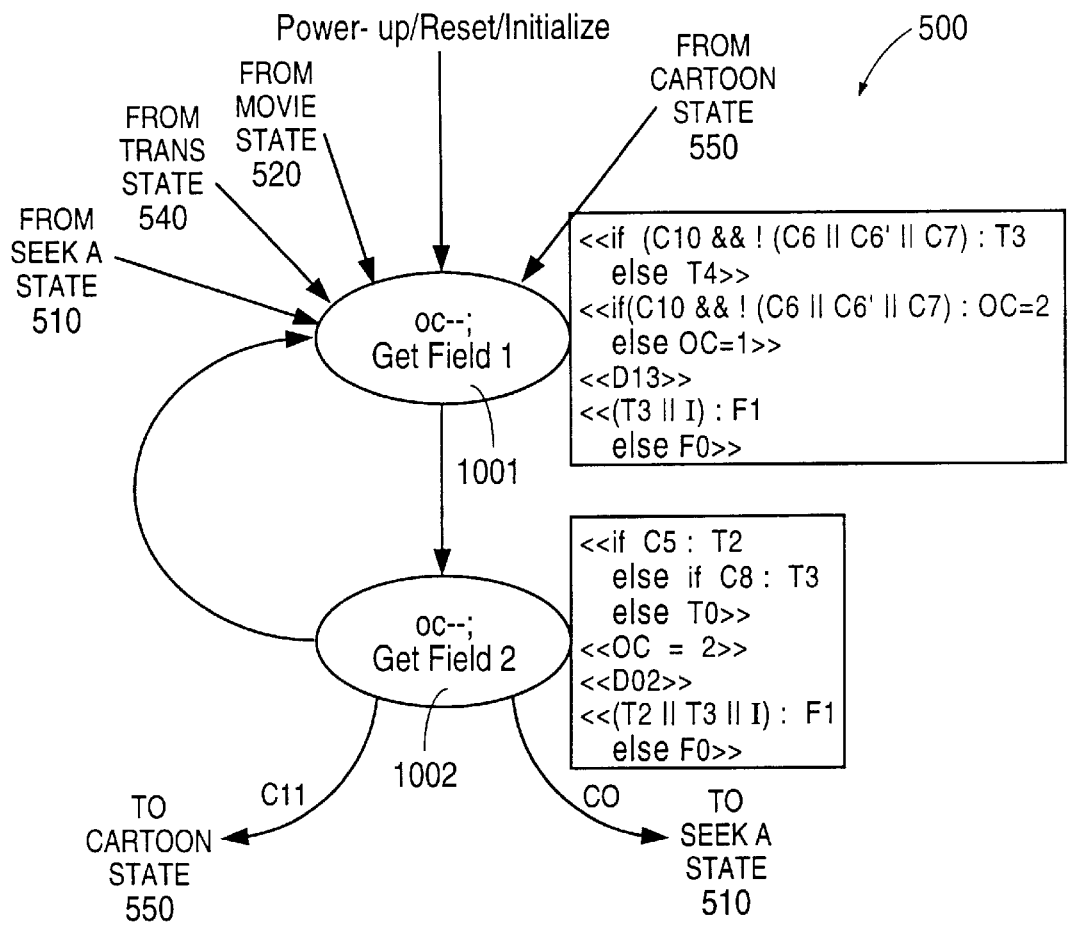
FIG. 10 is a state diagram for the video state within the state machine within the controller of FIGS. 4A and 4B.

As explained above, the default mode of operation of video data stream analyzer 300 is defined by video state 500 of state machine 490. Video state 500 is illustrated in more detail in FIG. 10. Video state 500 has two sub-states 1001 and 1002. Controller 402 enters sub-state 1001 upon a power-up or reset with modulo three output counter set to a value of two. The operations of seek A state 510, movie state 520, seek B state 530, trans state 540, and cartoon state 550 are discussed more completely below.

Sub-state 1001 is executed while an odd parity field is entering reordering memory 403. Sub-state 1002 is entered on the field sync indicating that the even parity field is entering reordering memory 403.

In sub-state 1001, state machine performs the operations indicated by Table 5, if and only if modulo three output counter OC has a value zero.

TABLE 5

Operations in sub-state 1001

<<if ( C10 && !( C6 || C6' || C7 )) : T3 else T4 >>
<<if ( C10 && !( C6 || C6' || C7 )) :
        OC = 2 else OC = 1 >>
<<D13>>
<< if (T3 || I) : F1 else F0>>

Status condition C10 is required to recover from a possible false alarm that might have previously caused controller 402 to assume that a telecine sequence was encountered. Upon detection of the possible start of a new telecine sequence, controller 402 transitions from video sub-state 1002 to seek A state 510. However, if the detection of the possible start of a telecine sequence was a false alarm, controller 402 loops back to video state 500 from seek A state 510. Under these circumstances, controller 402 has to remix another frame to "undo" the field dropping done in response to the false alarm. Status condition C10 tells controller 402 to take these actions.

If status condition C10 is true and none of status conditions C6, C6', and C7 are true, the read registers are each advanced by two locations in reordering memory 403 by selecting output field selection code T3. Field one is read as both the odd and even parity fields of the output frame. One of status conditions C6, C6', or C7 is true if the corresponding status condition, i.e., status condition C2, C2', or C3, respectively, was true three sub-states earlier. Three sub-states earlier, the display code was set to D04 and therefore it is necessary to ensure that exactly two dead periods follow. This is accomplished by setting the output field selection code to T4 if any one of status conditions C6, C6', and C7 are true.

Since data is being selected for output if the output field selection code is set to T3, modulo three output counter OC is reset to a value of two and otherwise to a value of one. Since one field is being dropped in the frame, display code D13 is selected to indicate that the even parity field in the frame should be repeated to reconstruct the video sequence. If either output field selection code T3 was selected or bit 3 in register SP is set, the output format code is F1 and otherwise the output format is F0.

Herein, whenever the output field selection code is either T2 or T3, output format code F1 is selected. This is because output field selection codes T2 and T3 both require that the same field be read twice and in such a situation vertical filtering on a field grid is preferred.

If modulo three output counter OC is zero and status condition C10 is not true, output field selection code T4 is selected and modulo three output counter OC is set to a value of one. Output field selection code T4 causes the read address registers to be incremented by one location and no data is read from reordering memory 403. Consequently, the display code and the output format are not utilized and no side channel information is generated.

On the next field sync, modulo three output counter OC is decremented and processing transfers to sub-state 1002. Also, if status condition C10 was true, the field addressed by read_1 register is output twice in video data output stream 302.

In sub-state 1002, state machine 480 performs the operations indicated by Table 6, if and only if modulo three output counter OC has a value zero.

TABLE 6

Operations in sub-state 1002

<<if C5 : T2 else if C8 : T3 else T0 >>
<<OC = 2>>
<<D02>>
<<if (T2 || T3 || I) : F1 else F0>>

If status condition C5 is true, i.e, a mid-frame edit was detected in the previous frame, the read registers are each advanced two locations in reordering memory 403 by selecting output field selection code T2 and the mid-frame edit repair is completed by selecting field two as both the odd and even parity fields of the output frame. If status condition C8 is true, i.e, the even parity field of the frame previous to the current frame was repeated, and status condition C5 is not true, the read registers are each advanced two locations in reordering memory 403 by selecting output field selection code T3 and the repeated even parity field is eliminated by selecting field one as both the odd and even parity fields of the output frame. If neither status condition C8 is true, nor status condition C5 is true, the read registers are each advanced two locations in reordering memory 403 by selecting output code T0 and video output sequence is taken in the normal order of field one followed by field two.

After the output field selection code is determined in sub-state 1002, modulo three output counter OC is set to a value of two and the default display code D02 is selected. Finally, if output field selection code T2 or T3 was selected, or bit 3 in register SP is set, the output format code is F1 and otherwise the output format is F0.

If neither status condition C0 nor status condition C11 is true, processing transfers from sub-state 1002 to sub-state 1001 on the next field sync. As used herein in the discussion of state machine 480, "the next field sync" means the first field sync that occurs after the sub-state is entered. Consequently, as long as neither status condition C0 nor status condition C11 is satisfied, state machine 480 and consequently controller 402 continues in video state 500. Thus, if input video data stream 301 is a regular 30 fps video sequence, controller 402 continues outputting the same sequence, unaltered. If a mid-frame edit is detected in input video data stream 301, the first field of the mixed-frame is replaced with the second field.

Figure 11:
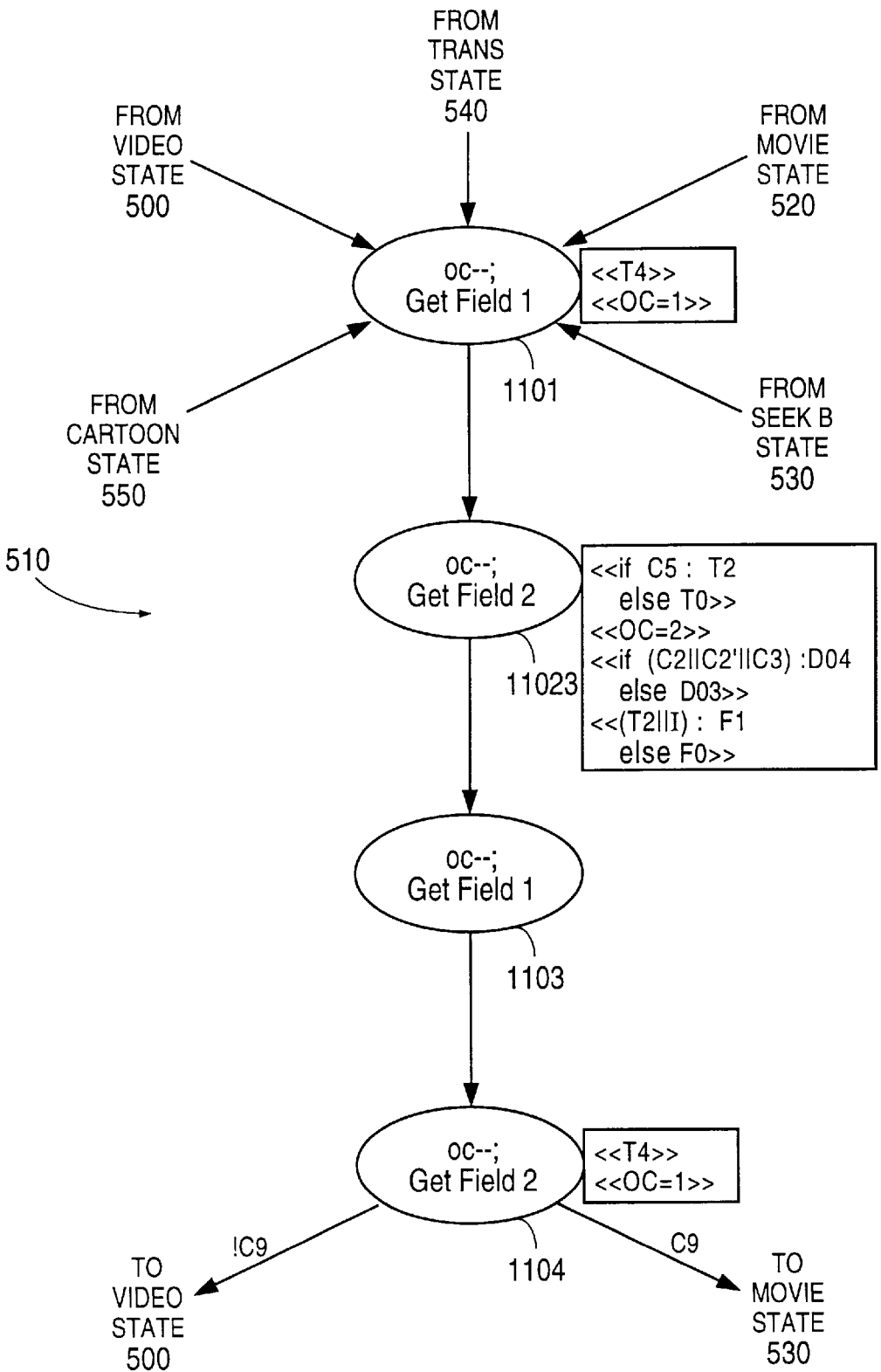
FIG. 11 is a state diagram for the first seek state within the state machine within the controller of FIGS. 4A and 4B.

If either status condition C0 or status condition C11 is true, processing does not return from sub-state 1002 to sub-state 1001, but rather branches to a new state on a field sync. If status condition C0 is true, processing transfers from sub-state 1002 in video state 500 to sub-state 1101 (FIG. 11) in seek A state 510. State machine 480 also enters sub-state 1101 from trans state 540 and movie state 520. As shown in FIG. 11, seek A state 510 has four sub-states 1101, 1102, 1103, and 1104. Since seek A state 510 is entered whenever a telecine sequence is expected, the four additional field periods of seek A 510 are needed to ascertain whether input video data stream 301 is actually a telecine sequence.

Sub-states 1101 is executed while a first odd parity field is entering reordering memory 403. Sub-state 1102 is entered on the field sync indicating that a first even parity field is entering reordering memory 403. Sub-state 1103 is entered on the field sync indicating that a second odd parity field is entering reordering memory 403. Sub-state 1104 is entered on the field sync indicating that a second even parity field is entering reordering memory 403. Note that the reference to a field entering reordering memory 403 is made with respect to entering seek A state 510 and not with respect to an absolute measure of the number of fields entering reordering memory 403.

In sub-state 1101, if modulo three output counter OC has a value of zero, the output field selection code is set to T4 and modulo three output counter OC is set to have a value of one. See Table 7. Consequently, the read address registers are each incremented by one location and no data is read from reordering memory 403. On the next field sync, processing transfers from sub-state 1101 to sub-state 1102 and modulo three output counter OC is decremented.

TABLE 7

Operations in sub-state 1101

<<T4>>
<<OC=1>>

In sub-state 1102, if modulo three output counter OC has a value of zero, the operations given in Table 8 are performed.

TABLE 8

Operations in sub-state 1102

<<if C5 : T2 else T0>>
<<OC=2>>
<<if (C2 || C2' || C3) : D04 else D03>>
<<if ( T2 || I) : F1 else F0>>

Specifically, if status condition C5 is true, i.e, a mid-frame edit was detected in the previous field, the read registers are each advanced two locations in reordering memory 403 by selecting output field selection code T2 and the mid-frame edit repair is completed by selecting field two as both the odd and even parity fields of the output frame. If status condition C5 is not true, the read registers are each advanced two locations in reordering memory 403 by selecting output code T0 and the video output sequence is taken in the normal order of field one followed by field two.

After the output field selection code is determined in sub-state 1102, modulo three output counter OC is set to a value of two. If either status condition C2, status condition C2' or status condition C3 is true, display code D04 is selected and otherwise, display code D03 is selected. As indicated above, display code D04 means that the frame is repeated while display code D03 means that the odd parity field in the output frame is repeated. Finally, if output field selection code T2 was selected, or bit 3 in register SP is Bet, the output format code is F1 and otherwise the output format is F0.

On the next field sync, processing transfers from sub-state 1102 to sub-state 1103 and modulo three output counter OC is decremented. Since modulo three output counter OC can not take on a zero value in sub-state 1103, state machine 480 is quiescent during this field period. On the next field sync, processing transfers from sub-state 1103 to sub-state 1104.

State machine 480 performs the operations in Table 7 upon entering sub-state 1104 if modulo three output counter OC has a value of zero. Since these operations are identical to those given in sub-state 1101, the description given of these operations for sub-state 1101 is incorporated herein by reference.

As mentioned above, controller 402 enters this state whenever a first repeated odd parity field is detected where "first repeated odd parity field" means the first repeated odd parity field in a new telecine sequence. At the end of sub-state 1104, if controller 402 sees a repeated even parity field, i.e, status condition C9 is true, a telecine sequence has been detected. Note that in the telecine sequence the repeated even parity field appears five fields after the repeated odd parity field, however, one field interval out of the five was passed in video state 500. Thus, at the end of sub-state 1104, seek A state 510 transfers to either video state 500 or movie state 520 depending on the state of status condition C9.

Figure 12:
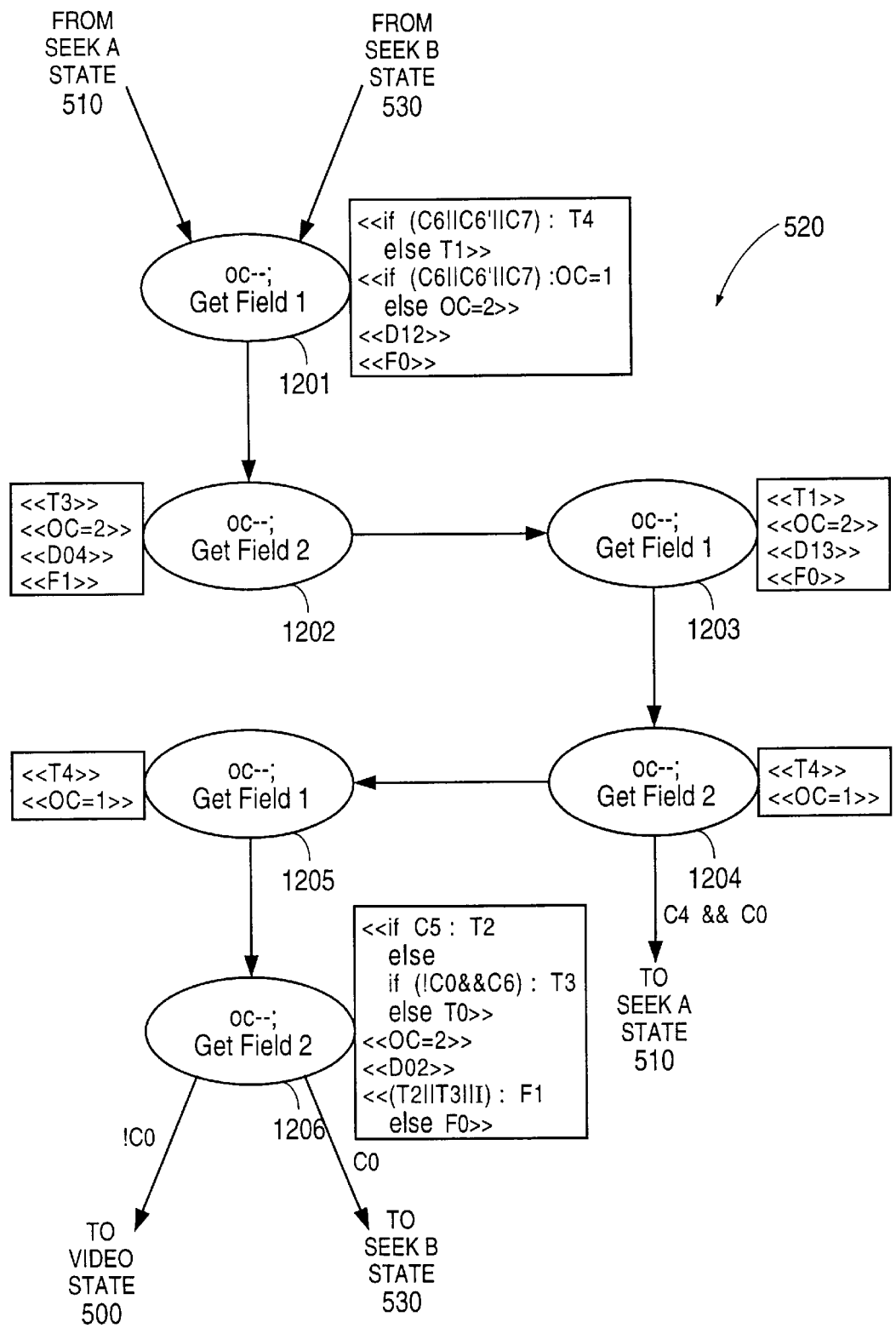
FIG. 12 is a state diagram for the movie state within the state machine within the controller of FIGS. 4A and 4B.

If status condition C9 is true, a telecine sequence has been encountered and so processing transfers on the next field sync from sub-state 1104 in seek A state 510 to sub-state 1201 (FIG. 12) in movie state 520. Also, modulo three output counter OC is decremented. Since a telecine sequence has been detected, movie state 520 has six sub-states 1201 to 1206, because another repeated field is not anticipated for five fields, which is the first field of a frame.

In sub-state 1201, if modulo three output counter OC has a value of zero, the operations given in Table 9 are performed.

TABLE 9

Operations in sub-state 1201

<<if ( C6 || C6' || C7 ) : T4 else T1>>
<<if ( C6 || C6' || C7 ) : OC=1 else OC=2>>
<<D12>>
<<F0>>

Specifically, if any one of status condition C6, C6' or C7 is true, output field selection code T4. The read registers are each advanced one location in reordering memory 403 by selecting output field selection code T4 and the subsequent selection of the display code and the output format are ignored because no data is read from reordering memory 403. As explained above, status condition C6 is true if there is a scene cut between the frame previous to the current frame and the frame preceding that frame. Status condition C6' is true if the frame previous to the frame preceding the current frame and the frame formed by combining the odd parity field of the frame previous to the current frame and the preceding even parity field are both interlaced. Status condition C7 is true if the frame preceding the current frame by two frame had a mid-frame edit. If all of status conditions C6, C6' and C7 are not true, the read registers are each advanced two locations in reordering memory 403 by selecting output code T1 and the video output sequence is taken in the inverse of the normal order, i.e., field two followed by field one.

After the output field selection code is determined in sub-state 1201, if any one of status condition C6, C6' or C7 is true, modulo three output counter OC is set to a value of one and otherwise to a value of two and display code D12 is selected. As indicated above, display code D12 means that the even parity field in the frame is displayed and then the odd parity field. Finally, bit three of scan pattern register SP is not used to select the output format, because state machine 480 is in movie state 520 and the frame mode is automatically selected as the output format.

On the next field sync, processing transfers from sub-state 1201 to sub-state 1202 and modulo three output counter OC is decremented. In sub-state 1202, if modulo three output counter OC has a value of zero, the operations given in Table 10 are performed.

TABLE 10

Operations in sub-state 1202

<<T3>>
<<OC=2>>
<<D04>>
<<F1>>

Specifically, the output field selection code is set to T3 which advances the read registers by two locations in reordering memory 403 and field one is repeated in the video output sequence. Modulo three output counter OC is set to a value of two and the display code is set to D04. As indicated above, display code D04 means that the output frame is repeated. Again, bit three of scan pattern register SP is not used to select the output format, because state machine 480 is in movie state 520. On the next field sync, processing transfers from sub-state 1202 to sub-state 1203 and modulo three output counter OC is decremented.

In sub-state 1203, controller performs the operations given in Table 11 if value of modulo three output counter OC is zero.

TABLE 11

Operations in sub-state 1203

<<T1>>
<<OC=2>>
<<D13>>
<<F0>>

Specifically, the output field selection code is set to T1 which advances the read registers by two locations in reordering memory 403 and the video output sequence is taken in the inverse of the normal order, i.e., field two is followed by field one. Modulo three output counter OC is set to a value of two and the display code is set to D13. As indicated above, display code D13 means that the even parity field in the output frame is displayed, then the odd parity field, and then the even parity field again. Again, bit three of scan pattern register SP is not used to select the output format, because state machine 480 is in movie state 520. On the next field sync, processing transfers to sub-state 1204 and modulo three output counter OC is decremented.

In sub-state 1204, if modulo three output counter OC has a value of zero, the operations in Table 12 are performed.

TABLE 12

Operations in sub-state 1204

<<T4>>
<<OC=1>>.

The output field selection code is set to T4 and modulo three output counter OC is set to have a value of one. Consequently, the read address registers are each incremented by one location and no data is read from reordering memory 403.

Also in state 1204, status conditions C4 and C0 are checked. If both status conditions C4 and C0 are true, processing on the next field sync goes to sub-state 1101 in seek A state 510 and otherwise to sub-state 1205. Conditions C0 and C4 are both true when the current frame and the frame before the current frame belong to different scenes and the odd parity field in the current field is repeated and the even parity field is not. In other words, the previous frame ended one telecine video sequence, and the current frame, i.e., the last frame that enter reordering memory 403, appears to be the start of another telecine video sequence. If either status condition C4 or C0 is not true, on the next field sync, processing transfers from sub-state 1204 to sub-state 1205 and modulo three output counter OC is decremented.

In sub-state 1205, modulo three output counter OC has a value of zero, and so the output field selection code is set to T4 and modulo three output counter OC is set to have a value of one. See Table 13. Consequently, the read address registers are each incremented by one location and no data is read from reordering memory 403. On the next field sync, processing transfers from sub-state 1205 to sub-state 1206 and modulo three counter output OC is decremented.

TABLE 13

Operations in sub-state 1205

<<T4>>
<<OC=1>>

In sub-state 1206, state machine 480 performs the operations indicated by Table 14.

TABLE 14

Operations performed in sub-state 1206

<<if C5 : T2 else if ( !C0 && C6 ) : T3 else T0 >>
<<OC =2>>
<<D02>>
<<if (T2 || T3 || I) : F1 else F0>>

If status condition C5 is true, i.e, a mid-frame edit was detected in the previous field, the read registers are each advanced two locations in reordering memory 403 by selecting output field selection code T2 and the mid-frame edit repair is completed by selecting field two as both the odd and even parity fields of the output frame. If status condition C0 is false and status condition C6 is true, i.e, the odd parity field of the current frame is not repeated and there was a scene cut between the frame previous to the current frame and the frame preceding the previous frame, and status condition C5 is not true, the read registers are each advanced two locations in reordering memory 403 by selecting output field selection code T3 and the repeated or isolated even parity field is eliminated by selecting field one as both the odd and even parity fields of the frame. If either status condition C0 is true or status condition C6 is not true, and status condition C5 is not true, the read registers are each advanced two locations in reordering memory 403 by selecting output code T0 and video output sequence 302 is taken in the normal order of field one followed by field two.

After the output field selection code is determined in sub-state 1206, modulo three output counter OC is set to a value of two and default display code D02 is selected. Finally, if output field selection code T2 or T3 was selected, or bit 3 in register SP is set, the output format code is F1 and otherwise the output format is F0. Note at this point, the output format code is processed because the telecine sequence could have actually ended a few frames back and so the expected repeat of the odd parity field may not be detected.

On the next field sync, processing transfers to either sub-state 1001 in video state 500 or sub-state 1301 in seek B state 530. Specifically, if status condition C0 is true, i.e., if the expected repeated odd parity field has been detected, processing transfers to sub-state 1301 and otherwise to sub-state 1001.

Figure 13:
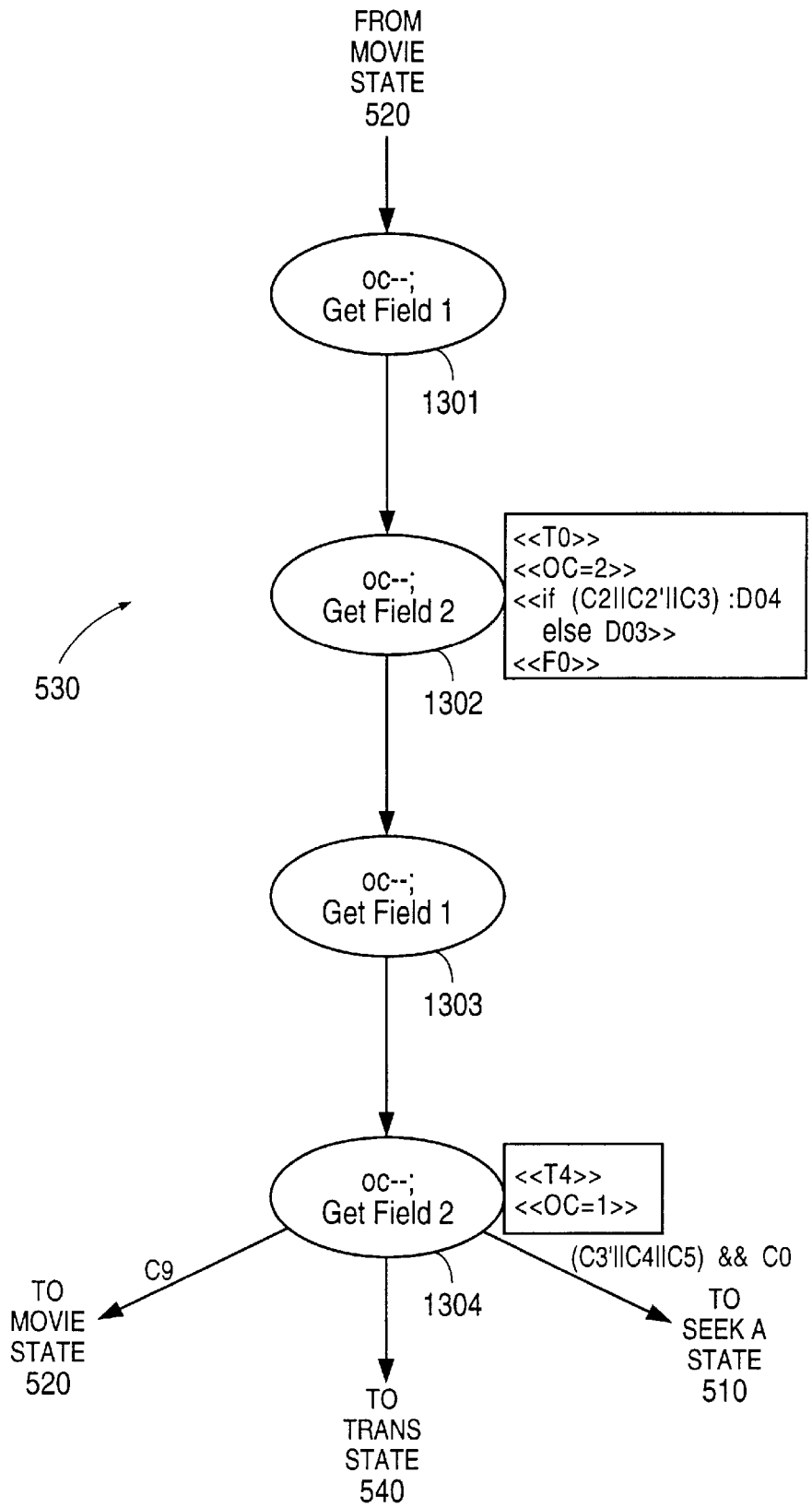
FIG. 13 is a state diagram for the second seek state within the state machine within the controller of FIGS. 4A and 4B.

As shown in FIG. 13, seek B state 530 has four sub-states 1301, 1302, 1303, and 1304. Seek B state 530 is entered whenever a repeated odd parity field of a telecine sequence has been detected. The four additional field periods are needed to ascertain whether the input video data stream is still continuing as a telecine sequence.

Sub-state 1301 is executed while a first odd parity field is entering reordering memory 403. Sub-state 1302 is entered on the field sync indicating that a first even parity field is entering reordering memory 403. Sub-state 1303 is entered on the field sync indicating that a second odd parity field is entering reordering memory 403. Sub-state 1304 is entered on the field sync indicating that a second even parity field is entering reordering memory 403. The reference to a field entering reordering memory 403 is made with respect to entering seek B state 530 and not with respect to an absolute measure of the number of fields entering reordering memory 403.

In sub-state 1301, modulo three output counter OC can not have a zero value and so no operations are performed in this sub-state. On the next field sync, processing transfers to sub-state 1302 and modulo three output counter OC is decremented.

In sub-state 1302, if modulo three output counter OC has a value of zero, the operations given in Table 15 are performed.

TABLE 15

Operations in sub-state 1302

<<T0>>
<<OC=2>>
<<if ( C2 || C2' || C3 ) : D04 else D03>>
<<F0>>

Specifically, the read registers are each advanced two locations in reordering memory 403 by selecting output field selection code T0 and the video output sequence is taken in the normal order of field one followed by field two. Modulo three output counter OC is set to a value of two.

If any of one of status condition C2, status condition C2', or status condition C3 is true, the display code is set to D04 to indicate that the current frame should be displayed in the normal order of the odd parity field followed by the even parity field and then the display should be repeated. If none of status condition C2, status condition C2', or status condition C3 is true, the display code is set to D03. As indicated above, display code D03 means that the odd parity field in the frame is repeated. Finally, bit three of scan pattern register SP not is used to select the output format.

On the next field sync, processing transfers from sub-state 1302 to sub-state 1303 and modulo three output counter OC is decremented. Since modulo three output counter OC can not take on a zero value in sub-state 1303, state machine 480 is quiescent during this field period. On the next field sync, processing transfers from sub-state 1303 to sub-state 1304.

State machine 480 performs the operations in Table 16 upon entering sub-state 1304 if modulo three output counter OC has a value of zero.

TABLE 16

Operations in sub-state 1304

<<T4>>
<<OC=1>>

Since these operations are identical to those given in sub-state 1101, the description given for sub-state 1101 is incorporated herein by reference.

As mentioned above, controller 402 enters this state whenever a repeated odd parity field is detected in movie state 520. At the end of sub-state 1304, if controller sees a repeated even parity field, i.e, status condition C9 is true, another telecine sequence has been detected. Note that in the telecine sequence the repeated even parity field appears five fields after the repeated odd parity field, however, one field interval in the sequence was passed in movie state 520. Thus, at the end of sub-state 1104, seek B state 530 transfers to movie state 520 if status condition C9 is true.

If status condition C9 is not true, state machine 480 also determines whether status condition C0 and any one of status conditions C3', C4, or C5 is true. If status condition C0 and any one of status conditions C3', C4, or C5 are true, processing transfers to sub-state 1101 in seek A state 510 and otherwise to sub-state 1401 in trans state 540. If status conditions C4 or C5 are true, either a mid-frame edit was detected or a scene change occurred. As indicated previously, status condition C0 is true whenever the start of a telecine sequence is expected. Thus, processing transfers to seek A state 510 when the previous telecine sequence was interrupted, but it appears that another telecine sequence is starting.

If processing does not transfer from sub-state 1304 to either movie state 520 or seek A state 510, the telecine sequence has apparently ended and so processing transfers to trans state 540 to assure that the sequence is terminated properly.

Note that in the embodiment illustrated in FIG. 5B where only the primary criterion is used to detect repeated even parity fields, i.e, status condition C1 is used instead of status condition C9, there is what appears to be an indeterminate transition. Status condition C1 being true tells controller 402 to transition to movie state 520 while condition ((C3'||C4'||C5) && C0) being true tells controller 402 to transition to seek A state 510. If this situation occurs, controller 402 gives preference to the transition to movie state 520.

Figure 14:
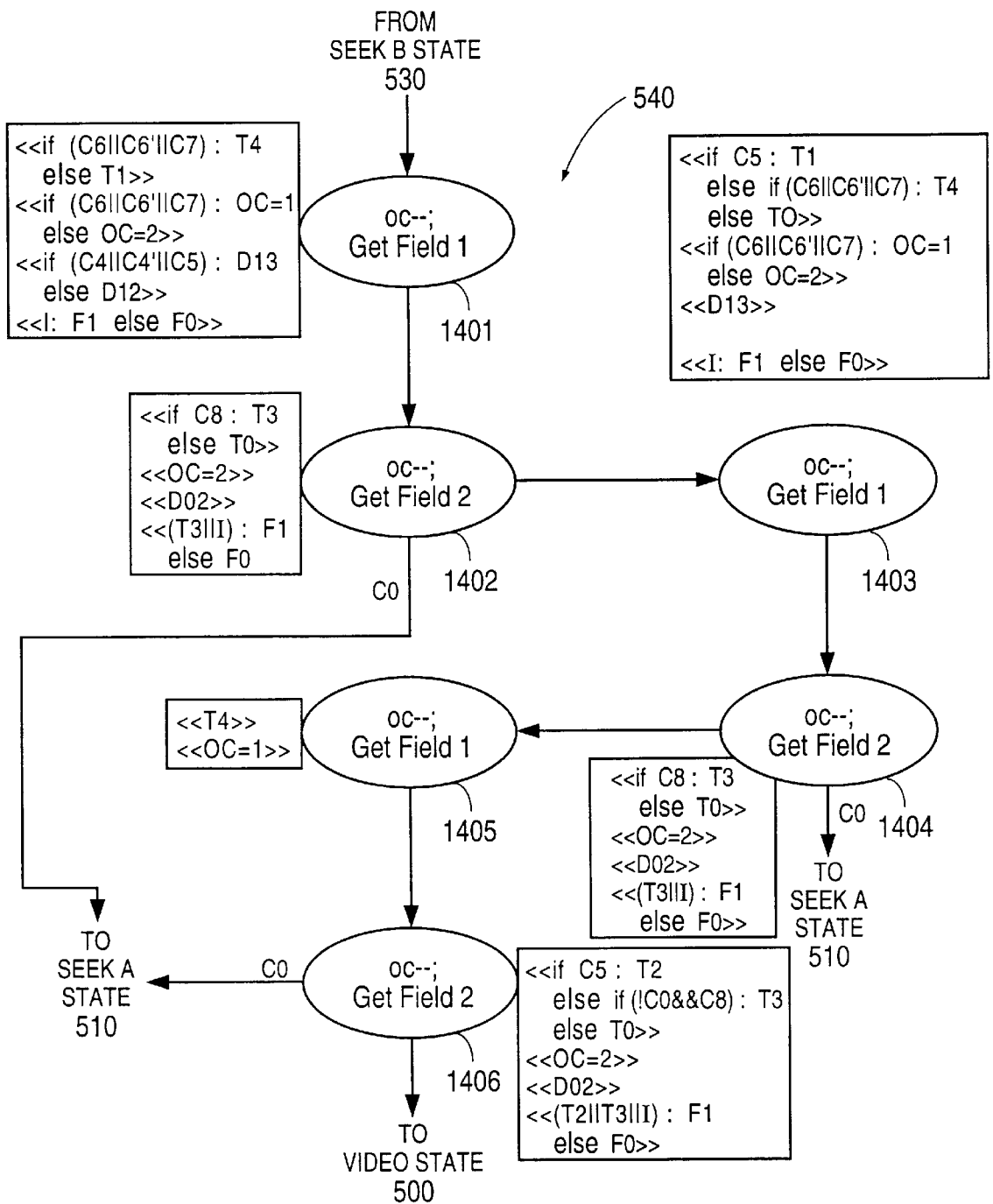
FIG. 14 is a state diagram for the transfer state within the state machine within the controller of FIGS. 4A and 4B.

Trans state 540 (FIG. 14) has six sub-states 1401 to 1406. Sub-state 1401 is entered only from seek B state 430. If modulo three output counter OC has a value of zero, the operations in Table 17 are performed and otherwise, on the next field sync, processing transfers from sub-state 1401 to sub-state 1402 and modulo three output counter OC is decremented.

TABLE 17

Operations in sub-state 1401

<< if (C6' || C6 || C7 ): T4 else T1 >>
<< if (C6' || C6 || C7 ): OC = 1 else OC =2 >>
<< if (C4 || C4' || C5 ): D13 else D12 >>
<< I : F1 else F0 >>

In sub-state 1401 if modulo three output counter OC has a value of zero and if any one of status conditions C6, C6' or C7 are true, the output field selection code is set to T4 and otherwise to T1. As described above, output field selection code T4 suppresses output from reordering memory 403 and output field selection code T1 outputs a frame from reordering memory 403 in the normal format of the odd parity field followed by the even parity field.

If any one of status conditions C6, C6' or C7 are true, modulo three output counter OC is set to a value of one and otherwise to a value of two. If any one of status conditions C4, C4', or C5 is true, the display code is set to D13 and otherwise to D12. Finally, if bit 3 in register SP is set, the output format code is F1 and otherwise the output format is F0.

In sub-state 1401, one of status conditions C6, C6', or C7 is true if the corresponding status condition, i.e., status condition C2, C2', or C3, respectively, was true three sub-states earlier. Three sub-states earlier, the display code was set to D04 and therefore it is necessary to ensure that exactly two dead periods follow. This is accomplished by setting the output field selection code to T4. If none of status conditions C6, C6' or C7 are true, the trailing frames are remixed and hence the output field selection code is T1. After performance of the operations in sub-state 1401, on the next field sync, processing transfers from sub-state 1401 to sub-state 1402 and modulo three output counter OC is decremented.

In sub-state 1402, the operations given in Table 18 are performed if modulo three output counter OC has a value of zero.

TABLE 18

| Operations in sub-state 1402 |
| --- |
| << if C8 : T3 else T0 >> <br> <<OC =2>> <br> <<D02>> <br> <<if ( T3 ‖ I ) : F1 else F0>> |

If status condition C8 is true, i.e, the even parity field of the frame previous to the current frame was repeated, the read registers are each advanced two locations in reordering memory 403 by selecting field output field selection code T3 and the repeated even parity field is eliminated by selecting field one as both the odd and even parity fields of the output frame. If status condition C8 is not true, the read registers are each advanced two locations in reordering memory 403 by selecting output field selection code T0 and video output sequence 302 is taken in the normal order of field one followed by field two.

After the output field selection code is determined in sub-state 1402, modulo three output counter OC is set to a value of two and default display code D02 is selected. Finally, if the output field selection code is T3 or bit three of scan pattern register SP is true, the output format code is F1 and otherwise F0.

If status condition C0 is not true, processing transfers from sub-state 1402 to sub-state 1403 on the next field sync. If status condition C0 is true, i.e., another telecine sequence appears to have started, processing transfers from sub-state 1402 to seek A state 510.

In sub-state 1403, the operations given in Table 19 are performed if modulo three output counter OC has a value of zero.

TABLE 19

| Operations in sub-state 1403 |
| --- |
| <<if C5 : T1 else if ( C6 ‖ C6' ‖ C7 ) : <br>     T4 else T0>> <br> <<if ( C6 ‖ C6' ‖ C7 ) : OC = 1 else OC=2>> <br> <<D13>> <br> <<I : F1 else F0>> |

Specifically, if status condition C5 is true, i.e, a mid-frame edit was detected in the previous frame, the read registers are each advanced two locations in reordering memory 403 by selecting output field selection code T1 and the mid-frame edit repair is completed by outputting the fields in the inverse of the normal sequence, i.e., the even parity field followed by the odd parity field. If either status condition C6, status condition C6', or status condition C7 is true, i.e., a scene cut has occurred, and status condition C5 is not true, the read registers are each advanced one location in reordering memory 403 by selecting output code T4 and no fields are output in video output sequence 302. If neither status condition C6, status condition C6', nor status condition C7 is true, and status condition C5 is not true, the read registers are each advanced two locations in reordering memory 403 by selecting output field selection code T0 and the fields are output in video output field selection sequence 302 in the normal order.

After the output field selection code is determined in sub-state 1403, if either status condition C6, status condition C6', or status condition C7 is true, modulo three output counter OC is set to a value of one and otherwise to a value of two. The display code is set to D13. As indicated above, display code D13 means that the even parity field should be displayed followed by the odd parity field and then the even parity field in the frame should be repeated. Finally, bit three of scan pattern register SP is used to select the output format.

On the next field sync, processing transfers from sub-state 1403 to sub-state 1404 and modulo three output counter OC is decremented. If modulo three output counter OC takes the value of zero in sub-state 1404, the operations given in Table 18 are performed. Specifically, the operations performed in sub-state 1404 are identical to those performed in sub-state 1402 and that description is incorporated herein by reference. Prior to leaving sub-state 1404, state machine 480 checks status condition C0 to ascertain whether it appears that another telecine sequence has started. If status condition C0 is true, processing transfers on the next field sync to seek A state 510 and otherwise to sub-state 1405.

State machine 480 performs the operations in Table 7 upon entering sub-state 1405 if modulo three output counter OC has a value of zero. Since these operations are identical to those given in sub-state 1101, the description of the operations given for sub-state 1101 is incorporated herein by reference. On the next field sync, processing transfers from sub-state 1405 to sub-state 1406.

In sub-state 1406, state machine 480 performs the operations indicated by Table 20 if modulo three output counter OC has a value of zero.

TABLE 20

| Operations performed in sub-state 1406 |
| --- |
| <<if C5 : T2 else if ( !C0 && C8 ) : T3 else T0 >> <br> <<OC =2>> <br> <<D02>> <br> << if ( T2 ‖ T3 ‖ I ) : F1 else F0>> |

If status condition C5 is true, i.e, a mid-frame edit was detected in the previous frame, the read registers are each advanced two locations in reordering memory 403 by selecting output field selection code T2 and the mid-frame edit repair is completed by selecting field two as both the odd and even parity fields of the frame. If status condition C0 is false and status condition C8 is true, i.e, the odd parity field of the current field is not repeated and the even parity field in the frame preceding the current frame was repeated, and status condition CS is not true, the read registers are each advanced two locations in reordering memory 403 by selecting output field selection code T3 and the repeated even parity field is eliminated by selecting field one as both the odd and even parity fields of the frame. If either status condition C0 is true or status condition C8 is not true, and status condition C5 is not true, the read registers are each advanced two locations in reordering memory 403 by selecting output field selection code T0 and video output sequence 302 is taken in the normal order of field one followed by field two.

After the output field selection code is determined in sub-state 1406, modulo three output counter OC is set to a value of two and default display code D02 is selected. Finally, if output field selection code T2 or T3 was selected, or bit 3 in register SP is set, the output format code is F1 and otherwise the output format is F0.

On the next field sync, processing transfers to either sub-state 1001 in video state 500 or sub-state 1101 in seek A state 510. Specifically, if status condition C0 is true, i.e., the possible start of another telecine sequence has been detected, processing transfers to sub-state 1101 and otherwise to sub-state 1001.

Figure 15:
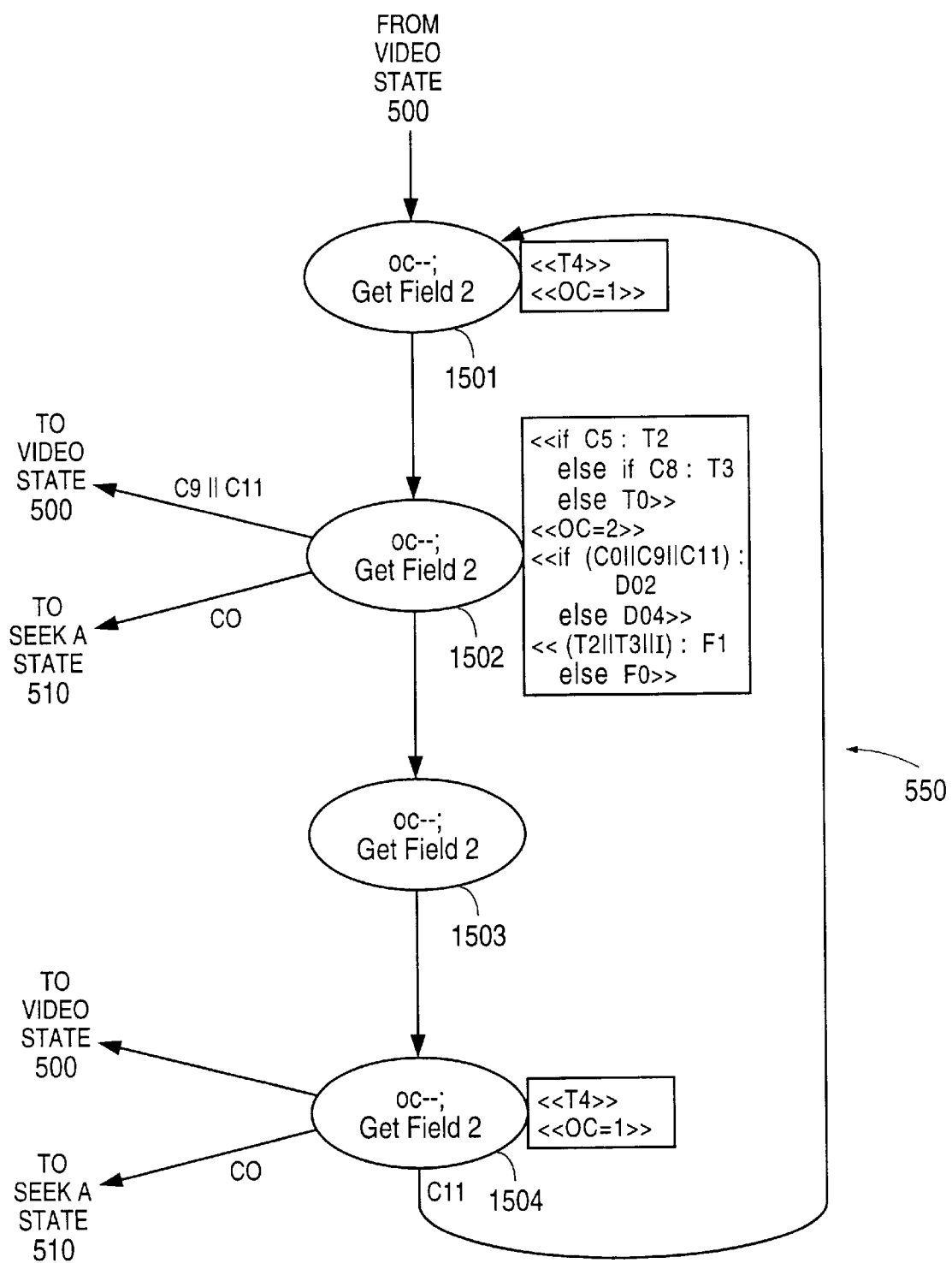
FIG. 15 is a state diagram for the cartoon state within the state machine within the controller of FIGS. 4A and 4B.

Recall that in sub-state 1002 of video state 500 processing transferred to cartoon state 550 if status condition C11 was true. Cartoon state 550 (FIG. 15) has four sub-states 1501 to 1504 and is entered only from video state 500.

State machine 480 performs the operations in Table 7 upon entering sub-state 1501 if modulo three output counter OC has a value of zero. Since these operations are identical to those given in sub-state 1101, the description given for the operations of sub-state 1101 is incorporated herein by reference. On the next field sync, processing transfers from sub-state 1501 to sub-state 1502.

In sub-state 1502, state machine 480 performs the operations given in Table 21, if modulo three output counter OC has a value of zero.

TABLE 21

Operations performed in sub-state 1502

<<if C5 : T2 else if C8 : T3 else T0 >>
<<OC =2>>
<<if ( C0 || C9 || C11 ) : D02 else D04 >>
<< ( T2 || T3 || I ) : F1 else F0>>

If status condition C5 is true, i.e. a mid-frame edit was detected in the previous frame, the read registers are each advanced two locations in reordering memory 403 by selecting output field selection code T2 and the mid-frame edit repair is completed by selecting field two as both the odd and even parity fields of the frame. If status condition C8 is true, i.e, the even parity field in the frame preceding the current frame was repeated, and status condition C5 is not true, the read registers are each advanced two locations in reordering memory 403 by selecting output field selection code T3 and the repeated even parity field is eliminated by selecting field one as both the odd and even parity fields of the output frame. If status condition C8 is not true and status condition C5 is not true, the read registers are each advanced two locations in reordering memory 403 by selecting output field selection code T0 and video output sequence 302 is taken in the normal order of field one followed by field two.

After the output field selection code is determined in sub-state 1406, modulo three output counter OC is set to a value of two. If any one of status conditions C0, C9 or C11 is true, the output display code is set to D02 and otherwise to D04. Finally, if output field selection code T2 or T3 was selected, or bit 3 in register SP is set, the output format code is F1 and otherwise the output format is F0.

On the next field sync, processing transfers to either sub-state 1001 in video state 500, sub-state 1101 in seek A state 510, or sub-state 1503. Specifically, if status condition C0 is true, i.e., the possible start of another telecine sequence has been detected, processing transfers to sub-state 1101. If status condition C0 is not true and either status condition C9 or C11 is true processing transfers to video state 500 and otherwise to sub-state 1503.

In sub-state 1503, modulo three output counter OC can not have a zero value and so no operations are given, on the next field sync, processing transfers from sub-state 1503 to sub-state 1504.

State machine 480 performs the operations in Table 7 upon entering sub-state 1504 if modulo three output counter OC has a value of zero. Since these operations are identical to those given in sub-state 1101, the description of the operations given for sub-state 1101 is incorporated herein by reference. On the next field sync, processing transfers from sub-state 1504 to one of sub-state 1501, video state 500 or seek A state 510.

Specifically, if status condition C11 is true, i.e., the cartoon sequence continues, processing transfers to sub-state 1501. If status condition C11 is not true and status condition C0 is true, processing transfers to seek A state 510, and otherwise to video state 500.

Figure 4B:
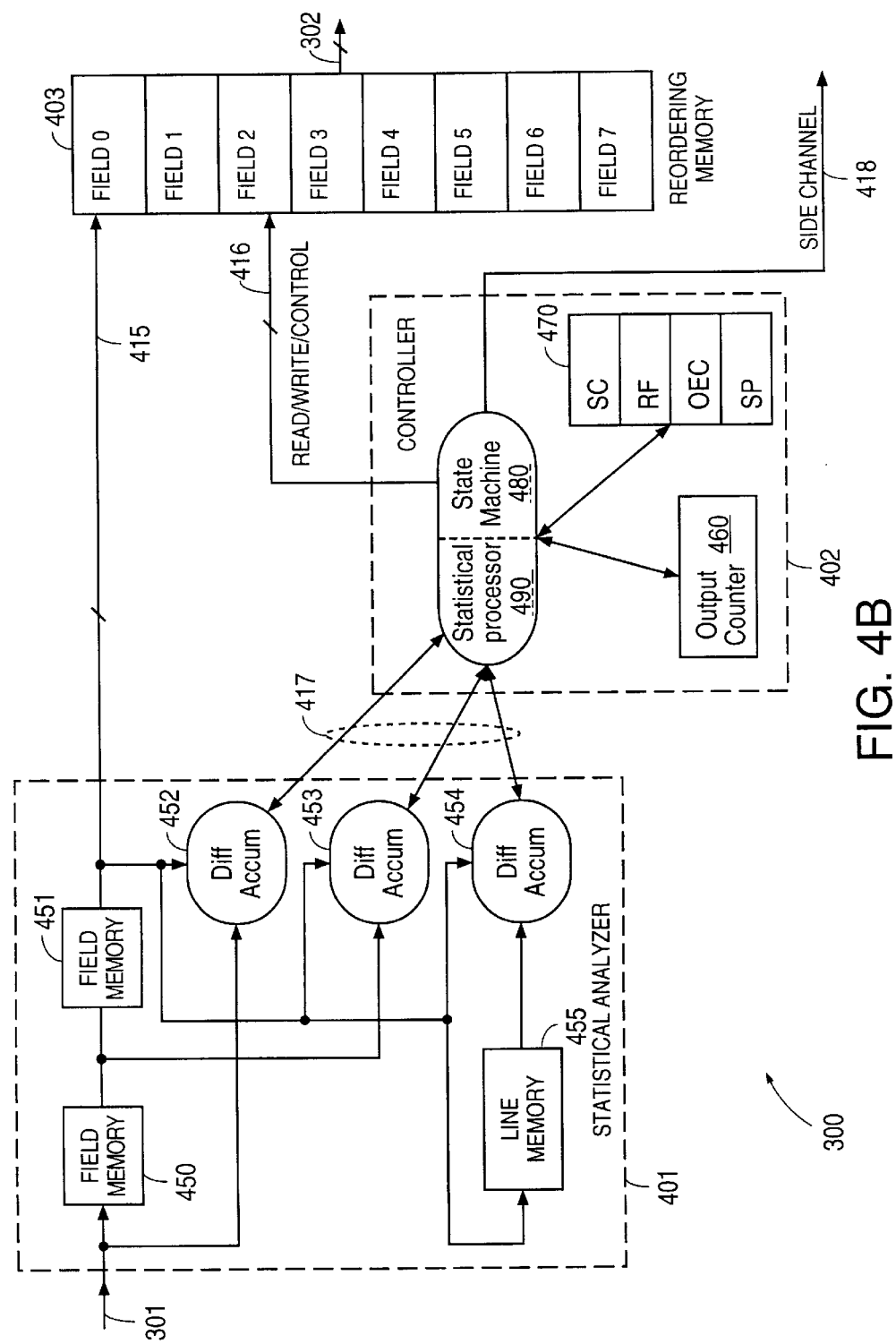
FIG. 4B is a more detailed block diagram of one embodiment of the video data stream analyzer of this invention.
Figure 16:
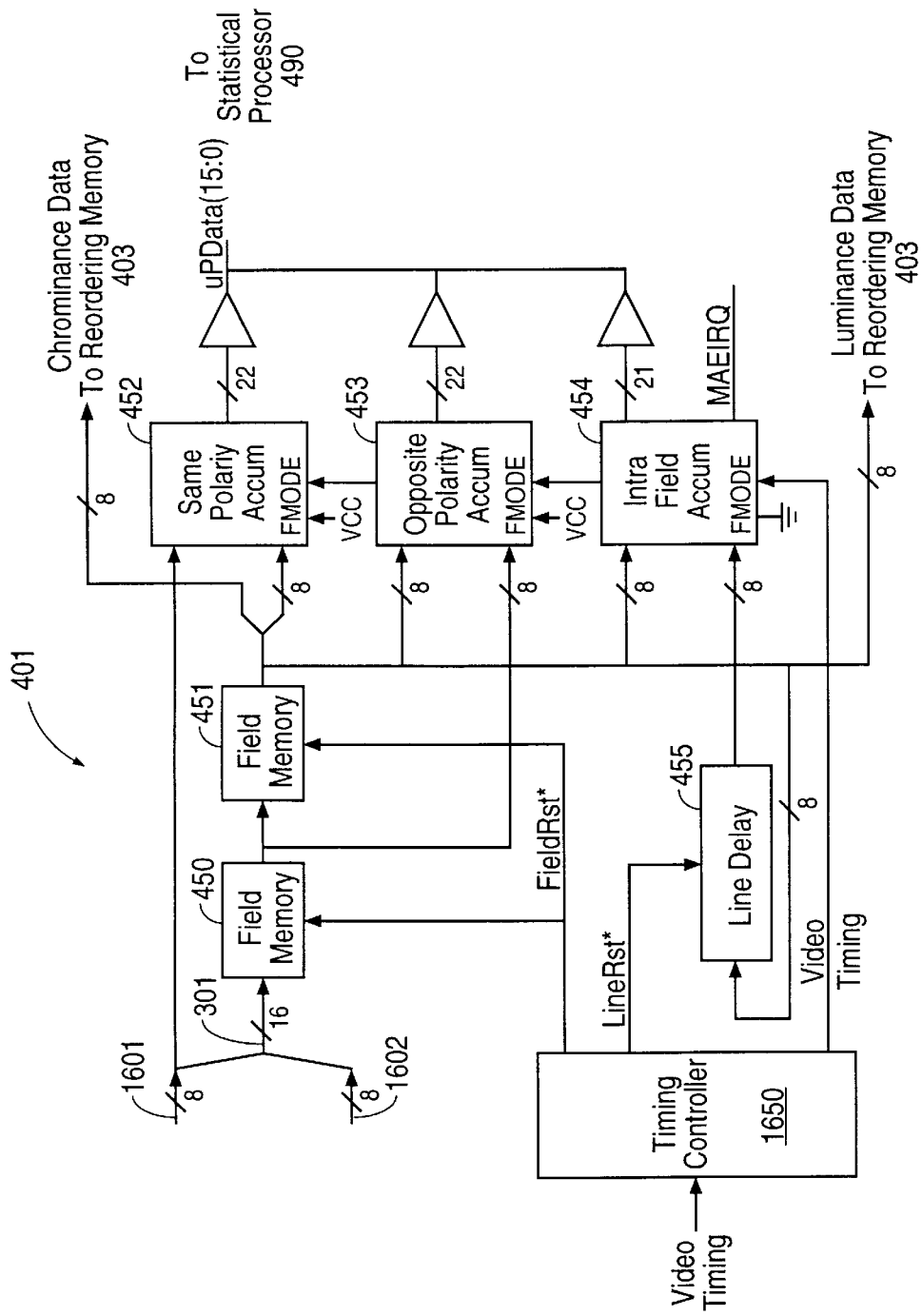
FIG. 16 is an even more detailed block diagram for the statistics analyzer of this invention.

FIG. 4B is a block diagram of one embodiment of this invention. Statistical analyzer 401 is shown in more detail in FIG. 16. In this embodiment, the luminance data and chrominance data are supplied to statistical analyzer 401 by eight bit bus 1601 and eight bit bus 1602, respectively from buffers. One eight bit bus carries luminance data. The other eight bit bus carries samples alternating between the associated two chrominance data, e.g., Cb and Cr. The video format with chrominance having half the horizontal resolution of luminance is know as 4:2:2. Hence, this hardware embodiment processes video data in which the two chrominance data each have half the number of pixels per line relative to the luminance data. Further, the hardware can process any frame size up to and including the CCIR-601 size (See ITU-R Recommendation 601 that was formally CCIR Recommendation 601) for both PAL and NTSC standards.

Eight bit bus 1601 and eight bit bus 1602 combine to form input bus 301 which drives field memory 450 and field memory 450 passes the data to field memory 451. In this embodiment, field memories 450, 451 each store all the data from each field, including vertical and horizontal blanking information. The chrominance data is only passed through field memories 450 and 451 and then passed directly to reordering memory 403. Hence, statistical analyzer 401 provides two field delays for both chrominance and luminance data, where a field delay is the time period between fields on input bus 301. Note, herein, a line and a signal on a line are given the same reference numeral.

The luminance data are provided to differential accumulators 452 to 454, as described above. In addition, differential accumulators 452 to 454 each receive video timing signals from statistical analyzer timing controller 1650. As described above, differential accumulators 452 to 454 determine the absolute error between the fields of the same parity in adjacent frames, between adjacent fields, and between line pairs within the same field, respectively, and accumulate the differences between the luminance samples of the appropriate lines and fields. Line memory 455 stores all line values.

Figure 17A:
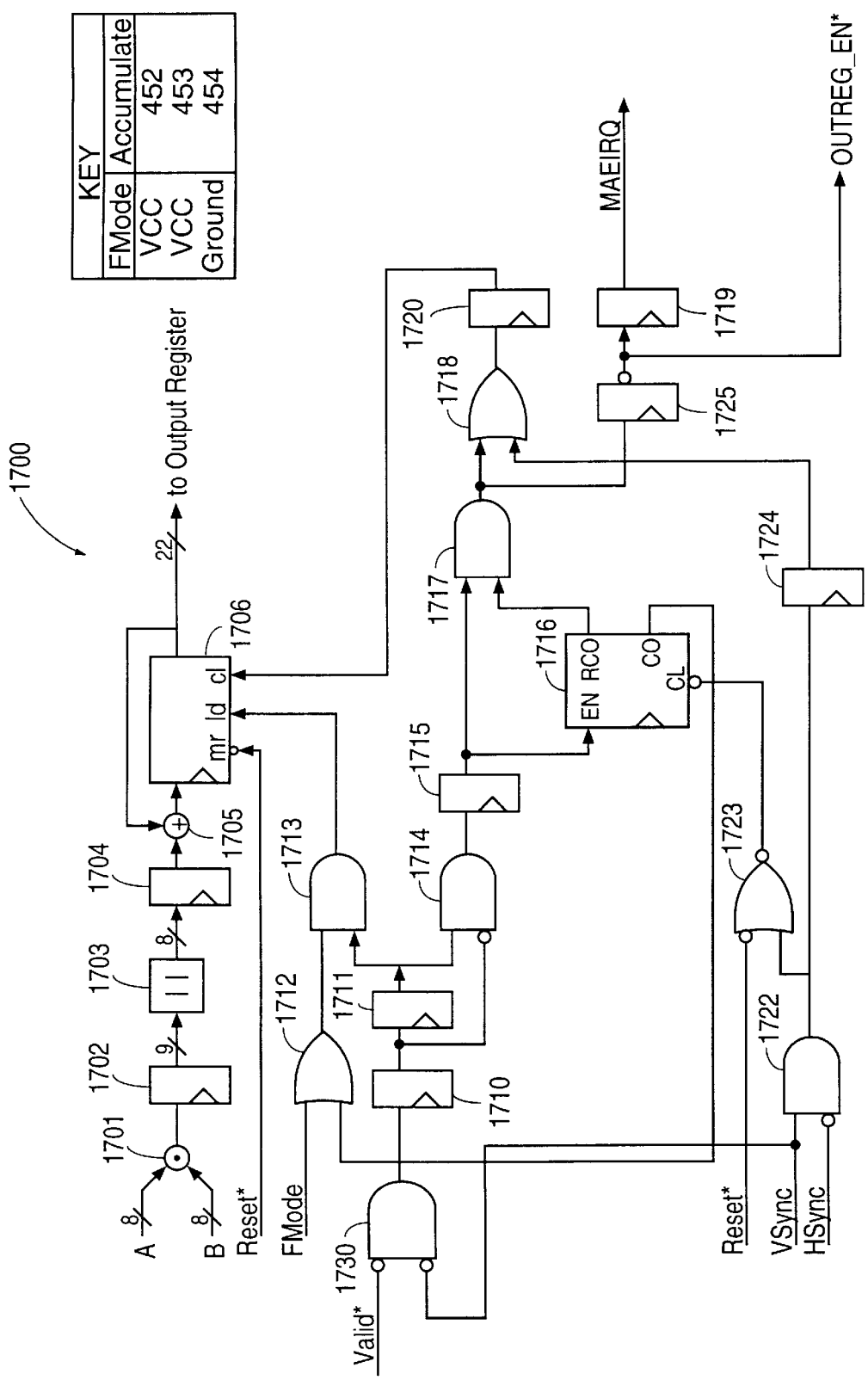
FIG. 17A is a schematic representation for each of the differential accumulators in FIGS. 4B and 16.

FIG. 17A is a more detailed schematic diagram of each of differential accumulators 452 to 454. In one embodiment, the circuitry shown in FIG. 17A is implemented in a field programmable gate array sold by Altera Corporation of San Jose, Calif. as Model No. EPM 7096. Element 1701 forms the difference between two eight bit pixels and the difference is stored in register 1702. The output signals from registers 1702 is provided to element 1703, which takes the absolute value of the difference. The absolute value is loaded in register 1704. The output signal of register 1704 is a first set of input signals to summer 1705. A second input signal to summer 1705 is provided by accumulator 1706. When a strip of input data has been processed, the output signal of accumulator 1706 is the difference metric, that is utilized as described above.

The remaining circuitry in FIG. 17A provides function control and timing control for differential accumulator 1700 and also generates an interrupt after each strip of input data is processed. Specifically, input signal FMODE controls the function of differential accumulator 1700. If input signal FMODE is active, differential accumulator 1700 sums the differences from all lines in the input data for the same and opposite polarity field accumulators. If input signal FMODE is inactive, differential accumulator 1700 sums the differences for every other line for the intra-field accumulator.

Input signal VALID*, which is active low, marks the active pixels in each line of input data. Specifically signal VALID* goes active for the first active pixel and remains valid through the last active pixel in a line. Similarly, signal VSync goes inactive at the start of the active lines in the field. The low signals on lines VALID* and VSync drive the output signal of gate 1730 active. The active signal from gate 1730 is clocked through registers 1710, 1711 and drives a first input terminal of AND gate 1713. The second input terminal of AND gate 1713 is driven by the output signal of OR gate 1712. OR gate 1712 has signal FMODE as a first input signal and the signal from terminal Q0 from four bit counter 1716 as a second input signal, which is active for every other line of data.

Thus, if signal FMODE is active, the output signal of AND gate 1713, which drives load terminal LD of accumulator 1706, goes active two clock periods after signal VALID* goes active and loads the output signal of summer 1705 in accumulator 1706 and continues to do so for each active pixel in the line of input data. Conversely, if signal FMODE is inactive, the output signal of AND gate 1713 is active every other line and consequently accumulator 1706 loads difference data for only every other line.

When signal VALID* goes inactive after the last active pixel in a line, one clock period later, the output signal of AND gate 1714 goes high. The high signal from AND gate 1714 is clocked through register 1715 to enable terminal EN of four bit counter 1716. Thus, four bit counter 1716 is incremented by one after each line of input data. When the sixteenth line of data has been processed, four bit counter 1716 rolls over and generates an active signal on output terminal RC0.

The active signal from output terminal RC0 and the active signal from register 1715 drive the output signal of AND gate 1717 active. The active output signal from AND gate 1717 drives register 1725 and so one clock period later the output signal of register 1725 from the inverted output terminal drives the signal on line OUTREG_EN* active. The active signal on line OUTREG_EN* loads the output signal of accumulator 1706 into an output register that is external to device 1700. The information in the output register, i.e, the absolute value error accumulation, is available to statistical processor 490 (FIG. 4B) during the input time for the next 16 lines.

The active output signal from AND gate 1717 (FIG. 17A) also results in an active signal on terminal CL of accumulator 1706 as the output signal from accumulator 1706 is loaded into the output register. Further, the active output signal of AND gate 1717 results in the generation of an inactive signal on accumulator interrupt line MAEIRQ one clock period after the signal on line OUTREG_EN* goes active. On the subsequent clock pulse the signal on accumulator interrupt line MAEIRQ is driven high and the rising edge notifies statistical processor 490 that difference data is ready in the output register.

Figure 17B:
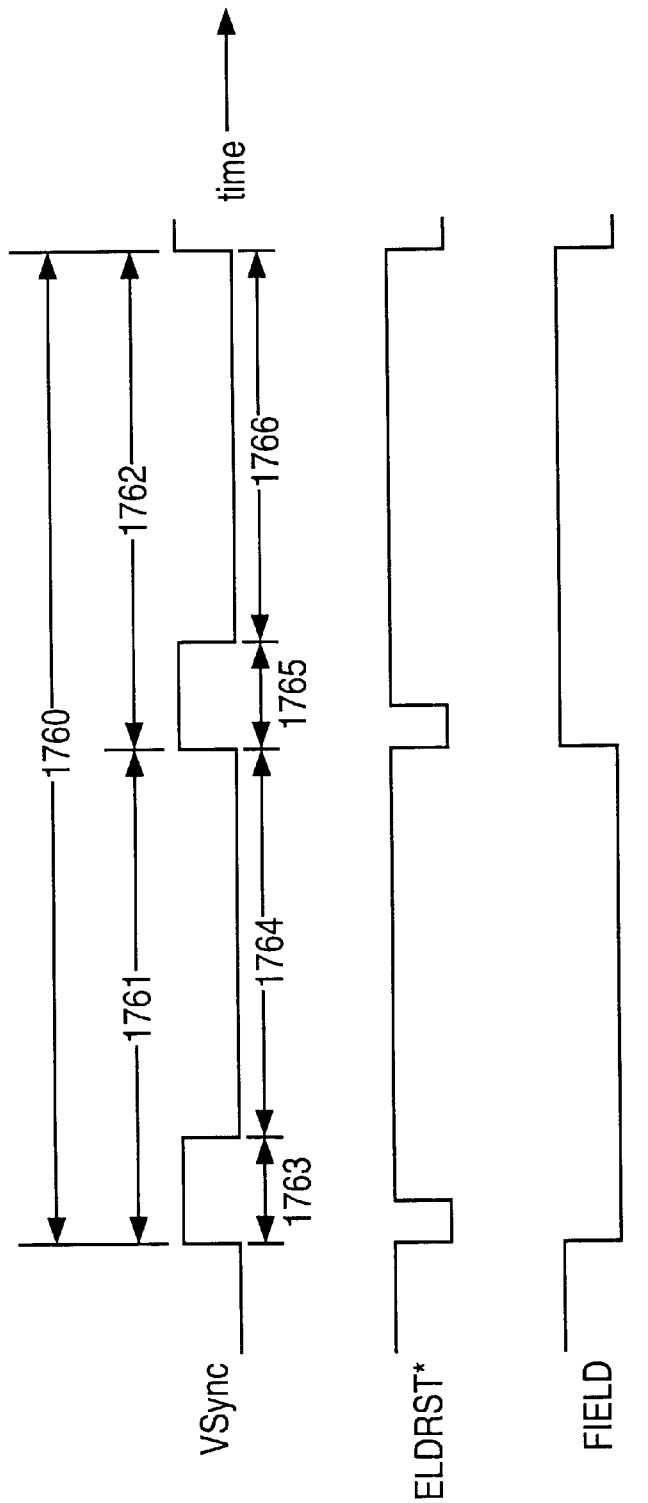
FIG. 17B illustrates the timing characteristics of signals used in the video data stream analyzer of this invention.

Counter 1716 and accumulator 1706 are cleared at power-up and a board reset by reset signal RESET* from statistical processor 490. Counter 1716 and accumulator 1706 are also cleared at the start of each field. Specifically, FIG. 17B illustrates the timing relationship of signals VSync, FIELD, FIELDRST*. Time period 1760 is one frame period. Time periods 1761, 1762 are each a field period. Signal VSync goes active at the start of each field and remains active for time 1763, i.e., for the vertical blanking lines, and then goes inactive at the start of the active data. For NTSC, signal VSync is active for lines 1 through 21 and line 262 in field one, and for lines 263 through 284 and line 525 in field two. Signal VSync remains inactive during time period 1764 of active data, e.g., 240 lines. Signal HSync is active during the horizontal blanking interval and inactive during the active portion of each line time including lines of the vertical blanking interval. Consequently, AND gate 1722, which has an input terminal that inverts signal HSYNC, generates an active signal that is negated by NOR gate 1723. The low signal from NOR gate 1723 clears counter 1716. After two clock periods, the high signal from AND gate 1722 clears accumulator 1706.

Signals VALID* and RESET* are provided by statistical analyzer timing controller 1650 (FIG. 16), hereinafter controller 1650. Controller 1650 also generates a reset pulse on line FIELDRST* (FIG. 17B) on each rising edge of signal VSync, i.e., at each field signal transition, to reset the field memory address pointers. Similarly, controller 1650 generates a pulse on line LINERST* at the rising edge of horizontal sync signal HSYNC to reset the line buffer address pointers.

Figure 18:
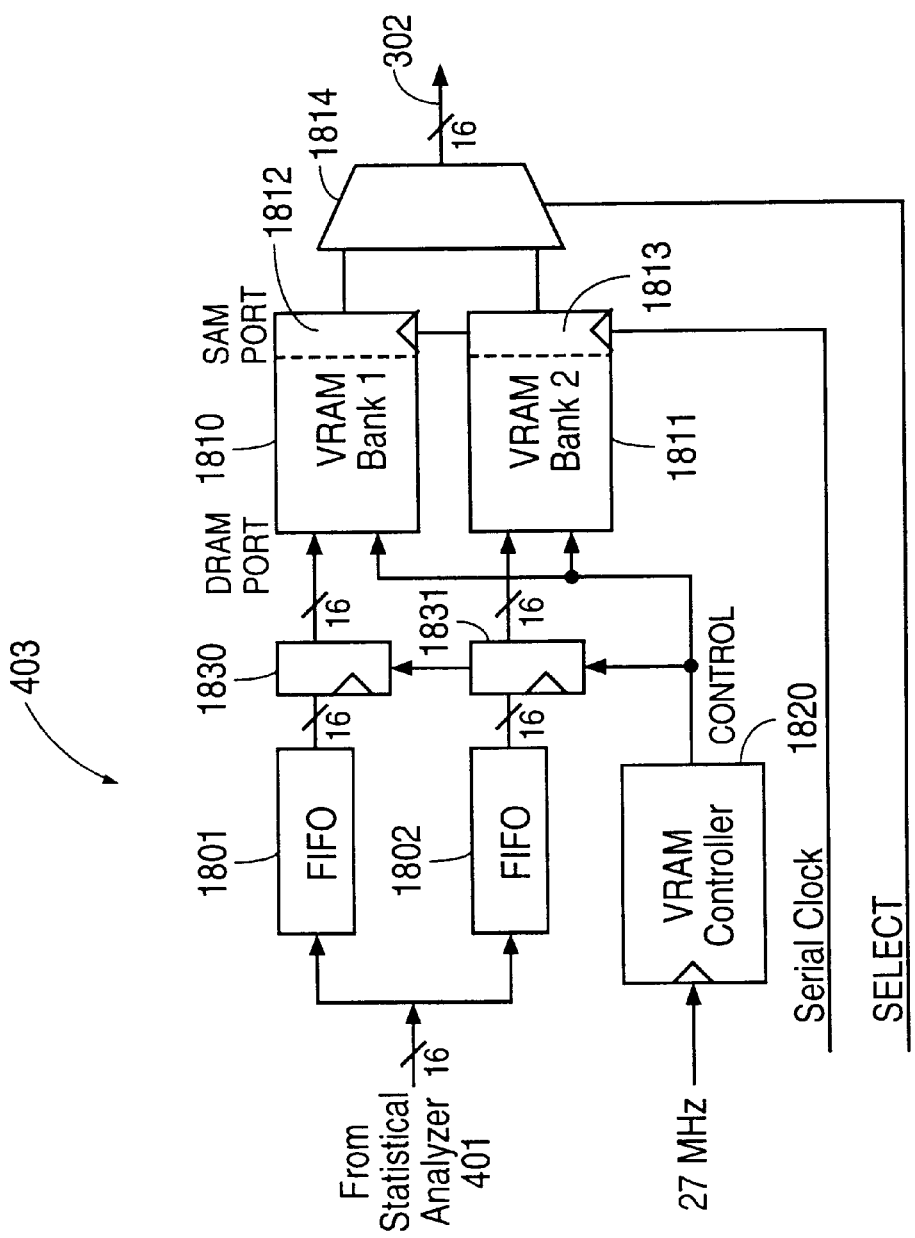
FIG. 18 is a more detailed block diagram of the reordering memory of this invention.

FIG. 18 is a more detailed block diagram of one embodiment of reordering memory 403. In this embodiment, reordering memory 403 includes two first-in-first-out memories (FIFOs) 1801, 1802 that each receive 16 bits of data from field memory 451. The sixteen bits of data are pixel luminance and chrominance data.

FIFOs 1801, 1802 store alternate pixels from the active portion of each line. A FIFO controller (not shown) controls the alternation between FIFO 1801 and FIFO 1802. The FIFO controller includes a state machine to control the writing to FIFOs and a pixel counter to track the location within the line. When the halfway point in the active portion of each line is reached, the FIFO controller generates a signal HALFLINE. In response to signal HALFLINE, a VRAM controller 1820, which is described more completely below., for reordering memory 403 initiates transfer of data from FIFOs 1801, 1802 to video random access memory (VRAM) banks 1810, 1811.

Figure 19:
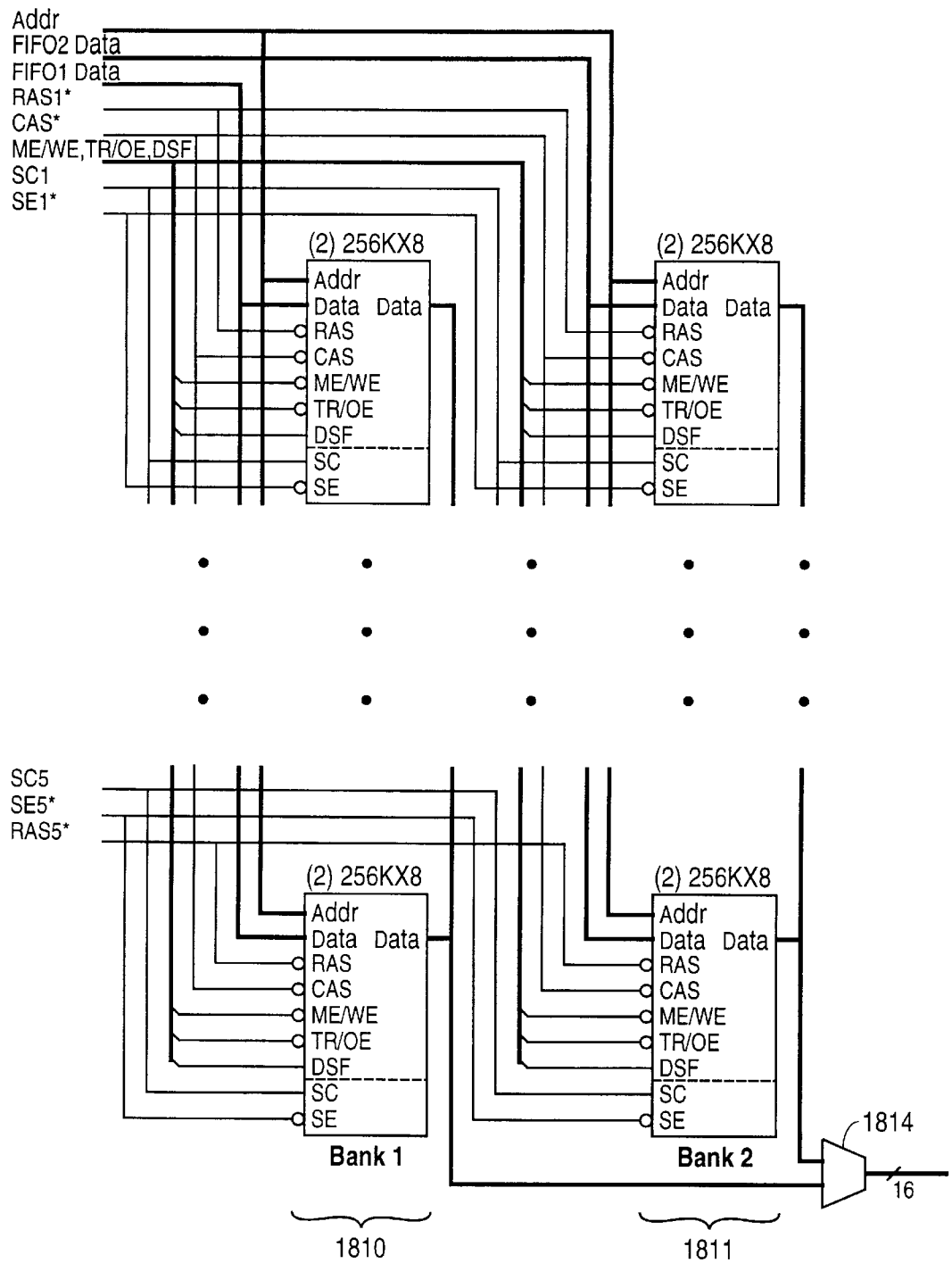
FIG. 19 is a schematic diagram of the two banks of video random access memory in the reordering memory of this invention.

FIFO 1801 drives a first bank of VRAM 1810 and FIFO 1802 drives a second bank of VRAM 1811. Each VRAM bank 1810, 1811 includes 5 pages of VRAM (FIG. 19), where a page is low-byte 256K memory chip and a high-byte 256K memory chip. Each bank has ten 256K×8 VRAMs.

Data in VRAM banks 1810, 1811 is stored in raster order, but the field data is spread across VRAM banks 1810, 1811 to provide adequate memory bandwidth. Raster storage allows easy conversion from interlaced to frame ordering. Banks 1810, 1811 store alternate words. A word is an 8-bit luminance sample and an 8-bit chrominance sample. Corresponding pages from the two banks store words from the same line, e.g., page one of bank one and page one of bank two receive data from the same video lines. The horizontal blanking samples from each line do not appear in reordering memory 403, but samples from the active line time of vertical blanking interval 1764 do appear. (See FIG. 17B.) This requires a maximum of 625 lines per frame or 313 lines per field for PAL standard video.

To make addressing simpler, in one embodiment, 320 lines per field and 720 words per line are allocated in reordering memory 403. Consequently, for reordering memory 403 to hold eight fields requires 2560 lines (320 lines/field*8 fields) or five 256K×16 (10 256K×8 VRAMs) memories per bank. The first sample resides in column zero of bank one; the second sample of each line, in column zero of bank two. The number of lines utilized in reordering memory 403 is determined by the number of active lines in a field.

VRAM controller 1820 includes write control logic and read control logic that is shared by VRAM banks 1810, 1811. The write control logic writes sixteen bits, which is sometimes called a word, of video information, i.e., a pixel luminance sample and a pixel chrominance sample, to each VRAM bank 1810, 1811 simultaneously. Controller 402 (FIGS. 4A and 4B) selects the starting address of the next field in reordering memory 403 that the write control logic circuit loads, and tracks the addresses of the fields residing in reordering memory 403. Similarly, as described above, controller 402 loads registers in the read control logic with the addresses of the fields to be read from reordering memory 403.

VRAM controller 1820 runs on the 27 MHz video clock and reads from FIFOs 1801, 1802, writes to the DRAM port of VRAM banks 1810, 1811, performs DRAM refreshes, and transfers rows of data from VRAM banks 1810, 1811 to SAM port 1812, 1813. VRAM controller 1820 includes a state machine to implement the column address strobes (CAS) before row address strobe (RAS) refreshes, 128-word page mode writes, and DRAM-to-SAM full line transfers.

SAM ports 1812, 1813 from VRAM banks 1810, 1811 (FIGS. 18 and 19) alternately supply data on output line 320 via multiplexer 1814. A 6.75 MHz serial clock clocks terminal SC (FIG. 19) so that an output signal is provided from both VRAM banks 1810, 1811 every other 13.5 MHz clock cycle. A serial port enable signal, that is active low, is applied to terminal SE for a single page of both banks and so allows only that page to drive the output bus from the VRAM bank to multiplexer 1814. Multiplexer 1814 selects the output signal from each bank 1810, 1811 on alternate 13.5 MHZ clock cycles on line SELECT.

FIG. 20 is a schematic diagram of the write and read address generators in VRAM controller 1820. The write address generator includes write field address register 2001 which is loaded by controller 402. Similarly, read address generator includes first parity field read address register 2010 and second parity field address register 2020 which are also loaded by controller 402, as described above in the discussion of state machine 480.

In field mode, i.e., an output format code of F1, a new value is loaded in register 2010 at the start of each field. In frame mode, i.e., an output format code of F0, a new value is loaded in registers 2010 and 2020 at the start of each frame. For frame mode, both row counter 2011 and row counter 2021 supply memory addresses for alternate lines on bus ADDR.

Figure 21:
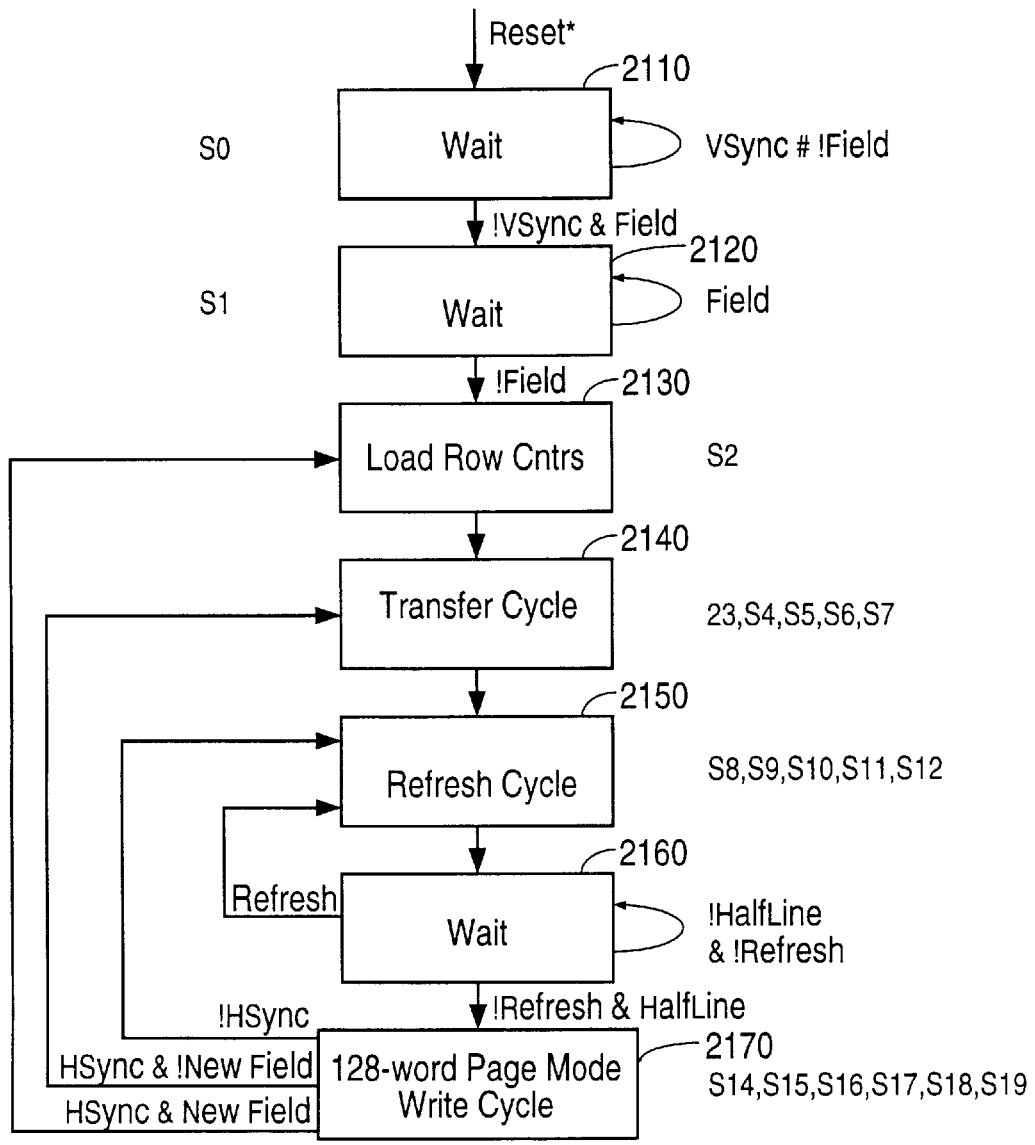
FIG. 21 is a state diagram for a state machine within the VRAM controller of FIG. 18.

After a reset signal to VRAM controller 1820, a VRAM controller state machine looks for an active portion of the first field. FIG. 21 is a state diagram of the VRAM controller state machine. The VRAM controller state machine has twenty states S0 to S19. However, the twenty states are used in seven discrete steps as illustrated in FIG. 21.

Initially in state S0, the VRAM controller state machine is in a first wait step 2110 after receipt of the reset signal. The control state machine remains in wait step so long as either vertical sync signal VSync is active or field signal FIELD is inactive. See FIG. 4A.

When field signal FIELD goes active and vertical sync signal VSync goes inactive, i.e, during of the active portion of the even parity field, the VRAM controller state machine transitions from state S0 in first wait step 2110 to state S1 in a second wait step 2120. A subsequent falling edge on field signal FIELD indicating the start of the following odd parity field causes VRAM controller state machine to transition to state S2 in step load row counters 2130.

In load row counters step 2130, which is during horizontal blanking and preceding transfer cycle step 2140, VRAM controller 1820 drives signal WALDRC* to terminal LD of write address row counter 2002 active so that the contents of write field address register 2001 are loaded in write address row counter 2002. The least significant six bits of write address counter 2002 are loaded with a value of zero because controller 402 (FIG. 4B) specifies only the 320-line field store and not the exact row address. Loading write row address counter 2002 initializes the row count for a field memory within reordering memory 403.

In load row counter steps 2130, VRAN controller 1820 also drives signal F0LdC* to terminal LD of first field row counter 2011 and signal F1LdC* to terminal LD of second field row counter 2021 active if the output format code is F0 and only terminal LD of odd row counter 2011 if the output format code is F1. The active signals on load terminals LD loads the read addresses from registers 2010, 2020 into row counters 2011, 2021 respectively. The least significant six bits of read address counters 2011, 2021 are loaded with a value of zero because controller 402 specifies only the 320-line field store and not the exact row address. The high level of horizontal blanking signal HSYNC resets flag HALFLINE. Upon completion of horizontal blanking, i.e, a high-to-low transition of horizontal sync signal HSYNC that indicates the start of active video in the line, the VRAM controller state machine transitions from state S2 in load counters step 2130 to state S3 in transfer cycle step 2140. States S3 to S7 are within transfer cycle step 2140. At the high-to-low transition of horizontal sync signal HSYNC, the FIFO controller begins loading data in FIFOs 1801, 1802 (FIG. 18).

In transfer cycle step 2140, a DRAM-to-SAM transfer moves an entire line of data to the SAM port for serial access. The transfer cycle specifies column zero as the start tap for the SAM port. Upon transfer to the SAM port, the data is ready for reading during the active portion of the line.

Figure 22:
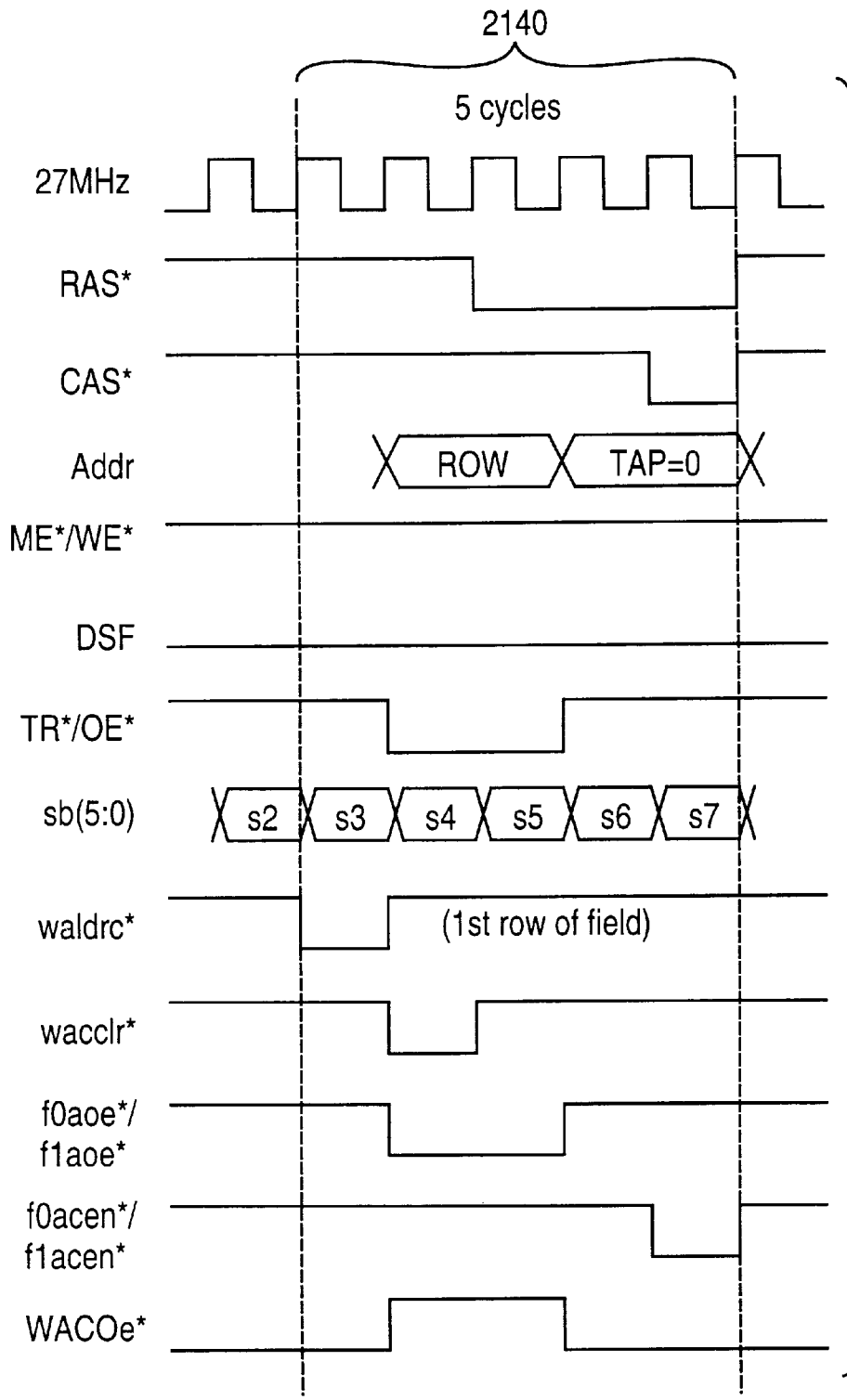
FIG. 22 is a timing diagram for transfer of information from the DRAM port to the serial port of the VRAMs forming the reordering memory.

FIG. 22 is a timing diagram for transfer cycle step 2140. The transfer cycle requires five clock cycles on the 27 MHz clock line which is labeled "27 MHz". On the rising edge of the first clock cycle, the VRAM controller state machine transitions from state S2 to state S3 as shown on line labeled SB(5:0). Also, the signal on line WALDRC* to load terminal LD of write row counter 2002 goes active to enable loading of write row counter 2002.

On the rising edge of the second clock cycle, the VRAM controller state machine transitions from state S3 to state S4 as shown on line labeled SB(5:0). Also, the signal on line WALDRC* to load terminal LD of write row counter 2002 goes inactive and the signal on transfer terminal TR*/OE* of each VRAM (FIG. 19), the signal on line WACCLR* to clear terminal CLR of column counter 2003, and the signal on line F0AOE* of three-state buffer 2012 go active. Hence, three-state buffer 2012 drives the address in odd row counter 2011 onto address bus ADDR and column counter 2003 is cleared. The signal on line WACOE* goes inactive so that three-state buffer 2005 has a high impedance.

On the third rising clock edge in transfer cycle step 2140 (FIG. 22), the VRAM controller state machine transitions from state S4 to state S5 as shown on line labeled SB(5:0). Also, the signal on line WACCLR* to clear terminal CLR of column counter 2003 goes inactive and the signal on line RAS* to VRAM banks 1810, 1811 goes active. The most significant bits WrVSel[2:0] of write row counter go to the VRAM controller state machine. The VRAM controller state machine uses these bits to determine the VRAMs currently receiving the write data. The VRAM controller state machine asserts the appropriate signal on the appropriate read address strobe RAS* to VRAN banks 1810, 1811, but in FIG. 22, the signal is shown generically as simply RAS*.

On the fourth rising clock edge in transfer cycle step 2140, the VRAM controller state machine transitions from state S5 to state S6 as shown on line labeled SB(5:0). Also, the signal on transfer terminal TR*/OE* of each VRAM (FIG. 19), and the signal on line F0AOE* of three-state buffer 2012 go inactive. The signal on line WACOE* goes active so that three-state buffer 2005 passes the address, i.e., TAP=0, from column counter 2003 to bus ADDR.

On the fifth rising clock edge in transfer cycle step 2140, the VRAM controller state machine transitions from state S6 to state S7 as shown on line labeled SB(5:0). The signal on column address strobe line CAS* goes active to VRAM banks 1810, 1811 and the signal on line F0ACEN* to enable terminal CE of row counter 2011 goes active so that row counter 2011 is incremented. At the end of the fifth clock cycle, all active signals go inactive and transfer cycle step 2140 is complete.

Figure 23:
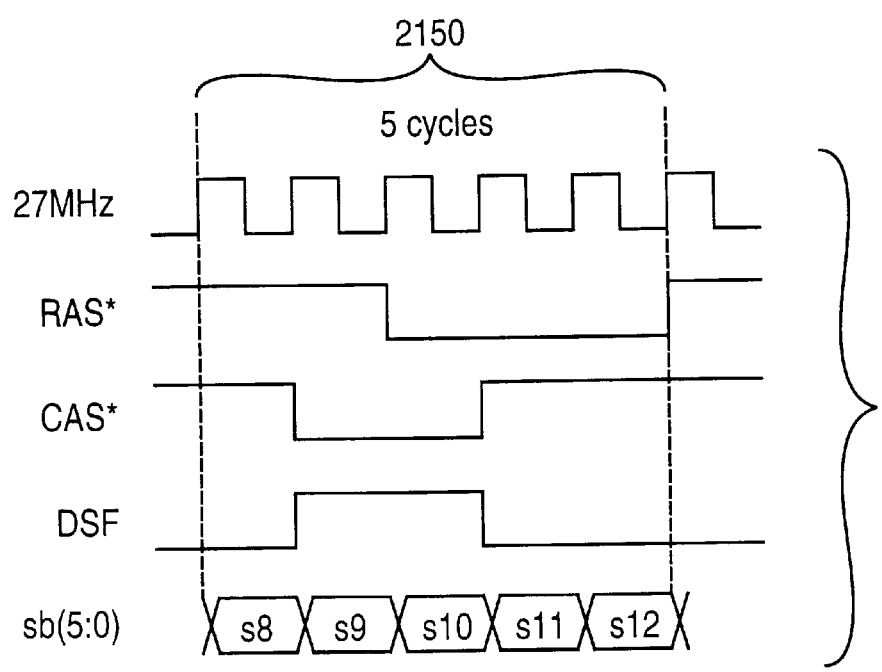
FIG. 23 is a timing diagram for a refresh cycle of the VRAM in the reordering memory.

Upon completion of transfer cycle step 2140, processing transfers to refresh cycle step 2150 in which states S8 to S12 of the VRAM controller state machine refresh VRAM banks 1810, 1811. FIG. 23 is a timing diagram for refresh cycle step 2140. As shown in FIG. 23, the refresh cycle requires five 27 MHz clock cycles and the signals on lines RAS*, CAS*, and DSF to VRAM banks 1810, 1811 are driven active in the sequence shown.

VRAM controller 1820 includes a refresh timer. Each time refresh cycle step 2140 is executed, the refresh timer is cleared. When the refresh timer times out, a REFRESH flag is set. Upon completion of refresh cycle step 2150, processing transfers to wait cycle step 2160.

Wait cycle step 2160 is state S13 of the VRAM controller state machine. Recall that when horizontal sync signal HSYNC went inactive, the FIFO controller started loading FIFOs 1801, 1802. When FIFOs 1801, 1802 are half full, FIFO controller generates an active signal on line HALFLINE, as explained above.

The VRAM control state machine remains in state S13 as long as both flags HALFLINE and REFRESH are inactive. If flag HALFLINE does not go active before flag REFRESH goes active, the VRAM controller state machine returns to refresh cycle step 2150 upon flag REFRESH being set. The refresh time times out and sets flag REFRESH every two hundred fifty-six 27 MHz clock cycles. This schedule completes the 512 refreshes necessary to sustain reordering memory 403 in 4.85 msec (512*256/27*$10^6$).

If flag HALFLINE is set and flag REFRESH is not set, i.e., the refresh timer has not yet timed out, the VRAM controller state machine transitions from wait cycle step 2160 to 128-word page mode write cycle 2170 that includes states S14 to S19. A write from FIFOs 1801, 1802 to VRAN banks 1810, 1811 requires two hundred sixty-one 27 MHz clock cycles, i.e., three clock cycles for row address strobe line RAS* precharge, two clock cycles per write, plus two additional clock cycles. One of the precharge cycles falls in wait state step 2160 of the VRAM controller state machine. FIG. 24 is a timing diagram of page mode write cycle step 2170.

Upon entry to page mode write cycle 2170, on the first rising clock edge (line 27 MHz in FIGS. 18, 23), VRAM controller state machine transitions to state S14 as shown in line SB(5:0). On the second rising clock edge in page mode write cycle 2170, the VRAM controller state machine transitions to state S15; the signal on write address column out enable line WACOE* goes inactive; and the signal on line write address row out enable line WAROE* goes active. Hence, three-state buffer 2004 passes the value in row counter 2002 to bus ADDR as shown on line ADDR of FIG. 24.

On the third rising clock edge in page mode write cycle 2170, the VRAM controller state machine transitions to state S16, and the signal on line RAS* to VRAM banks 1810, 1811 goes active. For simplicity in FIG. 24 lines RAS1* to RAS5* are simply given as RAS*. As explained above, the most significant bits WrVSel[2:0] of write row counter 2002 go to the VRAM controller state machine and the VRAM controller state machine, based on those bits, drives the appropriate row address strobe line active.

On the fourth rising clock edge in page mode write cycle 2170, the VRAM controller state machine transitions to state S17. The signals on write enable line WE* to VRAN banks 1810, 1811 and on write address column out enable line WACOE* go active while the signal on line write address row out enable line WAROE* goes inactive. The signals on lines WE*, WACOE* and WAROE* do not change throughout the remainder of page mode write cycle 2170.

In response to the active signal on line WACOE*, three-state buffer 2005 passes value COL0 in column counter 2003 to bus ADDR as shown on line ADDR of FIG. 24. When signal FR* goes active, the signal on the read enable terminal of FIFO 1801, 1802 is active. The value read from the FIFO is stored in registers 1830 and 1831 respectively because signal DCKEN* drives a clock enable terminal of registers 1830 and 1831. Registers 1830 and 1831 store the data output from the respective FIFO and provide the data to the respective VRAM bank as illustrated in FIG. 18.

On the fifth rising clock edge in page mode write cycle 2170, VRAN controller state machine transitions to state S18. The signals on column address strobe line CAS* to VRAM banks 1810, 1811 and on write address column counter enable line WACCEN* to terminal CE of column counter 2003 are driven active. Thus, column counter 2003 is incremented on the next rising edge of 27 MHz clock and the address on bus ADDR is incremented.

As shown in FIG. 24, page mode write cycle continues to cycle between states S17 and S18 of the VRAM controller state machine until 128 words have been written from FIFOs 1801, 1802 to VRAM banks 1810, 1811. Upon completion of the write to VRAM banks 1810, 1811, the VRAM controller state machine goes to state S19.

In state S19, signal WATCEN* to terminal CE of write row counter 2002 is driven active and so increments row counter 2002. Hence, row counter 2002 is incremented at the end of each line. Signal WATCClr* is also driven active and so resets write column counter 2003 at this time.

Upon completion of the operations in state S19, the VRAM controller state machine transfers to another step depending on the state of horizontal sync signal HSYNC and new field flag NEW FIELD. New field flag NEW FIELD is valid only when horizonal sync signal HSYNC is active. When horizonal sync signal HSYNC is active, it means that a new line is being transferred into FIFOs 1801, 1802.

If horizonal sync signal HSYNC and new field flag NEW FIELD are both active, processing transfers from page mode write step 2170 to load row counters step 2130. If horizontal sync signal HSYNC is active and new field signal NEW FIELD is inactive, processing transfers from page mode write step 2170 to transfer cycle step 2140. If horizontal sync signal HSYNC is inactive, processing transfers from page mode write step 2170 to refresh cycle step 2160.

After completion of the first page mode write cycle 2170 after flag HALFLINE is set, horizontal sync signal HSYNC is not active and so the VRAM controller state machine branches to refresh cycle 2150, and performs a refresh cycle. Similarly, after completion of the second page mode write cycle, horizontal sync signal HSYNC is not active and so VRAM controller state machine initiates yet another refresh cycle 2150.

Writing 720 bytes to VRAM banks 1810, 1811 from FIFOs 1801, 1802 requires seven hundred ninety-three 27 MHz cycles ((720 bytes/(256 bytes per write cycle))*(261 clock cycles/write cycle)+5 clock cycles for first refresh cycle+5 clock cycles for second refresh cycle). Note that only 720 bytes are considered because on each write a byte from FIFO 1801 and a byte from FIFO 1802 are simultaneously written to VRAN banks 1810, 1811. The data transfer from FIFOs 1801, 1802 to VRAM banks 1810, 1811 starts after 360 pixels have been loaded into FIFOs 1801, 1802. One 27 MHz clock cycle is required to write a byte to FIFOs 1801, 1802. Thus, to write the last 360 pixels to FIFOs requires seven hundred twenty 27 MHz clock cycles. Hence, the transfer of a line of pixel data from FIFOs 1801, 1802 to VRAN banks 1810, 1811 is complete 73 (793–720) clock cycles into the horizontal blanking for the next line.

The line of data loaded into the SAM port during transfer cycle step 2130 is moved onto serial output line 302 under the control of a SAM port state machine. A timing diagram for the SAM port state machine that shows the various states is given in FIG. 25. As long as horizontal sync signal HSYNC is active, the SAM port state machine is in a wait state S1. When horizontal sync signal HSYNC falls, the SAM port state machine transitions to state S2 upon a rising edge of the 27 MHz clock. In state S2, the SAN port state machine waits five 13.5 MHz clock cycles for transfer cycle step 2130 to complete and then starts to alternate between states S3 and S4 to move data onto output line 302, which is shown as line MUXOUT in FIG. 25. Line PXCNT is a counter within the timing controller for the SAN port that tracks the position within each video line.

The most significant bits R0VSel[2:0] of read row counter 2011 and the most significant bits R1VSel[2:0] of read row counter 2021 are provided to the SAM port state machine. Based on the values of these bits the SAM port state machine determines which of the five serial data out enable signals SE1* to SE5* signals is low for each line time. In field mode, the address bits from row counter 2011 determine which serial data out enable signal SE* signal is low. For frame mode operation, two fields alternately supply lines of output data. Therefore, row counter 2011 provides the address bits used to select the serial data out enable signal SE* during the even numbered lines and row counter 2021 provides the address bits used to select the serial data out enable signal SE* during the odd numbered lines (assuming line numbers begin with 0). In FIG. 25, the serial clock line SC* and the serial data out enable line SE* are shown as SC1* and SE1* respectively. The low signal on line SE1* enables the output buffers for one set of VRAMs from each bank 1810 and 1811.

The signal on line SC1 provides 360 rising edges per line time. This sequence reads 720 samples after 720 13.5 Hz clock cycles from tap addresses 0 to 359 of both banks. Once the 720 samples are read out, the cycles on line SC1 stop, and the SAM port state machine waits for the active portion of the next line. During blanking, pullups on the data busses provide 0xFF input signals to both ports of multiplexer.

The embodiments described above and in Microfiche Appendix A of the video data stream analyzer and the methods for analyzing a video data stream are illustrative only and are not intended to limit the invention to the particular embodiments described. In view of this disclosure, those skilled in the area can implement the principles of this invention in a wide variety of architectures and in a wide variety of applications. For example, the thresholds used in the above methods have been defined in terms of the number of pixels in a line and the number of pixels in a field. Therefore, the principles of this invention are not limited to a particular frame size but can be readily applied to a frame of any size. Moreover, the methods of this invention can be utilized in non-real time applications as well as real time applications. For example, a video data stream could be analyzed in non-real time according to the principles of this invention and the results stored for subsequent use by an encoding system or by a broadcast system. The principles of this invention are generally applicable to any application that requires determination of the characteristics of the data in a video data stream. Also, while in the embodiments described above, a repeated field is dropped, in another embodiment, a repeated field might be averaged with the duplicate field, i.e., corresponding pixels could be summed and the result divided in half. This could reduce any noise present in the original repeated field. Thus, the principles of the invention can indeed be implemented in a wide variety of ways.

APPENDIX

The operation of state machine 480 in combination with statistical processor 490, that performs the scan pattern detection, and repeated field detection using the primary and secondary criteria, attempts to recognize and repair 72 different input video data streams to video data stream analyzer 300. The following tables give an example of each of the sequences. The input video data streams given below are not inclusive of all input video data streams processed by video data stream analyzer 300 and so are illustrative only. The examples given below are not intended to limit the invention to the particular input video data streams given.

In the tables, the following conventions are employed:

Frames a, b, c, d, e, . . . , belong to one sequence.

Frames u, v, w, x, y, . . . , belong to a different sequence.

"In:" depicts input video data stream 301 to video data stream analyzer 300.

"Out:" depicts output video sequence 302 of video data stream analyzer 300 and hence is the signal that is eventually encoded and transmitted.

"Display code:" depicts the display code associated with each transmitted frame as defined in Table 3.

"Display:" depicts what a decoding system should display at 30 fps given the output signal of the video data stream analyzer and the display code. Note that the ultimately displayed sequence may contain noise and/or distortion introduced by any subsequent operation on the output data stream from the video data stream analyzer, e.g., if the sequence is passed through a lossy encoder-decoder before being displayed.

| | | | | | | | | |
|---|---|---|---|---|---|---|---|---|
| 1. Pure Video | | | | | | | | |
| In: | a1a2 | b1b2 | c1c2 | d1d2 | e1e2 | ... | | |
| Out: | a1a2 | b1b2 | c1c2 | d1d2 | e1e2 | ... | | |
| Display code: | 02 | 02 | 02 | 02 | 02 ... | | | |
| Display: | a1a2 | b1b2 | c1c2 | d1d2 | e1e2 | ... | | |
| 2. Video (mid-frame edit): | | | | | | | | |
| In: | a1a2 | b1b2 | c1u2 | v1v2 | w1w2 | ... | | |
| Out: | a1a2 | b1b2 | u2u2 | v1v2 | w1w2 | ... | | |
| Display code: | 02 | 02 | 02 | 02 | 02 | | | |
| Display: | a1a2 | b1b2 | u2u2 | v1v2 | w1w2 | ... | | |
| 3. Video to movie 1: | | | | | | | | |
| In: | u1u2 | v1v2 | a1a2 | a1b2 | b1c2 | c1c2 | d1d2 | a1a2 | ... |
| Out: | u1u2 | v1v2 | a1a2 | b1b2 | c1c2 | | d1d2 | a1a2 ... | |
| Display code: | 02 | 02 | 03 | 12 | 13 | | 02 | 03 ... | |
| Display: | u1u2 | v1v2 | a1a2 | a1b2 | b1c2 | c1c2 | d1d2 | a1a2 ... | |
| 4. Video to movie 2: | | | | | | | | |
| In: | u1u2 | v1d2 | a1a2 | a1b2 | b1c2 | c1c2 | d1d2 | a1a2 ... | |
| Out: | u1u2 | d2d2 | a1a2 | b1b2 | c1c2 | | d1d2 | a1a2 ... | |
| Display code: | 02 | 02 | 03 | 12 | 13 | | 02 | 03 ... | |
| Display: | u1u2 | d2d2 | a1a2 | a1b2 | b1c2 | c1c2 | d1d2 a1a2 ... | | |
| 5. Video to movie 3: | | | | | | | | |
| In: | u1u2 | v1c2 | d1d2 | a1a2 | a1b2 | b1c2 | c1c2 | d1d2 ... | |
| Out: | u1u2 | c2c2 | d1d2 | a1a2 | | b1b2 | c1c2 d1d2 ... | | |
| Display code: | 02 | 02 | 02 | 03 | 12 | 13 | 02 ... | | |
| Display: | u1u2 | c2c2 | d1d2 | a1a2 | a1b2 | b1c2 | c1c2 d1d2 ... | | |
| 6. Video to movie 4: | | | | | | | | |
| In: | u1u2 | v1c2 | c1c2 | d1d2 | a1a2 | a1b2 | b1c2 | c1c2 ... | |
| Out: | u1u2 | c2c2 | c1c2 | d1d2 | a1a2 | b1b2 | c1c2 ... | | |
| Display code: | 02 | 02 | 02 | 02 | 03 | 12 | 13 ... | | |
| Display: | u1u2 | c2c2 | c1c2 | d1d2 | a1a2 | a1b2 | b1c2 | c1c2 ... | |
| 7. Video to movie 5: | | | | | | | | |
| In: | u1u2 | v1b2 | b1c2 | c1c2 | d1d2 | a1a2 | a1b2 | b1c2 | ... |
| Out: | u1u2 | b2b2 | b1b1 | c1c2 | d1d2 | a1a2 | b1b2 | c1c2 | ... |
| Display code: | 02 | 02 | 02 | 02 | 02 | 03 | 12 | 13 ... | |
| Display: | u1u2 | b2b2 | b1b1 | c1c2 | d1d2 | a1a2 | a1b2 | b1c2 | ... |
| 8. Video to movie 6: | | | | | | | | |
| In: | u1u2 | v1a2 | a1b2 | b1c2 | c1c2 | d1d2 | a1a2 | a1b2 | ... |
| Out: | u1u2 | a2a2 | a1b2 | b1b1 | c1c2 | d1d2 | a1a2 | b1b2 | ... |
| Display code: | 02 | 02 | 02 | 02 | 02 | 02 | 03 | 12 | ... |
| Display: | u1u2 | a2a2 | a1b2 | b1b1 | c1c2 | d1d2 | a1a2 | a1b2 | ... |
| 9. Video to movie 7: | | | | | | | | |
| In: | u1u2 | v1v2 | b1c2 | c1c2 | d1d2 | a1a2 | a1b2 | b1c2 | ... |
| Out: | u1u2 | v1v2 | b1b1 | c1c2 | d1d2 | a1a2 | b1b2 | c1c2 | ... |
| Display code: | 02 | 02 | 02 | 02 | 02 | 03 | 12 | 13 ... | |
| Display: | u1u2 | v1v2 | b1b1 | c1c2 | d1d2 | a1a2 | a1b2 | b1c2 | ... |
| 10. Video to movie 8: | | | | | | | | |
| In: | u1u2 | v1v2 | a1b2 | b1c2 | c1c2 | d1d2 | a1a2 | a1b2 | ... |
| Out: | u1u2 | v1v2 | a1b2 | b1b1 | c1c2 | d1d2 | a1a2 | b1b2 | ... |
| Display code: | 02 | 02 | 02 | 02 | 02 | 02 | 03 | 12 | ... |
| Display: | u1u2 | v1v2 | a1b2 | b1b1 | c1c2 | d1d2 | a1a2 | a1b2 | ... |
| 11. Video to movie 9: | | | | | | | | |
| In: | u1u2 | v1v2 | c1c2 | d1d2 | a1a2 | a1b2 | b1c2 | c1c2 | ... |
| Out: | u1u2 | v1v2 | c1c2 | d1d2 | a1a2 | b1b2 | c1c2 | ... | |
| Display code: | 02 | 02 | 02 | 02 | 03 | 12 | 13 | ... | |
| Display: | u1u2 | v1v2 | c1c2 | d1d2 | a1a2 | a1b2 | b1c2 | c1c2 | ... |
| 12. Video to movie 10: | | | | | | | | |
| In: | u1u2 | v1v2 | d1d2 | a1a2 | a1b2 | b1c2 | c1c2 | d1d2 | ... |

-continued

| | | | | | | | | |
|---|---|---|---|---|---|---|---|---|
| Out: | | u1u2 | v1v2 | d1d2 | a1a2 | b1b2 | c1c2 | d1d2 | ... |
| Display code: | | 02 | 02 | 02 | 03 | 12 | 13 | 02 | ... |
| Display: | | u1u2 | v1v2 | d1d2 | a1a2 | a1b2 | b1c2 | c1c2 | d1d2 ... |
| 13. Movie to video 1: | | | | | | | | | |
| In: | a1a2 | a1b2 | b1c2 | c1c2 | d1d2 | u1u2 | v1v2 | w1w2 | ... |
| Out: | a1a2 | a1b2 | | c1c2 | d1d2 | u1u2 | v1v2 | w1w2 | ... |
| Display code: | | 03 | 12 | 13 | 02 | 02 | 02 | 02 | ... |
| Display: | a1a2 | a1b2 | b1c2 | c1c2 | d1d2 | u1u2 | v1v2 | w1w2 | ... |
| 14. Movie to video 2: | | | | | | | | | |
| In: | a1a2 | a1b2 | b1c2 | c1c2 | u1u2 | v1v2 | w1w2 | x1x2 | ... |
| Out: | a1a2 | b1b2 | | c1c2 | u1u2 | v1v2 | w1w2 | x1x2 | ... |
| Display code: | | 03 | 02 | 13 | 02 | 02 | 02 | 02 | ... |
| Display: | a1a2 | a1b2 | b1c2 | c1c2 | u1u2 | v1v2 | w1w2 | x1x2 | ... |
| 15. Movie to video 3: | | | | | | | | | |
| In: | d1d2 | a1a2 | a1b2 | b1c2 | u1u2 | v1v2 | w1w2 | x1x2 | ... |
| Out: | d1d2 | a1a2 | b1b2 | | u1u2 | v1v2 | w1w2 | x1x2 ... |
| Display code: | | 02 | 03 | 13 | | 02 | 02 | 02 | 02 ... |
| Display: | d1d2 | a1a2 | a1b2 | b1b2 | u1u2 | v1v2 | w1w2 | x1x2 | ... |
| 16. Movie to video 4: | | | | | | | | | |
| In: | c1c2 | d1d2 | a1a2 | a1b2 | u1u2 | v1v2 | w1w2 | x1x2 | ... |
| Out: | c1c2 | d1d2 | a1a2 | | u1u2 | v1v2 | w1w2 | x1x2 | ... |
| Display code: | | 02 | 02 | 04 | | 02 | 02 | 02 | 02 | ... |
| Display: | c1c2 | d1d2 | a1a2 | a1a2 | u1u2 | v1v2 | w1w2 | x1x2 | ... |
| 17. Movie to video 5: | | | | | | | | | |
| In: | c1c2 | d1d2 | a1a2 | u1u2 | v1v2 | w1w2 | x1x2 | y1y2 | ... |
| Out: | c1c2 | d1d2 | a1a2 | u1u2 | v1v2 | w1w2 | x1x2 | y1y2 | ... |
| Display code: | | 02 | 02 | 02 | 02 | 02 | 02 | 02 | 02 | ... |
| Display: | c1c2 | d1d2 | a1a2 | u1u2 | v1v2 | w1w2 | x1x2 | y1y2 | ... |
| 18. Movie to video 6: | | | | | | | | | |
| In: | c1c2 | d1d2 | a1u2 | v1v2 | w1w2 | x1x2 | y1y2 | ... | |
| Out: | c1c2 | d1d2 | u2u2 | v1v2 | w1w2 | x1x2 | y1y2 ... | | |
| Display code: | | 02 | 02 | 02 | 02 | 02 | 02 | 02 ... | |
| Display: | c1c2 | d1d2 | u2u2 | v1v2 | w1w2 | x1x2 | y1y2 ... | | |
| 19. Movie to video 7: | | | | | | | | | |
| In: | c1c2 | d1d2 | a1u2 | v1v2 | w1w2 | x1x2 | y1y2 | ... | |
| Out: | c1c2 | d1d2 | a1a2 | | v1v2 | w1w2 | x1x2 | y1y2 | ... |
| Display code: | | 02 | 02 | 04 | | 02 | 02 | 02 | 02 | ... |
| Display: | c1c2 | d1d2 | a1a2 | a1a2 | v1v2 | w1w2 | x1x2 | y1y2 | ... |
| 20. Movie to video 8: | | | | | | | | | |
| In: | c1c2 | d1d2 | a1a2 | a1b2 | b1u2 | v1v2 | w1w2 | x1x2 | ... |
| Out: | c1c2 | d1d2 | a1a2 | b1b2 | | v1v2 | w1w2 | x1x2 | ... |
| Display code: | | 02 | 02 | 03 | 13 | | 02 | 02 | 02 | ... |
| Display: | c1c2 | d1d2 | a1a2 | a1b2 | b1b2 | v1v2 | w1w2 | x1x2 | ... |
| 21. Movie to video 9: | | | | | | | | | |
| In: | c1c2 | d1d2 | a1a2 | a1b2 | b1c2 | c1u2 | v1v2 | w1w2 ... | |
| Out: | c1c2 | d1d2 | a1a2 | b1b2 | c1c2 | | v1v2 | w1w2 | ... |
| Display code: | | 02 | 02 | 03 | 12 | 13 | | 02 | 02 | ... |
| Display: | c1c2 | d1d2 | a1a2 | a1b2 | b1c2 | c1c2 | v1v2 | w1w2 | ... |
| 22. Movie to video 10: | | | | | | | | | |
| In: | d1d2 | a1a2 | a1b2 | b1c2 | d1u2 | v1v2 | w1w2 ... | | |
| Out: | d1d2 | a1a2 | b1b2 | | c1c2 | u2u2 | v1v2 | w1w2 | ... |
| Display code: | | 02 | 03 | 12 | 13 | | 02 | 02 | 02 | ... |
| Display: | d1d2 | a1a2 | a1b2 | b1c2 | c1c2 | u2u2 | v1v2 | w1w2 | ... |
| 23. Movie to movie 1: (same as #78) | | | | | | | | | |
| In: | a1a2 | a1b2 | b1c2 | c1c2 | d1d2 | u1u2 | u1v2 | v1w2 | ... |
| Out: | a1a2 | b1b2 | | c1c2 | d1d2 | u1u2 | v1v2 | | ... |
| Display code: | | 03 | 12 | 13 | 02 | 03 | 12 | | |

-continued

| | | | | | | | | |
|---|---|---|---|---|---|---|---|---|
| Display: | a1a2 | a1b2 | b1c2 | c1c2 | d1d2 | u1u2 | u1v2 | v1w2 . . . |

24. Movie to movie 2: (same as #73)

| | | | | | | | | |
|---|---|---|---|---|---|---|---|---|
| In: | a1a2 | a1b2 | b1c2 | c1c2 | u1u2 | u1v2 | v1w2 | w1w2 . . . |
| Out: | a1a2 | b1b2 | | c1c2 | u1u2 | v1v2 | | w1w2 . . . |
| Display code: | | 03 | 12 | 13 | 03 | 12 | | 13 . . . |
| Display: | a1a2 | a1b2 | b1c2 | c1c2 | u1u2 | u1v2 | v1w2 | w1w2 . . . |

25. Movie to movie 3: (same as #68)

| | | | | | | | | |
|---|---|---|---|---|---|---|---|---|
| In: | a1a2 | a1b2 | b1c2 | u1u2 | u1v2 | v1w2 | w1w2 | x1x2 . . . |
| Out: | a1a2 | b1b2 | | u1u2 | v1v2 | | w1w2 | x1x2 . . . |
| Display code: | | 03 | 13 | 03 | 12 | | 13 | 02 . . . |
| Display: | a1a2 | a1b2 | b1b2 | u1u2 | u1v2 | v1w2 | w1w2 | x1x2 . . . |

26. Movie to movie 4: (same as #63)

| | | | | | | | | |
|---|---|---|---|---|---|---|---|---|
| In: | a1a2 | a1b2 | u1u2 | u1v2 | v1w2 | w1w2 | x1x2 | u1u2 . . . |
| Out: | a1a2 | | u1u2 | v1v2 | | w1w2 | x1x2 | u1u2 . . . |
| Display code: | | 04 | | 03 | 12 | | 13 | 02 | 03 . . . |
| Display: | a1a2 | a1a2 | u1u2 | u1v2 | v1w2 | w1w2 | x1x2 | u1u2 . . . |

27. Movie to movie 5: (same as #58)

| | | | | | | | | |
|---|---|---|---|---|---|---|---|---|
| In: | c1c2 | d1d2 | a1a2 | u1u2 | u1v2 | v1w2 | w1w2 | x1x2 . . . |
| Out: | c1c2 | d1d2 | a1a2 | u1u2 | v1v2 | | w1w2 | x1x2 . . . |
| Display code: | 02 | 02 | 02 | 03 | 12 | | 13 | 02 . . . |
| Display: | c1c2 | d1d2 | a1a2 | u1u2 | u1v2 | v1w2 | w1w2 | x1x2 . . . |

28. Movie to movie 6:

| | | | | | | | | |
|---|---|---|---|---|---|---|---|---|
| In: | d1d2 | a1u2 | u1v2 | v1w2 | w1w2 | x1x2 | u1u2 | u1v2 . . . |
| Out: | d1d2 | u2u2 | u1v2 | v1v1 | w1w2 | x1x2 | u1u2 | v1v2 . . . |
| Display code: | 02 | 02 | 02 | 02 | 02 | 02 | 03 | 12 . . . |
| Display: | d1d2 | u2u2 | u1v2 | v1v1 | w1w2 | x2x2 | u1u2 | u1v2 . . . |

29. Movie to movie 7:

| | | | | | | | | |
|---|---|---|---|---|---|---|---|---|
| In: | d1d2 | a1a2 | a1u2 | u1v2 | v1w2 | w1w2 | x1x2 | u1u2 . . . |
| Out: | d1d2 | a1a2 | | u1v2 | v1v1 | w1w2 | x1x2 | u1u2 . . . |
| Display code: | 02 | 04 | | 02 | 02 | 02 | 02 | 03 . . . |
| Display: | d1d2 | a1a2 | a1a2 | u1v2 | v1v1 | w1w2 | x1x2 | u1u2 . . . |

30. Movie to movie 8:

| | | | | | | | | |
|---|---|---|---|---|---|---|---|---|
| In: | d1d2 | a1a2 | a1b2 | b1u2 | u1v2 | v1w2 | w1w2 | x1x2 . . . |
| Out: | d1d2 | a1a2 | b1b2 | | u1v2 | v1v1 | w1w2 | x1x2 . . . |
| Display code: | 02 | 03 | 13 | | 02 | 02 | 02 | 02 . . . |
| Display: | d1d2 | a1a2 | a1b2 | b1b2 | u1v2 | v1v1 | w1w2 | x1x2 . . . |

31. Movie to movie 9:

| | | | | | | | | |
|---|---|---|---|---|---|---|---|---|
| In: | a1a2 | a1b2 | b1c2 | c1u2 | u1v2 | v1w2 | w1w2 | x1x2 . . . |
| Out: | a1a2 | b1b2 | c1c2 | | u1v2 | v1v1 | w1w2 | x1x2 . . . |
| Display code: | | 03 | 12 | 13 | | 02 | 02 | 02 | 02 . . . |
| Display: | a1a2 | a1b2 | b1c2 | c1c2 | u1v2 | v1v1 | w1w2 | x1x2 . . . |

32. Movie to movie 10:

| | | | | | | | | |
|---|---|---|---|---|---|---|---|---|
| In: | a1a2 | a1b2 | b1c2 | c1c2 | d1u2 | u1v2 | v1w2 | w1w2 . . . |
| Out: | a1a2 | b1b2 | | c1c2 | u2u2 | u1v2 | v1v1 | w1w2 . . . |
| Display code: | | 03 | 12 | 13 | 02 | 02 | 02 | 02 . . . |
| Display: | a1a2 | a1b2 | b1c2 | c1c2 | u2u2 | u1v2 | v1v1 | w1w2 . . . |

33. Movie to movie 11:

| | | | | | | | | |
|---|---|---|---|---|---|---|---|---|
| In: | a1a2 | a1b2 | b1c2 | c1c2 | d1x2 | u1u2 | u1v2 | v1w2 . . . |
| Out: | a1a2 | b1b2 | | c1c2 | x2x2 | u1u2 | v1v2 | . . . |
| Display code: | | 03 | 12 | 13 | 02 | 03 | 12 | | . . . |
| Display: | a1a2 | a1b2 | b1c2 | c1c2 | x2x2 | u1u2 | u1v2 | v1w2 . . . |

34. Movie to movie 12:

| | | | | | | | | |
|---|---|---|---|---|---|---|---|---|
| In: | b1c2 | c1c2 | d1w2 | x1x2 | u1u2 | u1v2 | v1w2 | w1w2 . . . |
| Out: | | c1c2 | w2w2 | x1x2 | u1u2 | v1v2 | | w1w2 . . . |
| Display code: | | 13 | 02 | 02 | 03 | 12 | | 13 . . . |
| Display: | b1c2 | c1c2 | w2w2 | x1x2 | u1u2 | u1v2 | v1w2 | w1w2 . . . |

35. Movie to movie 13:

-continued

```
In:      b1c2  c1c2  d1w2  w1w2  x1x2  u1u2  u1v2  v1w2  ...
Out:           c1c2  w2w2  w1w2  x1x2  u1u2  u1v2  v1v2        ...
Display
code:          13    02    02    02    03    12          ...
Dis-
play:    b1c2  c1c2  w2w2  w1w2  x1x2  u1u2  u1v2  v1w2  ...
36. Movie to movie 14:
In:      b1c2  c1c2  d1v2  v1w2  w1w2  x1x2  u1u2  u1v2  ...
Out:           c1c2  v2v2  w2w2  w1w2  x1x2  u1u2  v1v2 ...
Display
code:          13    02    02    02    02    03    12 ...
Dis-
play:    b1c2  c1c2  v2v2  w2w2  w1w2  x1x2  u1u2  u1v2 ...
37. Movie to movie 15:
In:      a1a2  a1b2  b1c2  c1x2        u1u2  u1v2  v1w2  w1w2  ...
Out:           a1a2  b1b2        c1c2  u1u2  u1v2        w1w2
Display
code:          03    12          13    03    12          13
Dis-
play:    a1a2  a1b2  b1c2  c1c2  u1u2  u1v2  v1w2  w1w2 ...
38. Movie to movie 16:
In:      a1a2  a1b2  b1c2  c1w2  x1x2  u1u2  u1v2  v1w2  ...
Out:           a1a2  b1b2        c1c2  x1x2  u1u2  v1v2          ...
Display
code:          03    12          13    02    03    12    ...
Dis-
play:    a1a2  a1b2  b1c2  c1c2  x1x2  u1u2  u1v2  v1w2  ...
39. Movie to movie 17:
In:      a1a2  a1b2  b1c2  c1w2  w1w2  x1x2  u1u2  u1v2  ...
Out:           a1a2  b1b2  c1c2        w1w2  x1x2  u1u2  v1v2    ...
Display
code:          03    12    13          02    02    03    12
Dis-
play:    a1a2  a1b2  b1c2  c1c2  w1w2  x1x2  u1u2  u1v2  ...
40. Movie to movie 18:
In:      a1b2  b1c2  c1v2  v1w2  w1w2  x1x2  u1u2  u1v2  ...
Out:           b1b2  c1c2        v1v1  w1w2  x1x2  u1u2  v1v2 ...
Display
code:          12    13          02    02    02    03    12 ...
Dis-
play:    a1b2  b1c2  c1c2  v1v1  w1w2  x1x2  u1u2  u1v2 ...
41. Movie to movie 19:
In:      a1b2  b1c2  c1u2  u1v2  v1w2  w1w2  x1x2  u1u2  ...
Out:           b1b2  c1c2        u1v2  v1v1  w1w2  x1x2  u1u2    ...
Display
code:          12    13          02    02    02    02    03
Dis-
play:    a1b2  b1c2  c1c2  u1v2  v1v1  w1w2  x1x2  u1u2  ...
42. Movie to movie 20:
In:      a1a2  a1b2  b1x2  u1u2  u1v2  v1w2  w1w2  x1x2  ...
Out:           a1a2  b1b2        u1u2  v1v2        w1w2  x1x2 ...
Display
code:          03    13          03    12          13    02 ...
Dis-
play:    a1a2  a1b2  b1b2  u1u2  u1v2  v1w2  w1w2  x1x2 ...
43. Movie to movie 21:
In:      a1a2  a1b2  b1w2  x1x2  u1u2  u1v2  v1w2  w1w2  ...
Out:           a1a2  b1b2        x1x2  u1u2  v1v2        w1w2    ...
Display
code:          03    13          02    03    12          13    ...
Dis-
play:    a1a2  a1b2  b1b2  x1x2  u1u2  u1v2  v1w2  w1w2  ...
44. Movie to movie 22:
In:      a1a2  a1b2  b1w2  w1w2  x1x2  u1u2  u1v2  v1w2  ...
Out:           a1a2  b1b2        w1w2  x1x2  u1u2  v1v2          ...
Display
code:          03    13          02    02    03    12            ...
Dis-
play:    a1a2  a1b2  b1b2  w1w2  x1x2  u1u2  u1v2  v1w2  ...
45. Movie to movie 23:
In:      a1a2  a1b2  b1v2  v1w2  w1w2  x1x2  u1u2  u1v2  ...
Out:           a1a2  b1b2        v1v1  w1w2  x1x2  u1u2  v1v2    ...
Display
code:          03    13          02    02    02    03    12    ...
Dis-
play:    a1a2  a1b2  b1b2  v1v1  w1w2  x1x2  u1u2  u1v2  ...
46. Movie to movie 24:
In:      a1a2  a1x2  u1u2  u1v2  v1w2  w1w2  x1x2  u1u2  ...
Out:           a1a2        u1u2  v1v2        w1w2  x1x2  u1u2    ...
```

-continued

| | | | | | | | | |
|---|---|---|---|---|---|---|---|---|
| Display code: | 04 | 03 | 12 | | 13 | 02 | 03 | ... |
| Display: | a1a2 | a1a2 | u1u2 | u1v2 | v1w2 | w1w2 | x1x2 | u1u2 | ... |
| 47. Movie to movie 25: | | | | | | | | |
| In: | a1a2 | a1w2 | x1x2 | u1u2 | u1v2 | v1w2 | w1w2 | x1x2 | ... |
| Out: | a1a2 | | x1x2 | u1u2 | v1v2 | | w1w2 | x1x2 | ... |
| Display code: | 04 | 02 | 03 | 12 | | 13 | 02 | | ... |
| Display: | a1a2 | a1a2 | x1x2 | u1u2 | u1v2 | v1w2 | w1w2 | x1x2 | ... |
| 48. Movie to movie 26: | | | | | | | | |
| In: | a1a2 | a1w2 | w1w2 | x1x2 | u1u2 | u1v2 | v1w2 | w1w2 | ... |
| Out: | a1a2 | | w1w2 | x1x2 | u1u2 | v1v2 | | w1w2 | ... |
| Display code: | 04 | 02 | 02 | 03 | 12 | | 13 | | ... |
| Display: | a1a2 | a1a2 | w1w2 | x1x2 | u1u2 | u1v2 | v1w2 | w1w2 | ... |
| 49. Movie to movie 27: | | | | | | | | |
| In: | a1a2 | a1v2 | v1w2 | w1w2 | x1x2 | u1u2 | u1v2 | v1w2 | ... |
| Out: | a1a2 | v1v2 | | w1w2 | x1x2 | u1u2 | v1v2 | | ... |
| Display code: | 03 | 12 | | 13 | 02 | 03 | 12 | | ... |
| Display: | a1a2 | a1v2 | v1w2 | w1w2 | x1x2 | u1u2 | u1v2 | v1w2 | ... |
| 50. Movie to movie 28: | | | | | | | | |
| In: | d1d2 | a1x2 | u1u2 | u1v2 | v1w2 | w1w2 | x1x2 | u1u2 | ... |
| Out: | d1d2 | x2x2 | u1u2 | v1v2 | | w1w2 | x1x2 | u1u2 | ... |
| Display code: | 02 | 02 | 03 | 12 | | 13 | 02 | 03 | ... |
| Display: | d1d2 | x2x2 | u1u2 | u1v2 | v1w2 | w1w2 | x1x2 | u1u2 | ... |
| 51. Movie to movie 29: | | | | | | | | |
| In: | d1d2 | a1w2 | x1x2 | u1u2 | u1v2 | v1w2 | w1w2 | x1x2 | ... |
| Out: | d1d2 | w2w2 | x1x2 | u1u2 | v1v2 | | w1w2 | x1x2 | ... |
| Display code: | 02 | 02 | 02 | 03 | 12 | | 13 | 02 | ... |
| Display: | d1d2 | w2w2 | x1x2 | u1u2 | u1v2 | v1w2 | w1w2 | x1x2 | ... |
| 52. Movie to movie 30: | | | | | | | | |
| In: | d1d2 | a1w2 | w1w2 | x1x2 | u1u2 | u1v2 | v1w2 | w1w2 | ... |
| Out: | d1d2 | w2w2 | w1w2 | x1x2 | u1u2 | v1v2 | | w1w2 | ... |
| Display code: | 02 | 02 | 02 | 02 | 03 | 12 | | 13 | ... |
| Display: | d1d2 | w2w2 | w1w2 | x1x2 | u1u2 | u1v2 | v1w2 | w1w2 | ... |
| 53. Movie to movie 31: | | | | | | | | |
| In: | d1d2 | a1v2 | v1w2 | w1w2 | x1x2 | u1u2 | u1v2 | | ... |
| Out: | d1d2 | v2v2 | v1v1 | w1w2 | x1x2 | u1u2 | v1v2 | | ... |
| Display code: | 02 | 02 | 02 | 02 | 02 | 03 | 12 | | ... |
| Display: | d1d2 | v2v2 | v1v1 | w1w2 | x1x2 | u1u2 | u1v2 | v1w2 | ... |
| 54. Movie to movie 32: | | | | | | | | |
| In: | d1d2 | a1a2 | x1x2 | u1u2 | u1v2 | v1w2 | w1w2 | x1x2 | ... |
| Out: | d1d2 | a1a2 | x1x2 | u1u2 | v1v2 | | w1w2 | x1x2 | ... |
| Display code: | 02 | 02 | 02 | 03 | 12 | | 13 | 02 | ... |
| Display: | d1d2 | a1a2 | x1x2 | u1u2 | u1v2 | v1w2 | w1w2 | x1x2 | ... |
| 55. Movie to movie 33: | | | | | | | | |
| In: | d1d2 | a1a2 | w1w2 | x1x2 | u1u2 | u1v2 | v1w2 | w1w2 | ... |
| Out: | d1d2 | a1a2 | w1w2 | x1x2 | u1u2 | v1v2 | | w1w2 | ... |
| Display code: | 02 | 02 | 02 | 02 | 03 | 12 | | 13 | ... |
| Display: | d1d2 | a1a2 | w1w2 | x1x2 | u1u2 | u1v2 | v1w2 | w1w2 | ... |
| 56. Movie to movie 34: | | | | | | | | |
| In: | d1d2 | a1a2 | v1w2 | w1w2 | x1x2 | u1u2 | u1v2 | v1w2 | ... |
| Out: | d1d2 | a1a2 | v1v1 | w1w2 | x1x2 | u1u2 | v1v2 | | ... |
| Display code: | 02 | 02 | 02 | 02 | 02 | 03 | 13 | | ... |
| Display: | d1d2 | a1a2 | v1v1 | w1w2 | x1x2 | u1u2 | u1v2 | v1w2 | ... |
| 57. Movie to movie 35: | | | | | | | | |
| In: | d1d2 | a1a2 | u1v2 | v1w2 | w1w2 | x1x2 | u1u2 | u1v2 | ... |
| Out: | d1d2 | a1a2 | u1v2 | v1v1 | w1w2 | x1x2 | u1u2 | v1v2 | ... |
| Display code: | 02 | 02 | 02 | 02 | 02 | 02 | 03 | 12 | ... |

-continued

| | | | | | | | | |
|---|---|---|---|---|---|---|---|---|
| Dis-play: | d1d2 | a1a2 | u1v2 | v1v1 | w1w2 | x1x2 | u1u2 | u1v2 | ... |
| 58. Movie to movie 36: | | | | | | | | |
| In: | d1d2 | a1a2 | u1u2 | u1v2 | v1w2 | w1w2 | x1x2 | u1u2 | ... |
| Out: | | d1d2 | a1a2 | u1u2 | v1v2 | | w1w2 | x1x2 | u1u2 | ... |
| Display code: | | 02 | 02 | 03 | 12 | | 13 | 02 | 02 | ... |
| Dis-play: | d1d2 | a1a2 | u1u2 | u1v2 | v1w2 | w1w2 | x1x2 | u1u2 | ... |
| 59. Movie to movie 37: | | | | | | | | |
| In: | a1a2 | a1b2 | x1x2 | u1u2 | u1v2 | v1w2 | w1w2 | x1x2 | ... |
| Out: | | a1a2 | | x1x2 | u1u2 | v1v2 | | w1w2 | x1x2 | ... |
| Display code: | | 04 | | 02 | 03 | 12 | | 13 | 02 | ... |
| Dis-play: | a1a2 | a1a2 | x1x2 | u1u2 | u1v2 | v1w2 | w1w2 | x1x2 | ... |
| 60. Movie to movie 38: | | | | | | | | |
| In: | a1a2 | a1b2 | w1w2 | x1x2 | u1u2 | u1v2 | v1w2 | w1w2 | ... |
| Out: | | a1a2 | | w1w2 | x1x2 | u1u2 | v1v2 | | w1w2 | ... |
| Display code: | | 04 | | 02 | 02 | 030 | 12 | | 13 | ... |
| Dis-play: | a1a2 | a1a2 | w1w2 | x1x2 | u1u2 | u1v2 | v1w2 | w1w2 | ... |
| 61. Movie to movie 39: | | | | | | | | |
| In: | a1a2 | a1b2 | v1w2 | w1w2 | x1x2 | u1u2 | u1v2 | v1w2 | ... |
| Out: | | a1a2 | v1v1 | | | x1x2 | u1u2 | v1v2 | | ... |
| Display code: | | 04 | 04 | | | 02 | 03 | 12 | | ... |
| Dis-play: | a1a2 | a1a2 | v1v1 | v1v1 | x1x2 | u1u2 | u1v2 | v1w2 | ... |
| 62. Movie to movie 40: | | | | | | | | |
| In: | a1a2 | a1b2 | u1v2 | v1w2 | w1w2 | x1x2 | u1u2 | u1v2 | ... |
| Out: | | a1a2 | u1v2 | v1v1 | w1w2 | x1x2 | u1u2 | v1v2 | | ... |
| Display code: | | 04 | 04 | 02 | 03 | 12 | | | ... |
| Dis-play: | a1a2 | a1a2 | u1v2 | v1v1 | w1w2 | x1x2 | u1u2 | u1v2 | ... |
| 63. Movie to movie 41: | | | | | | | | |
| In: | a1a2 | a1b2 | u1u2 | u1v2 | v1w2 | w1w2 | x1x2 | u1u2 | ... |
| Out: | | a1a2 | | u1u2 | v1v2 | | w1w2 | x1x2 | u1u2 | ... |
| Display code: | | 04 | | 03 | 12 | | 13 | 02 | 03 | ... |
| Dis-play: | a1a2 | a1a2 | u1u2 | u1v2 | v1w2 | w1w2 | x1x2 | u1u2 | ... |
| 64. Movie to movie 42: | | | | | | | | |
| In: | a1a2 | a1b2 | b1c2 | x1x2 | u1u2 | u1v2 | v1w2 | w1w2 | ... |
| Out: | | a1a2 | b1b2 | | x1x2 | u1u2 | v1v2 | | w1w2 | ... |
| Display code: | | 03 | 13 | | 02 | 03 | 12 | | 13 | ... |
| Dis-play: | a1a2 | a1b2 | b1b2 | x1x2 | u1u2 | u1v2 | v1w2 | w1w2 | ... |
| 65. Movie to movie 43: | | | | | | | | |
| In: | a1a2 | a1b2 | b1c2 | w1w2 | x1x2 | u1u2 | u1v2 | v1w2 | ... |
| Out: | | a1a2 | b1b2 | | w1w2 | x1x2 | u1u2 | v1v2 | | ... |
| Display code: | | 03 | 13 | | 02 | 02 | 03 | 12 | | ... |
| Dis-play: | a1a2 | a1b2 | b1b2 | w1w2 | x1x2 | u1u2 | u1v2 | v1w2 | ... |
| 66. Movie to movie 44: | | | | | | | | |
| In: | a1a2 | a1b2 | b1c2 | v1w2 | w1w2 | x1x2 | u1u2 | u1v2 | ... |
| Out: | | a1a2 | b1b2 | | v1v1 | w1w2 | x1x2 | u1u2 | v1v2 | ... |
| Display code: | | 03 | 13 | | 02 | 02 | 02 | 03 | 12 | ... |
| Dis-play: | a1a2 | a1b2 | b1b2 | v1v1 | w1w2 | x1x2 | u1u2 | u1v2 | ... |
| 67. Movie to movie 45: | | | | | | | | |
| In: | a1a2 | a1b2 | b1c2 | u1v2 | v1w2 | w1w2 | x1x2 | u1u2 | ... |
| Out: | | a1a2 | b1b2 | | u1v2 | v1v1 | w1w2 | x1x2 | u1u2 | ... |
| Display code: | | 03 | 13 | | 02 | 02 | 02 | 02 | 03 | ... |
| Dis-play: | a1a2 | a1b2 | b1b2 | u1v2 | v1v1 | w1w2 | x1x2 | u1u2 | ... |
| 68. Movie to movie 46: | | | | | | | | |
| In: | a1a2 | a1b2 | b1c2 | u1u2 | u1v2 | v1w2 | w1w2 | x1x2 | ... |
| Out: | | a1a2 | b1b2 | | u1u2 | v1v2 | | w1w2 | x1x2 | ... |
| Display code: | | 03 | 13 | | 03 | 12 | | 13 | 02 | ... |
| Dis-play: | a1a2 | a1b2 | b1b2 | u1u2 | u1v2 | v1w2 | w1w2 | x1x2 | ... |

-continued

| | | | | | | | | |
|---|---|---|---|---|---|---|---|---|
| 69. Movie to movie 47: | | | | | | | | |
| In: | a1a2 | a1b2 | b1c2 | c1c2 | x1x2 | u1u2 | u1v2 | v1w2 | ... |
| Out: | | a1a2 | b1b2 | | c1c2 | x1x2 | u1u2 | u1v2 | ... |
| Display code: | | 03 | 12 | | 13 | 02 | 03 | 12 | ... |
| Display: | | a1a2 | a1b2 | b1c2 | c1c2 | x1x2 | u1u2 | u1v2 | v1w2 | ... |
| 70. Movie to movie 48: | | | | | | | | |
| In: | a1a2 | a1b2 | b1c2 | c1c2 | w1w2 | x1x2 | u1u2 | u1v2 | ... |
| Out: | | a1a2 | b1b2 | | c1c2 | w1w2 | x1x2 | u1u2 | v1v2 | ... |
| Display code: | | 03 | 12 | | 13 | 02 | 02 | 03 | 12 | ... |
| Display: | | a1a2 | a1b2 | b1c2 | c1c2 | w1w2 | x1x2 | u1u2 | u1v2 | ... |
| 71. Movie to movie 49: | | | | | | | | |
| In: | a1a2 | a1b2 | b1c2 | c1c2 | v1w2 | w1w2 | x1x2 | u1u2 | ... |
| Out: | | a1a2 | b1b2 | | c1c2 | v1v1 | w1w2 | x1x2 | u1u2 | ... |
| Display code: | | 03 | 12 | | 13 | 02 | 02 | 02 | 03 | ... |
| Display: | | a1a2 | a1b2 | b1c2 | c1c2 | v1v1 | w1w2 | x1x2 | u1u2 | ... |
| 72. Movie to movie 50: | | | | | | | | |
| In: | a1a2 | a1b2 | b1c2 | c1c2 | u1v2 | v1w2 | w1w2 | x1x2 | ... |
| Out: | | a1a2 | b1b2 | | c1c2 | u1v2 | v1v1 | w1w2 | x1x2 | ... |
| Display code: | | 03 | 12 | | 13 | 02 | 02 | 02 | 02 | ... |
| Display: | | a1a2 | a1b2 | b1c2 | c1c2 | u1v2 | v1v1 | w1w2 | x1x2 | ... |
| 73. Movie to movie 51: | | | | | | | | |
| In: | a1a2 | a1b2 | b1c2 | c1c2 | u1u2 | u1v2 | v1w2 | w1w2 | ... |
| Out: | | a1a2 | b1b2 | | c1c2 | u1u2 | v1v2 | | w1w2 | ... |
| Display code: | | 03 | 12 | | 13 | 03 | 12 | | 13 | ... |
| Display: | | a1a2 | a1b2 | b1c2 | c1c2 | u1u2 | u1v2 | v1w2 | w1w2 | ... |
| 74. Movie to movie 52: | | | | | | | | |
| In: | a1b2 | b1c2 | c1c2 | d1d2 | x1x2 | u1u2 | u1v2 | v1w2 | ... |
| Out: | | b1b2 | | c1c2 | d1d2 | x1x2 | u1u2 | u1v2 | ... |
| Display code: | | 12 | | 13 | 02 | 02 | 03 | 12 | ... |
| Display: | | a1b2 | b1c2 | c1c2 | d1d2 | x1x2 | u1u2 | u1v2 | v1w2 | ... |
| 75. Movie to movie 53: | | | | | | | | |
| In: | a1b2 | b1c2 | c1c2 | d1d2 | w1w2 | x1x2 | u1u2 | u1v2 | ... |
| Out: | | b1b2 | | c1c2 | d1d2 | w1w2 | x1x2 | u1u2 | v1v2 | ... |
| Display code: | | 12 | | 13 | 02 | 02 | 02 | 03 | 12 | ... |
| Display: | | a1b2 | b1c2 | c1c2 | d1d2 | w1w2 | x1x2 | u1u2 | u1v2 | ... |
| 76. Movie to movie 54: | | | | | | | | |
| In: | a1b2 | b1c2 | c1c2 | d1d2 | v1w2 | w1w2 | x1x2 | u1u2 | ... |
| Out: | | b1b2 | | c1c2 | d1d2 | w2w2 | w1w2 | x1x2 | u1u2 | ... |
| Display code: | | 12 | | 13 | 02 | 02 | 020 | 02 | 03 | ... |
| Display: | | a1b2 | b1c2 | c1c2 | d1d2 | w2w2 | w1w2 | x1x2 | u1u2 | ... |
| 77. Movie to movie 55: | | | | | | | | |
| In: | b1c2 | c1c2 | d1d2 | u1v2 | v1w2 | w1w2 | x1x2 | u1u2 | ... |
| Out: | | c1c2 | d1d2 | u1v2 | v1v1 | w1w2 | x1x2 | u1u2 | ... |
| Display code: | | 13 | 02 | 02 | 02 | 02 | 02 | 03 | ... |
| Display: | | b1c2 | c1c2 | d1d2 | u1v2 | v1v1 | w1w2 | x1x2 | u1u2 | ... |
| 78. Movie to movie 56: | | | | | | | | |
| In: | b1c2 | c1c2 | d1d2 | u1u2 | u1v2 | v1w2 | w1w2 | x1x2 | ... |
| Out: | | c1c2 | d1d2 | u1u2 | v1v2 | | w1w2 | x1x2 | ... |
| Display code: | | 13 | 02 | 03 | 12 | 13 | | 02 | ... |
| Display: | | b1c2 | c1c2 | d1d2 | u1u2 | u1v2 | v1w2 | w1w2 | x1x2 | ... |

We claim:

1. A video data stream analyzer comprising:

a statistical analyzer having an input bus and an output bus wherein said statistical analyzer passes a video data stream on said input bus to said output bus and generates a plurality of parameters for each field in said video data stream;

a reordering memory having an input bus coupled to said output bus of said statistical analyzer and an output line wherein each field in said video data stream is stored in said reordering memory; and a controller coupled to said statistical analyzer to receive said plurality of parameters and coupled to said reordering memory, wherein said controller analyzes said plurality of parameters and selects one of said stored fields in said reordering memory for output onto said reordering memory output line wherein said statistical analyzer further comprises:

a first-in-first-out memory, hereinafter FIFO memory, having an input bus and an output bus wherein said FIFO memory input bus is said statistical analyzer input bus; and said FIFO memory output bus is said statistical analyzer output bus.

2. A video data stream analyzer as in claim 1 wherein said FIFO memory further comprises a first field memory connected to said FIFO memory input bus.

3. A video data stream analyzer as in claim 2 wherein said FIFO memory further comprises a second field memory connected to said first field memory and to said FIFO memory output bus so that said video data stream passes through said first field memory to said second field memory and onto said FIFO memory output bus.

4. A video data stream analyzer as in claim 1 wherein said statistical analyzer further comprises:

a differential accumulator connected to said FIFO memory wherein said differential accumulator processes said video data stream passing through said FIFO memory and generates a difference measure for each field in said video data stream.

5. A video data stream analyzer as in claim 4 wherein said difference measure is for a strip of a field.

6. A video data stream analyzer as in claim 4 wherein said differential accumulator further comprises:

a strip activity differential accumulator having a first input bus connected to said FIFO input bus and a second input bus connected to said FIFO output bus;

a differential activity differential accumulator having a first input bus connected to said FIFO output bus and a second input bus connected between a first field memory and a second field memory of said FIFO memory;

a line delay memory having an input bus connected to said FIFO memory output bus and an output bus; and an intra-activity differential accumulator having a first input bus connected to said FIFO memory output bus and a second input bus connected to said line delay memory output bus.

7. A video data stream analyzer comprising:

a statistical analyzer having an input bus and an output bus wherein said statistical analyzer passes a video data stream on said input bus to said output bus and generates a plurality of parameters for each field in said video data stream;

a reordering memory having an input bus coupled to said output bus of said statistical analyzer and an outout line wherein each field in said video data stream is stored in said reordering memory; and a controller coupled to said statistical analyzer to receive said plurality of parameters and coupled to said reordering memory wherein said controller analyzes said plurality of parameters and selects one of said stored fields in said reordering memory for output onto said reordering memory output line, wherein said controller further comprises a statistical processor coupled to receive said parameters from said statistical analyzer and a state machine coupled to said statistical processor.

8. A video data stream analyzer as in claim 7 wherein said state machine detects in real time a scene change in said video data stream.

9. A video data stream analyzer as in claim 8 wherein said state machine detects in real time a repeated field in said video data stream.

10. A video data stream analyzer as in claim 7 wherein said state machine detects in real time a change from a video sequence in said video data stream to a cartoon sequence.

11. A video data stream analyzer as in claim 7 wherein said state machine detects in real time a change from a video sequence in said video data stream to a telecine sequence.

12. A video data stream analyzer as in claim 7 wherein said state machine detects in real time a change from a cartoon sequence in said video data stream to a video sequence.

13. A video data stream analyzer as in claim 7 wherein said state machine detects in real time a change from a cartoon sequence in said video data stream to a telecine sequence.

14. A video data stream analyzer as in claim 7 wherein said state machine detects in real time a change from a telecine sequence in said video data stream to a video sequence.

15. A video data stream analyzer as in claim 7 wherein said state machine detects in real time a change from a telecine sequence in said video data stream to a cartoon sequence.

16. A video data stream analyzer as in claim 7 further comprising a plurality of registers coupled to said controller.

17. A video data stream analyzer as in claim 16 wherein a state of a bit in each of said plurality of registers represents a characteristic of a field in said reordering memory.

18. A video data stream analyzer as in claim 16 wherein one register in said plurality of registers comprises a repeated field register.

19. A video data stream analyzer as in claim 18 wherein a bit in said repeated field register indicates whether a primary criterion for a field in said reordering memory is satisfied.

20. A video data stream analyzer as in claim 16 wherein one register in said plurality of registers comprises a scene cut register.

21. A video data stream analyzer as in claim 20 wherein a bit in said scene cut field register indicates whether a scene cut occurs at a field in said reordering memory.

22. A video data stream analyzer as in claim 16 wherein one register in said plurality of registers comprises a scan pattern register.

23. A video data stream analyzer as in claim 22 wherein a bit in said scan pattern register indicates whether a field pair in said reordering memory is progressive or interlaced.

24. A video data stream analyzer as in claim 7 wherein said state machine includes a video state and further wherein said state machine remains in said video state so long as said input video data stream is a video sequence.

25. A video data stream analyzer as in claim 24 wherein said state machine further comprises a cartoon state wherein said state machine enters said cartoon state upon detecting a sequence of fields in said input video data stream that have characteristics indicating a possible start of a cartoon sequence.

26. A video data stream analyzer as in claim 25 wherein said state machine further comprises a status condition having a first state and a second state wherein upon said status condition having said first state, said state machine transitions, in response to a predetermined signal, from said video state to said cartoon state.

27. A video data stream analyzer as in claim 26 wherein said controller further comprises a repeated field register and an odd-even compare register wherein said status condition is determined based on information stored in said repeated field register and said odd-even compare register.

28. A video data stream analyzer as in claim 24 wherein said state machine further comprises a first seek state wherein said state machine enters said first seek state upon said state machine detecting a sequence of fields in said input video data stream that indicates that a telecine sequence may be starting in said input video data stream.

29. A video data stream analyzer as in claim 28 wherein said state machine further comprises a status condition having a first state and a second state wherein upon said status condition having said first state, said state machine transitions, in response to a predetermined signal, from said video state to said first seek state.

30. A video data stream analyzer as in claim 29 wherein said controller further comprises a repeated field register and an odd-even compare register wherein said first status condition is determined based on information stored in said repeated field register and said odd-even compare register.

31. A video data stream analyzer as in claim 29 wherein upon said status condition having said first state and said state machine is in a cartoon state, said state machine transitions, in response to a predetermined signal, from said cartoon state to said first seek state.

32. A video data stream analyzer as in claim 28 wherein said state machine further comprises a movie state wherein said state machine enters said movie state upon said state machine detecting a sequence of fields in said input video data stream that indicates a telecine sequence.

33. A video data stream analyzer as in claim 32 wherein said state machine further comprises a status condition having a first state and a second state wherein upon said status condition having said first state, said state machine transitions, in response to a predetermined signal, from said first seek state to said movie state; and upon said status condition having said second state, said state machine transitions from said status seek state to said video state.

34. A video data stream analyzer as in claim 33 wherein said controller further comprises a repeated field register wherein said status condition is determined based on information stored in said repeated field register.

35. A video data stream analyzer as in claim 33 wherein said controller further comprises a repeated field register and an odd-even compare register wherein said first status condition is determined based on information stored in said repeated field register and said odd-even compare register.

36. A video data stream analyzer as in claim 32 wherein said state machine further comprises a second seek state.

37. A video data stream analyzer as in claim 36 wherein said state machine further comprises a status condition having a first state and a second state wherein upon said status condition having said first state, said state machine transitions, in response to a predetermined signal, from said movie state to said second seek state; and upon said status condition having said second state, said state machine transitions, in response to said predetermined signal, to said video state.

38. A video data stream analyzer as in claim 37 wherein said controller further comprises a repeated field register and an odd-even compare register wherein said status condition is determined based on information stored in said repeated field register and odd-even compare register.

39. A video data stream analyzer as in claim 37 wherein said state machine further comprises a second status condition having a first state and a second state wherein upon said second status condition having said first state and said state machine is in said second seek state, said state machine transitions, in response to a predetermined signal, from said second seek state to said movie state.

40. A video data stream analyzer as in claim 7, further comprising a side channel coupled to said controller wherein said controller generates a display code on said side channel.

41. A video data stream analyzer as in claim 7, further comprising a side channel coupled to said controller wherein said controller generates an output format code on said side channel.

42. A video data stream analyzer comprising:
a statistical analyzer having an input bus and an output bus wherein
said statistical analyzer passes a video data stream on said input bus to said output bus and generates a plurality of parameters for each field in said video data stream;
a reordering memory having an input bus coupled to said output bus of said statistical analyzer and an output line wherein each field in said video data stream is stored in said reordering memory; and
a controller coupled to said statistical analyzer to receive said plurality of parameters and coupled to said reordering memory
wherein said controller analyzes said plurality of parameters and selects one of said stored fields in said reordering memory for output onto said reordering memory output line, wherein said reordering memory further comprises:
a first first-in-first-out memory, hereinafter FIFO memory, having an input bus connected to said statistical analyzer output bus and an output bus;
a second first-in-first-out memory having an input bus connected to said statistical analyzer output bus and an output bus;
a video random access memory connected to said output bus of said first FIFO memory and to said output bus of said second FIFO memory;
a read-write circuit coupled to said video random access memory and coupled to said controller; and
a video random access memory controller coupled to said video random access memory and to said read-write circuit.

43. A video data stream analyzer comprising:
a first-in-first-out memory, hereinafter FIFO memory, having an input bus and an output bus;
a reordering memory having an input bus coupled to said output bus of said FIFO memory and an output line wherein a video data stream on said input bus of said FIFO memory is passed through said FIFO memory to said reordering memory; and
each field in said video data stream is stored in said reordering memory;
a differential accumulator connected to said FIFO memory wherein said differential accumulator processes said video data stream passing through said FIFO memory and generates a difference measure for each field in said video data stream; and
a controller connected to said reordering memory and to said differential accumulator wherein said controller analyzes said difference measures from said differential accumulator and selects one of said stored fields in said reordering memory for output onto said reordering memory output line.

44. A video data stream analyzer as in claim 43 further comprising a side channel coupled to said controller wherein said controller generates a display code on said side channel.

45. A video data stream analyzer as in claim 43 further comprising a side channel coupled to said controller wherein said controller generates a output format code on said side channel.

46. A video data stream analyzer as in claim 43 wherein said controller further comprises a statistical processor and a state machine.

47. A video data stream analyzer as in claim 46 wherein said state machine includes a plurality of states.

48. A video data stream analyzer as in claim 47 wherein said state machine includes a plurality of status conditions and further wherein said status conditions are used by said state machine in real time to determine transitions between states in said plurality of states.

49. A video data stream analyzer as in claim 47 wherein said plurality of states include a video state, a cartoon state, a first seek state, a movie state, a second seek state, and a transfer state.

50. A video data stream analyzer as in claim 43 further comprising a plurality of registers coupled to said controller.

51. A video data stream analyzer as in claim 50 wherein said plurality of registers includes a repeated field register, a scan pattern register, an odd-even compare register, and a scene cut register.

52. A video data stream analyzer as in claim 43 wherein said differential accumulator further comprises:

a strip activity differential accumulator having a first input bus connected to said FIFO input bus and a second input bus connected to said FIFO output bus;

a differential activity differential accumulator having 4 first input bus connected to said FIFO input bus and a second input bus connected between a first field memory and a second field memory of said FIFO memory;

a line delay memory having an input bus connected to said FIFO memory output bus and an output bus; and a intra-activity differential accumulator having a first input bus connected to said FIFO memory output bus and a second input bus connected to said line delay memory output bus.

53. A video data stream analyzer as in claim 43 wherein said reordering memory further comprises:

a second first-in-first-out memory, hereinafter second FIFO memory, having an input bus connected to said first mentioned FIFO output bus and an output bus;

a third first-in-first-out memory having an input bus connected to said first mentioned FIFO output bus and an output bus;

a video random access memory connect to said output bus of said second FIFO memory and to said output bus of said third FIFO memory;

a read-write circuit coupled to said video random access memory and to said controller; and a video random access memory controller coupled to said video random access memory and to said read write circuit.

* * * * *